(12) United States Patent
Foss et al.

(10) Patent No.: US 11,474,626 B2
(45) Date of Patent: Oct. 18, 2022

(54) BUTTON FUNCTIONALITY

(71) Applicant: Apple Inc., Cupertino, CA (US)

(72) Inventors: Christopher Patrick Foss, San Francisco, CA (US); Anton M. Davydov, Gilroy, CA (US); Dylan Ross Edwards, San Jose, CA (US); Imran Chaudhri, San Francisco, CA (US); Alan C. Dye, San Francisco, CA (US); Jonathan P. Ive, San Jose, CA (US); Stephen O. Lemay, Palo Alto, CA (US); Kevin M. Lynch, Woodside, CA (US); Lawrence Y. Yang, Bellevue, WA (US); Dennis S. Park, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/378,451

(22) Filed: Jul. 16, 2021

(65) Prior Publication Data
US 2021/0342017 A1    Nov. 4, 2021

Related U.S. Application Data

(63) Continuation of application No. 16/384,726, filed on Apr. 15, 2019, now Pat. No. 11,068,083, which is a
(Continued)

(51) Int. Cl.
*G06F 3/0362*  (2013.01)
*G06F 3/16*  (2006.01)
(Continued)

(52) U.S. Cl.
CPC .......... *G06F 3/0362* (2013.01); *G06F 1/163* (2013.01); *G06F 3/0338* (2013.01); *G06F 3/041* (2013.01);
(Continued)

(58) Field of Classification Search
CPC ...... G06F 3/0362; G06F 1/163; G06F 3/0338; G06F 3/041; G06F 3/0481;
(Continued)

(56) References Cited

U.S. PATENT DOCUMENTS

| 4,358,837 A | 11/1982 | Yamazaki et al. |
| 4,395,134 A | 7/1983 | Luce |

(Continued)

FOREIGN PATENT DOCUMENTS

| AU | 2012200689 A1 | 3/2012 |
| AU | 2014100584 A4 | 7/2014 |

(Continued)

OTHER PUBLICATIONS

Office Action received for Chinese Patent Application No. 202110396782.5, dated Nov. 11, 2021, 10 pages (4 pages of English Translation and 6 pages of Official Copy).
(Continued)

*Primary Examiner* — Sejoon Ahn
(74) *Attorney, Agent, or Firm* — Dentons US LLP

(57) ABSTRACT

Button functionalities for user interfaces, e.g., for use with a portable multifunction device, are disclosed. Exemplary button functionalities are described for an electronic device with a display, a rotatable and depressible input mechanism, and/or a button. Different device features may be accessed, depending on whether the rotatable and depressible input mechanism or the button is activated, and further depending on whether the activation represents a single press, a double press, or an extended press on the rotatable and depressible input mechanism or the button.

36 Claims, 30 Drawing Sheets

Related U.S. Application Data continuation of application No. 16/055,489, filed on Aug. 6, 2018, now Pat. No. 10,281,999, which is a continuation of application No. 14/641,252, filed on Mar. 6, 2015, now Pat. No. 10,082,892.

(60) Provisional application No. 62/044,922, filed on Sep. 2, 2014.

(51) Int. Cl.

| | |
|---|---|
| *G06F 1/16* | (2006.01) |
| *G06F 3/0482* | (2013.01) |
| *H04M 1/72412* | (2021.01) |
| *G06F 3/0338* | (2013.01) |
| *G06F 3/041* | (2006.01) |
| *G06F 3/0481* | (2022.01) |
| *G06F 3/04842* | (2022.01) |
| *G06F 3/0487* | (2013.01) |
| *G06F 3/0488* | (2022.01) |
| *G06Q 20/08* | (2012.01) |
| *G06Q 20/32* | (2012.01) |
| *H04M 1/2746* | (2020.01) |

(52) U.S. Cl.
CPC .......... *G06F 3/0481* (2013.01); *G06F 3/0482* (2013.01); *G06F 3/0487* (2013.01); *G06F 3/0488* (2013.01); *G06F 3/04842* (2013.01); *G06F 3/167* (2013.01); *G06Q 20/085* (2013.01); *G06Q 20/322* (2013.01); *H04M 1/72412* (2021.01); *G06F 2203/0381* (2013.01); *H04M 1/2746* (2020.01)

(58) Field of Classification Search
CPC .... G06F 3/04842; G06F 3/0487; G06F 3/167; G06F 2203/0381; H04M 1/72412; H04M 1/2746; G06Q 20/085; G06Q 20/322
See application file for complete search history.

(56) References Cited

U.S. PATENT DOCUMENTS

| | | |
|---|---|---|
| 4,445,785 A | 5/1984 | Chambon et al. |
| 4,623,261 A | 11/1986 | Muto |
| 5,088,070 A | 2/1992 | Shift et al. |
| 5,204,600 A | 4/1993 | Kahkoska |
| 5,220,260 A | 6/1993 | Schuler |
| 5,313,229 A | 5/1994 | Gilligan et al. |
| 5,323,363 A | 6/1994 | Hysek et al. |
| 5,329,501 A | 7/1994 | Meister et al. |
| 5,477,508 A | 12/1995 | Will |
| 5,508,978 A | 4/1996 | Kalbermatter et al. |
| 5,519,393 A | 5/1996 | Brandestini |
| 5,528,260 A | 6/1996 | Kent |
| 5,530,455 A | 6/1996 | Gillick et al. |
| 5,563,631 A | 10/1996 | Masunaga |
| 5,623,588 A | 4/1997 | Gould |
| 5,689,628 A | 11/1997 | Robertson |
| 5,691,747 A | 11/1997 | Amano |
| 5,739,775 A | 4/1998 | Brandestini |
| 5,751,260 A | 5/1998 | Nappi et al. |
| 5,825,353 A | 10/1998 | Will |
| 5,852,413 A | 12/1998 | Bacchi et al. |
| 5,874,961 A | 2/1999 | Bates et al. |
| 5,903,229 A | 5/1999 | Kishi |
| 5,940,521 A | 8/1999 | East et al. |
| 5,960,366 A | 9/1999 | Duwaer |
| 5,973,670 A | 10/1999 | Barber et al. |
| 5,982,710 A | 11/1999 | Rawat et al. |
| 6,005,579 A | 12/1999 | Sugiyama et al. |
| 6,081,256 A | 6/2000 | Martin et al. |
| 6,128,006 A | 10/2000 | Rosenberg et al. |
| 6,157,381 A | 12/2000 | Bates et al. |
| 6,161,957 A | 12/2000 | Guanter |
| 6,192,258 B1 | 2/2001 | Kamada et al. |
| 6,203,190 B1 | 3/2001 | Stotz |
| 6,249,689 B1 | 6/2001 | Aizawa |
| 6,266,098 B1 | 7/2001 | Cove et al. |
| 6,297,795 B1 | 10/2001 | Kato et al. |
| 6,300,939 B1 | 10/2001 | Decker et al. |
| 6,305,234 B1 | 10/2001 | Thies et al. |
| 6,310,648 B1 | 10/2001 | Miller et al. |
| 6,323,846 B1 | 11/2001 | Westerman et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,369,794 B1 | 4/2002 | Sakurai et al. |
| 6,396,482 B1 | 5/2002 | Griffin et al. |
| 6,477,117 B1 | 11/2002 | Narayanaswami et al. |
| 6,489,950 B1 | 12/2002 | Griffin et al. |
| 6,522,347 B1 | 2/2003 | Sakai et al. |
| 6,525,997 B1 | 2/2003 | Narayanaswami et al. |
| 6,535,461 B1 | 3/2003 | Karhu et al. |
| 6,556,222 B1 | 4/2003 | Narayanaswami |
| 6,570,557 B1 | 5/2003 | Westerman et al. |
| 6,570,583 B1 | 5/2003 | Kung et al. |
| 6,597,374 B1 | 7/2003 | Baker et al. |
| 6,600,936 B1 | 7/2003 | Kärkkäinen et al. |
| 6,636,197 B1 | 10/2003 | Goldenberg et al. |
| 6,636,246 B1 | 10/2003 | Gallo et al. |
| 6,647,338 B1 | 11/2003 | Remlinger et al. |
| 6,661,438 B1 | 12/2003 | Shiraishi et al. |
| 6,662,023 B1 | 12/2003 | Helle |
| 6,677,932 B1 | 1/2004 | Westerman |
| 6,686,904 B1 | 2/2004 | Sherman et al. |
| 6,686,911 B1 | 2/2004 | Levin et al. |
| 6,700,564 B2 | 3/2004 | Mcloone et al. |
| 6,720,860 B1 | 4/2004 | Narayanaswami |
| 6,763,226 B1 | 7/2004 | Mczeal, Jr. |
| 6,788,220 B2 | 9/2004 | Netzer et al. |
| 6,809,275 B1 | 10/2004 | Cheng et al. |
| 6,809,724 B1 | 10/2004 | Shiraishi et al. |
| 6,842,169 B2 | 1/2005 | Griffin et al. |
| 6,937,228 B2 | 8/2005 | Yu |
| 6,967,642 B2 | 11/2005 | Sangiovanni et al. |
| 6,967,903 B2 | 11/2005 | Guanter et al. |
| 6,972,776 B2 | 12/2005 | Davis et al. |
| 6,977,868 B2 | 12/2005 | Brewer et al. |
| 7,002,558 B2 | 2/2006 | Keely et al. |
| 7,024,625 B2 | 4/2006 | Shalit |
| 7,036,090 B1 | 4/2006 | Nguyen |
| 7,046,230 B2 | 5/2006 | Zadesky et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,116,317 B2 | 10/2006 | Gregorio et al. |
| 7,143,355 B2 | 11/2006 | Yamaguchi et al. |
| 7,146,005 B1 | 12/2006 | Anft et al. |
| 7,168,047 B1 | 1/2007 | Huppi et al. |
| 7,227,963 B1 | 6/2007 | Yamada et al. |
| 7,256,770 B2 | 8/2007 | Hinckley et al. |
| 7,272,077 B2 | 9/2007 | Nobs et al. |
| 7,286,063 B2 | 10/2007 | Gauthey et al. |
| 7,286,119 B2 | 10/2007 | Miyashita et al. |
| 7,317,449 B2 | 1/2008 | Robbins et al. |
| 7,333,084 B2 | 2/2008 | Griffin et al. |
| 7,362,312 B2 | 4/2008 | Nurmi |
| 7,463,239 B2 | 12/2008 | Ledbetter et al. |
| 7,469,381 B2 | 12/2008 | Ording |
| 7,469,386 B2 | 12/2008 | Bear et al. |
| 7,477,890 B1 | 1/2009 | Narayanaswami et al. |
| 7,489,303 B1 | 2/2009 | Pryor |
| 7,499,040 B2 | 3/2009 | Zadesky et al. |
| 7,506,269 B2 | 3/2009 | Lang et al. |
| 7,519,468 B2 | 4/2009 | Orr et al. |
| 7,552,397 B2 | 6/2009 | Holecek et al. |
| 7,596,761 B2 | 9/2009 | Lemay et al. |
| 7,600,192 B1 | 10/2009 | Hashimoto et al. |
| 7,614,008 B2 | 11/2009 | Ording |
| 7,633,076 B2 | 12/2009 | Huppi et al. |
| 7,653,883 B2 | 1/2010 | Hotelling et al. |

(56) References Cited

U.S. PATENT DOCUMENTS

| | | |
|---|---|---|
| 7,657,849 B2 | 2/2010 | Chaudhri et al. |
| 7,663,607 B2 | 2/2010 | Hotelling et al. |
| 7,710,393 B2 | 5/2010 | Tsuk et al. |
| 7,710,409 B2 | 5/2010 | Robbin et al. |
| 7,720,552 B1 | 5/2010 | Lloyd |
| 7,794,138 B2 | 9/2010 | Hilfiker |
| 7,844,914 B2 | 11/2010 | Andre et al. |
| 7,844,915 B2 | 11/2010 | Platzer et al. |
| 7,856,255 B2 | 12/2010 | Tsuchiya et al. |
| 7,876,288 B1 | 1/2011 | Huang |
| 7,916,157 B1 | 3/2011 | Kelley et al. |
| 7,956,847 B2 | 6/2011 | Christie |
| 7,957,762 B2 | 6/2011 | Herz et al. |
| 7,965,276 B1 | 6/2011 | Martin et al. |
| 8,001,488 B1 | 8/2011 | Lam et al. |
| 8,006,002 B2 | 8/2011 | Kalayjian et al. |
| 8,009,144 B2 | 8/2011 | Yajima et al. |
| 8,046,705 B2 | 10/2011 | Hunleth et al. |
| 8,130,205 B2 | 3/2012 | Forstall et al. |
| 8,140,996 B2 | 3/2012 | Tomkins et al. |
| 8,191,011 B2 | 5/2012 | Abanami et al. |
| 8,194,036 B1 | 6/2012 | Geiss et al. |
| 8,196,043 B2 | 6/2012 | Crow et al. |
| 8,201,102 B2 | 6/2012 | Lee et al. |
| 8,239,784 B2 | 8/2012 | Hotelling et al. |
| 8,266,550 B1 | 9/2012 | Cleron et al. |
| 8,279,180 B2 | 10/2012 | Hotelling et al. |
| 8,307,306 B2 | 11/2012 | Komatsu et al. |
| 8,311,727 B2 | 11/2012 | Eckstein et al. |
| 8,375,326 B2 | 2/2013 | Bucher et al. |
| 8,381,135 B2 | 2/2013 | Hotelling et al. |
| 8,427,432 B2 | 4/2013 | Kim et al. |
| 8,448,083 B1 | 5/2013 | Migos et al. |
| 8,479,122 B2 | 7/2013 | Hotelling et al. |
| 8,487,882 B2 | 7/2013 | Inaba et al. |
| 8,533,623 B2 | 9/2013 | St. Jacques, Jr. |
| 8,543,081 B2 | 9/2013 | Scott et al. |
| 8,549,429 B2 | 10/2013 | Tsuruta et al. |
| 8,566,722 B2 | 10/2013 | Gordon et al. |
| 8,607,156 B1 | 12/2013 | Jania et al. |
| 8,627,236 B2 | 1/2014 | Jung et al. |
| 8,656,311 B1 | 2/2014 | Harper et al. |
| 8,665,209 B2 | 3/2014 | Rimas-Ribikauskas et al. |
| 8,669,944 B2 | 3/2014 | Klinghult et al. |
| 8,669,945 B2 | 3/2014 | Coddington |
| 8,675,084 B2 | 3/2014 | Bolton et al. |
| 8,677,283 B2 | 3/2014 | Fong |
| 8,686,944 B1 | 4/2014 | Dayer et al. |
| 8,717,302 B1 | 5/2014 | Qin et al. |
| 8,739,040 B2 | 5/2014 | Graham |
| 8,743,151 B1 | 6/2014 | Fulcher et al. |
| 8,799,816 B2 | 8/2014 | Wells et al. |
| 8,824,245 B2 | 9/2014 | Lau et al. |
| 8,854,318 B2 | 10/2014 | Borovsky et al. |
| 8,860,674 B2 | 10/2014 | Lee et al. |
| 8,868,338 B1 | 10/2014 | Lookingbill et al. |
| 8,952,886 B2 | 2/2015 | Tsuk et al. |
| 8,954,887 B1 | 2/2015 | Mendis et al. |
| 9,001,625 B2 | 4/2015 | Essery et al. |
| 9,007,057 B2 | 4/2015 | Villaret |
| 9,007,302 B1 | 4/2015 | Bandt-Horn |
| 9,007,323 B2 | 4/2015 | Araki |
| 9,011,292 B2 | 4/2015 | Weast et al. |
| 9,104,705 B2 | 8/2015 | Fujinaga |
| 9,158,440 B1 | 10/2015 | Lider et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,195,219 B2 | 11/2015 | Hong et al. |
| 9,229,624 B2 | 1/2016 | Wei et al. |
| 9,268,400 B2 | 2/2016 | Gomez Sainz-Garcia |
| 9,395,867 B2 | 7/2016 | Yach et al. |
| 9,395,905 B2 | 7/2016 | Wherry |
| 9,423,938 B1 | 8/2016 | Morris |
| 9,442,649 B2 | 9/2016 | Davis et al. |
| 9,448,691 B2 | 9/2016 | Suda |
| D778,912 S | 2/2017 | Akana et al. |
| 9,582,187 B2 | 2/2017 | Gil et al. |
| 9,620,312 B2 | 4/2017 | Ely et al. |
| 9,651,922 B2 | 5/2017 | Hysek et al. |
| 9,666,178 B2 | 5/2017 | Loubiere et al. |
| 9,678,571 B1 | 6/2017 | Robert et al. |
| 9,696,809 B2 | 7/2017 | Temple |
| 9,772,769 B2 | 9/2017 | Shimazu |
| 9,798,443 B1 | 10/2017 | Gray |
| 9,823,828 B2 | 11/2017 | Zambetti et al. |
| 9,870,114 B1 | 1/2018 | Jones et al. |
| D813,239 S | 3/2018 | Akana et al. |
| 9,921,711 B2 | 3/2018 | Oh et al. |
| 9,965,144 B2 | 5/2018 | Nakamura et al. |
| 9,971,495 B2 | 5/2018 | Shetty et al. |
| 9,984,539 B2 | 5/2018 | Moussette et al. |
| 10,019,097 B2 | 7/2018 | Ely et al. |
| 10,025,458 B2 | 7/2018 | Chaudhri et al. |
| 10,048,802 B2 | 8/2018 | Shedletsky et al. |
| 10,057,470 B2 | 8/2018 | Kim et al. |
| 10,097,496 B2 | 10/2018 | Dye et al. |
| 10,133,439 B1 | 11/2018 | Brichter et al. |
| 10,152,196 B2 | 12/2018 | Jeong et al. |
| 10,175,652 B2 | 1/2019 | Ely et al. |
| 10,216,147 B2 | 2/2019 | Ely et al. |
| 10,216,352 B2 | 2/2019 | Liang et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,289,218 B1 | 5/2019 | Young |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,339,721 B1 | 7/2019 | Dascola et al. |
| 10,389,675 B2 | 8/2019 | Grandhi |
| 10,417,879 B2 | 9/2019 | Moussette et al. |
| 10,504,340 B2 | 12/2019 | Moussette et al. |
| 10,642,467 B2 | 5/2020 | Merminod et al. |
| 10,977,911 B2 | 4/2021 | Moussette et al. |
| 2001/0004337 A1 | 6/2001 | Paratte et al. |
| 2001/0011991 A1 | 8/2001 | Wang et al. |
| 2001/0041596 A1 | 11/2001 | Forlenzo et al. |
| 2001/0043514 A1 | 11/2001 | Kita et al. |
| 2002/0015024 A1 | 2/2002 | Westerman et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036623 A1 | 3/2002 | Kano et al. |
| 2002/0047860 A1 | 4/2002 | Ceulaer et al. |
| 2002/0054164 A1 | 5/2002 | Uemura |
| 2002/0063684 A1 | 5/2002 | Tran |
| 2002/0101457 A1 | 8/2002 | Lang |
| 2002/0101458 A1 | 8/2002 | Sangiovanni |
| 2002/0118169 A1 | 8/2002 | Hinckley et al. |
| 2002/0126099 A1 | 9/2002 | Engholm |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai et al. |
| 2003/0020671 A1 | 1/2003 | Santoro et al. |
| 2003/0025673 A1 | 2/2003 | Ledbetter et al. |
| 2003/0052901 A1 | 3/2003 | Fukuchi |
| 2003/0076301 A1 | 4/2003 | Tsuk et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0117440 A1 | 6/2003 | Hellyar et al. |
| 2003/0122787 A1 | 7/2003 | Zimmerman et al. |
| 2003/0123329 A1 | 7/2003 | Guanter et al. |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0189598 A1 | 10/2003 | Lipstein et al. |
| 2003/0210259 A1 | 11/2003 | Liu et al. |
| 2003/0210286 A1 | 11/2003 | Gerpheide et al. |

(56) References Cited

U.S. PATENT DOCUMENTS

| | | |
|---|---|---|
| 2004/0013042 A1 | 1/2004 | Farine et al. |
| 2004/0027793 A1 | 2/2004 | Haraguchi et al. |
| 2004/0038667 A1 | 2/2004 | Vance |
| 2004/0047244 A1 | 3/2004 | Iino et al. |
| 2004/0073935 A1 | 4/2004 | Kang |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0130580 A1 | 7/2004 | Howard et al. |
| 2004/0130581 A1 | 7/2004 | Howard et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0164973 A1 | 8/2004 | Nakano et al. |
| 2004/0170270 A1 | 9/2004 | Takashima et al. |
| 2004/0218472 A1 | 11/2004 | Narayanaswami et al. |
| 2004/0225613 A1 | 11/2004 | Narayanaswami et al. |
| 2004/0230599 A1 | 11/2004 | Moore et al. |
| 2004/0233162 A1 | 11/2004 | Kobayashi |
| 2004/0239649 A1 | 12/2004 | Ludtke et al. |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0007884 A1 | 1/2005 | Lorenzato et al. |
| 2005/0012723 A1 | 1/2005 | Pallakoff |
| 2005/0030279 A1 | 2/2005 | Fu |
| 2005/0081164 A1 | 4/2005 | Hama et al. |
| 2005/0097466 A1 | 5/2005 | Levi et al. |
| 2005/0116941 A1 | 6/2005 | Wallington et al. |
| 2005/0119031 A1 | 6/2005 | Spalink et al. |
| 2005/0136955 A1 | 6/2005 | Mumick et al. |
| 2005/0164623 A1 | 7/2005 | Huynh |
| 2005/0168566 A1 | 8/2005 | Tada et al. |
| 2005/0183012 A1 | 8/2005 | Petro et al. |
| 2005/0187873 A1 | 8/2005 | Labrou et al. |
| 2005/0190059 A1 | 9/2005 | Wehrenberg |
| 2005/0191159 A1 | 9/2005 | Benko |
| 2005/0191994 A1 | 9/2005 | May et al. |
| 2005/0195216 A1 | 9/2005 | Kramer et al. |
| 2005/0209051 A1 | 9/2005 | Santomassimo et al. |
| 2005/0215848 A1 | 9/2005 | Lorenzato et al. |
| 2005/0231489 A1 | 10/2005 | Ladouceur et al. |
| 2005/0259077 A1 | 11/2005 | Adams et al. |
| 2006/0007129 A1 | 1/2006 | Pletikosa et al. |
| 2006/0017692 A1 | 1/2006 | Wehrenberg et al. |
| 2006/0020904 A1 | 1/2006 | Aaltonen et al. |
| 2006/0022956 A1 | 2/2006 | Lengeling et al. |
| 2006/0025091 A1 | 2/2006 | Buford |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0028446 A1 | 2/2006 | Liberty et al. |
| 2006/0033724 A1 | 2/2006 | Chaudhri et al. |
| 2006/0064716 A1 | 3/2006 | Sull et al. |
| 2006/0069604 A1 | 3/2006 | Leukart et al. |
| 2006/0082554 A1 | 4/2006 | Caine et al. |
| 2006/0085751 A1 | 4/2006 | O'Brien et al. |
| 2006/0090090 A1 | 4/2006 | Perng et al. |
| 2006/0092177 A1 | 5/2006 | Blaske et al. |
| 2006/0095846 A1 | 5/2006 | Nurmi |
| 2006/0112350 A1 | 5/2006 | Kato et al. |
| 2006/0143574 A1 | 6/2006 | Ito et al. |
| 2006/0152480 A1 | 7/2006 | Senn |
| 2006/0161861 A1 | 7/2006 | Holecek et al. |
| 2006/0174213 A1 | 8/2006 | Kato |
| 2006/0181506 A1 | 8/2006 | Fyke et al. |
| 2006/0197753 A1 | 9/2006 | Hotelling |
| 2006/0212905 A1 | 9/2006 | Matsuda et al. |
| 2006/0224945 A1 | 10/2006 | Khan et al. |
| 2006/0255683 A1 | 11/2006 | Suzuki et al. |
| 2006/0268019 A1 | 11/2006 | Wang et al. |
| 2006/0268020 A1 | 11/2006 | Han |
| 2006/0290671 A1 | 12/2006 | Bohn et al. |
| 2006/0294025 A1 | 12/2006 | Mengerink |
| 2007/0002019 A1 | 1/2007 | Lane et al. |
| 2007/0030256 A1 | 2/2007 | Akaike et al. |
| 2007/0031119 A1 | 2/2007 | Iwanaga |
| 2007/0036346 A1 | 2/2007 | Kwon |
| 2007/0046635 A1 | 3/2007 | Nishiyama et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0085841 A1 | 4/2007 | Tsuk et al. |
| 2007/0097151 A1 | 5/2007 | Rosenberg |
| 2007/0098395 A1 | 5/2007 | Battles et al. |
| 2007/0106949 A1 | 5/2007 | Narita et al. |
| 2007/0120819 A1 | 5/2007 | Young et al. |
| 2007/0132733 A1 | 6/2007 | Ram |
| 2007/0132789 A1 | 6/2007 | Ording et al. |
| 2007/0135043 A1 | 6/2007 | Hayes et al. |
| 2007/0136679 A1 | 6/2007 | Yang |
| 2007/0146337 A1 | 6/2007 | Ording et al. |
| 2007/0150830 A1 | 6/2007 | Ording et al. |
| 2007/0157094 A1 | 7/2007 | Lemay et al. |
| 2007/0168369 A1 | 7/2007 | Bruns |
| 2007/0176910 A1 | 8/2007 | Simek et al. |
| 2007/0180379 A1 | 8/2007 | Osato et al. |
| 2007/0182595 A1 | 8/2007 | Ghasabian |
| 2007/0182999 A1 | 8/2007 | Anthony et al. |
| 2007/0209017 A1 | 9/2007 | Gupta et al. |
| 2007/0211042 A1 | 9/2007 | Kim et al. |
| 2007/0216661 A1 | 9/2007 | Chen et al. |
| 2007/0226646 A1 | 9/2007 | Nagiyama et al. |
| 2007/0229458 A1 | 10/2007 | Moon |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0279401 A1 | 12/2007 | Ramstein et al. |
| 2007/0290045 A1 | 12/2007 | Cisar |
| 2007/0291018 A1 | 12/2007 | Park et al. |
| 2007/0296711 A1 | 12/2007 | Yee et al. |
| 2008/0001915 A1 | 1/2008 | Pihlaja et al. |
| 2008/0004084 A1 | 1/2008 | Park et al. |
| 2008/0019494 A1 | 1/2008 | Toda |
| 2008/0020810 A1 | 1/2008 | Park |
| 2008/0033779 A1 | 2/2008 | Coffman et al. |
| 2008/0040692 A1 | 2/2008 | Sunday et al. |
| 2008/0043028 A1 | 2/2008 | Tanaka |
| 2008/0052643 A1 | 2/2008 | Ike et al. |
| 2008/0052945 A1 | 3/2008 | Matas et al. |
| 2008/0055241 A1 | 3/2008 | Goldenberg et al. |
| 2008/0062127 A1 | 3/2008 | Brodersen et al. |
| 2008/0062141 A1 | 3/2008 | Chaudhri |
| 2008/0066135 A1 | 3/2008 | Brodersen et al. |
| 2008/0109764 A1 | 5/2008 | Linnamaki |
| 2008/0123473 A1 | 5/2008 | Ozawa et al. |
| 2008/0125196 A1 | 5/2008 | Ryu |
| 2008/0129520 A1 | 6/2008 | Lee |
| 2008/0148177 A1 | 6/2008 | Lang et al. |
| 2008/0150901 A1 | 6/2008 | Lowles et al. |
| 2008/0155461 A1 | 6/2008 | Ozaki et al. |
| 2008/0155475 A1 | 6/2008 | Duhig et al. |
| 2008/0158149 A1 | 7/2008 | Levin |
| 2008/0163116 A1 | 7/2008 | Lee et al. |
| 2008/0163119 A1 | 7/2008 | Kim et al. |
| 2008/0163121 A1 | 7/2008 | Lee et al. |
| 2008/0165124 A1 | 7/2008 | Kim |
| 2008/0165140 A1 | 7/2008 | Christie et al. |
| 2008/0165152 A1 | 7/2008 | Forstall et al. |
| 2008/0165153 A1 | 7/2008 | Platzer et al. |
| 2008/0165161 A1 | 7/2008 | Platzer et al. |
| 2008/0165210 A1 | 7/2008 | Platzer et al. |
| 2008/0168349 A1 | 7/2008 | Lamiraux et al. |
| 2008/0168382 A1 | 7/2008 | Louch et al. |
| 2008/0168384 A1 | 7/2008 | Platzer et al. |
| 2008/0168404 A1 | 7/2008 | Ording |
| 2008/0168478 A1 | 7/2008 | Platzer et al. |
| 2008/0172634 A1 | 7/2008 | Choi et al. |
| 2008/0174570 A1 | 7/2008 | Jobs et al. |
| 2008/0186808 A1 | 8/2008 | Lee |

(56) References Cited

U.S. PATENT DOCUMENTS

| | | |
|---|---|---|
| 2008/0201649 A1 | 8/2008 | Mattila et al. |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0225014 A1 | 9/2008 | Kim |
| 2008/0257701 A1 | 10/2008 | Wlotzka et al. |
| 2008/0259025 A1 | 10/2008 | Eom |
| 2008/0279475 A1 | 11/2008 | Lee et al. |
| 2008/0288880 A1 | 11/2008 | Reponen et al. |
| 2008/0318635 A1 | 12/2008 | Yoon et al. |
| 2008/0320391 A1 | 12/2008 | Lemay et al. |
| 2009/0002396 A1 | 1/2009 | Andrews et al. |
| 2009/0007019 A1 | 1/2009 | Kobayashi et al. |
| 2009/0015550 A1 | 1/2009 | Koski et al. |
| 2009/0030800 A1 | 1/2009 | Grois |
| 2009/0036165 A1 | 2/2009 | Brede |
| 2009/0046110 A1 | 2/2009 | Sadler et al. |
| 2009/0050465 A1 | 2/2009 | Asada et al. |
| 2009/0051649 A1 | 2/2009 | Rondel |
| 2009/0059730 A1 | 3/2009 | Lyons et al. |
| 2009/0064031 A1 | 3/2009 | Bull et al. |
| 2009/0070675 A1 | 3/2009 | Li |
| 2009/0070705 A1 | 3/2009 | Ording |
| 2009/0070711 A1 | 3/2009 | Kwak et al. |
| 2009/0079698 A1 | 3/2009 | Takashima et al. |
| 2009/0098912 A1 | 4/2009 | Kim et al. |
| 2009/0100373 A1 | 4/2009 | Pixley et al. |
| 2009/0102817 A1 | 4/2009 | Bathiche et al. |
| 2009/0109069 A1 | 4/2009 | Takasaki et al. |
| 2009/0119678 A1 | 5/2009 | Shih et al. |
| 2009/0125811 A1 | 5/2009 | Bethurum |
| 2009/0143117 A1 | 6/2009 | Shin et al. |
| 2009/0144642 A1 | 6/2009 | Crystal |
| 2009/0144654 A1 | 6/2009 | Brouwer et al. |
| 2009/0152452 A1 | 6/2009 | Lee et al. |
| 2009/0156255 A1 | 6/2009 | Shin et al. |
| 2009/0164937 A1 | 6/2009 | Alviar et al. |
| 2009/0177538 A1 | 7/2009 | Brewer et al. |
| 2009/0177966 A1 | 7/2009 | Chaudhri |
| 2009/0189915 A1 | 7/2009 | Mercer et al. |
| 2009/0193359 A1 | 7/2009 | Anthony et al. |
| 2009/0196124 A1 | 8/2009 | Mooring et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0205041 A1 | 8/2009 | Michalske |
| 2009/0228825 A1 | 9/2009 | Van Os et al. |
| 2009/0231271 A1 | 9/2009 | Heubel et al. |
| 2009/0237372 A1 | 9/2009 | Kim et al. |
| 2009/0241150 A1 | 9/2009 | White et al. |
| 2009/0280907 A1 | 11/2009 | Larsen et al. |
| 2009/0288039 A1 | 11/2009 | Mail et al. |
| 2009/0289905 A1 | 11/2009 | Ahn |
| 2009/0315867 A1 | 12/2009 | Sakamoto et al. |
| 2009/0325563 A1 | 12/2009 | Horodezky et al. |
| 2010/0001967 A1 | 1/2010 | Yoo |
| 2010/0004031 A1 | 1/2010 | Kim |
| 2010/0004033 A1 | 1/2010 | Choe et al. |
| 2010/0017748 A1 | 1/2010 | Taylor et al. |
| 2010/0017872 A1 | 1/2010 | Goertz et al. |
| 2010/0026640 A1 | 2/2010 | Kim et al. |
| 2010/0029327 A1 | 2/2010 | Jee |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0070926 A1 | 3/2010 | Abanami et al. |
| 2010/0073692 A1 | 3/2010 | Waltman et al. |
| 2010/0079500 A1 | 4/2010 | Osullivan et al. |
| 2010/0088634 A1 | 4/2010 | Tsuruta et al. |
| 2010/0093400 A1 | 4/2010 | Ju et al. |
| 2010/0110044 A1 | 5/2010 | Englund |
| 2010/0113101 A1 | 5/2010 | Tanada |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0211498 A1 | 8/2010 | Aabye et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0223145 A1 | 9/2010 | Dragt |
| 2010/0235742 A1 | 9/2010 | Hsu et al. |
| 2010/0248778 A1 | 9/2010 | Biswas |
| 2010/0251168 A1 | 9/2010 | Fujita et al. |
| 2010/0259481 A1 | 10/2010 | Oh et al. |
| 2010/0267424 A1 | 10/2010 | Kim et al. |
| 2010/0269038 A1 | 10/2010 | Tsuda |
| 2010/0271312 A1 | 10/2010 | Alameh et al. |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0271401 A1 | 10/2010 | Fong |
| 2010/0277126 A1 | 11/2010 | Naeimi et al. |
| 2010/0283743 A1 | 11/2010 | Coddington |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1 | 1/2011 | Lee et al. |
| 2011/0022472 A1 | 1/2011 | Zon |
| 2011/0025311 A1 | 2/2011 | Chauvin et al. |
| 2011/0025624 A1 | 2/2011 | Goto |
| 2011/0047491 A1 | 2/2011 | Hwang et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074699 A1 | 3/2011 | Marr et al. |
| 2011/0074719 A1 | 3/2011 | Yeh et al. |
| 2011/0074828 A1 | 3/2011 | Capela et al. |
| 2011/0078622 A1 | 3/2011 | Missig et al. |
| 2011/0086613 A1 | 4/2011 | Doudkine et al. |
| 2011/0087982 A1 | 4/2011 | Mccann et al. |
| 2011/0088086 A1 | 4/2011 | Swink et al. |
| 2011/0090255 A1 | 4/2011 | Wilson et al. |
| 2011/0093812 A1 | 4/2011 | Fong |
| 2011/0095993 A1 | 4/2011 | Zuverink |
| 2011/0099509 A1 | 4/2011 | Horagai et al. |
| 2011/0102455 A1 | 5/2011 | Temple |
| 2011/0107264 A1 | 5/2011 | Akel |
| 2011/0119578 A1 | 5/2011 | Schwartz |
| 2011/0126139 A1 | 5/2011 | Jeong et al. |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0145759 A1 | 6/2011 | Leffert et al. |
| 2011/0157046 A1 | 6/2011 | Lee et al. |
| 2011/0164042 A1 | 7/2011 | Chaudhri |
| 2011/0167262 A1 | 7/2011 | Ross et al. |
| 2011/0167369 A1 | 7/2011 | Van |
| 2011/0167382 A1 | 7/2011 | Van Os |
| 2011/0187355 A1 | 8/2011 | Dixon et al. |
| 2011/0197160 A1 | 8/2011 | Kim et al. |
| 2011/0199342 A1 | 8/2011 | Vartanian et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0209104 A1 | 8/2011 | Hinckley et al. |
| 2011/0224967 A1 | 9/2011 | Van |
| 2011/0225543 A1 | 9/2011 | Arnold et al. |
| 2011/0234633 A1 | 9/2011 | Ogura et al. |
| 2011/0248948 A1 | 10/2011 | Griffin et al. |
| 2011/0251892 A1 | 10/2011 | Laracey |

(56) References Cited

U.S. PATENT DOCUMENTS

| | | |
|---|---|---|
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0271183 A1 | 11/2011 | Bose et al. |
| 2011/0271233 A1 | 11/2011 | Radakovitz et al. |
| 2011/0279384 A1 | 11/2011 | Miller et al. |
| 2011/0291945 A1 | 12/2011 | Ewing et al. |
| 2011/0296312 A1 | 12/2011 | Boyer et al. |
| 2011/0298830 A1 | 12/2011 | Lam |
| 2011/0302493 A1 | 12/2011 | Runstedler et al. |
| 2011/0307842 A1 | 12/2011 | Chiang et al. |
| 2011/0316888 A1 | 12/2011 | Sachs et al. |
| 2012/0011437 A1 | 1/2012 | James et al. |
| 2012/0016678 A1 | 1/2012 | Gruber et al. |
| 2012/0019513 A1 | 1/2012 | Fong et al. |
| 2012/0026198 A1 | 2/2012 | Maesaka |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0044267 A1 | 2/2012 | Fino et al. |
| 2012/0050185 A1 | 3/2012 | Davydov et al. |
| 2012/0054670 A1 | 3/2012 | Rainisto |
| 2012/0056848 A1 | 3/2012 | Yamano et al. |
| 2012/0059787 A1 | 3/2012 | Brown et al. |
| 2012/0062398 A1 | 3/2012 | Durand |
| 2012/0066621 A1 | 3/2012 | Matsubara |
| 2012/0066629 A1 | 3/2012 | Lee et al. |
| 2012/0066638 A1 | 3/2012 | Ohri et al. |
| 2012/0068925 A1 | 3/2012 | Wong et al. |
| 2012/0083260 A1 | 4/2012 | Arriola et al. |
| 2012/0084689 A1 | 4/2012 | Ledet et al. |
| 2012/0089951 A1 | 4/2012 | Cassidy |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0112859 A1 | 5/2012 | Park et al. |
| 2012/0127071 A1 | 5/2012 | Jitkoff et al. |
| 2012/0131495 A1 | 5/2012 | Goossens et al. |
| 2012/0131504 A1 | 5/2012 | Fadell et al. |
| 2012/0133604 A1 | 5/2012 | Ishizuka et al. |
| 2012/0133677 A1 | 5/2012 | Suzuki et al. |
| 2012/0142414 A1 | 6/2012 | Murakami |
| 2012/0147052 A1 | 6/2012 | Homma et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0162350 A1 | 6/2012 | Lee et al. |
| 2012/0169776 A1 | 7/2012 | Rissa et al. |
| 2012/0174005 A1 | 7/2012 | Deutsch et al. |
| 2012/0174033 A1 | 7/2012 | Joo |
| 2012/0179998 A1 | 7/2012 | Nesladek et al. |
| 2012/0186951 A1 | 7/2012 | Wu et al. |
| 2012/0192110 A1 | 7/2012 | Wu et al. |
| 2012/0197743 A1 | 8/2012 | Grigg et al. |
| 2012/0204123 A1 | 8/2012 | Bauer et al. |
| 2012/0226977 A1 | 9/2012 | Lengeling et al. |
| 2012/0236037 A1 | 9/2012 | Lessing et al. |
| 2012/0256863 A1 | 10/2012 | Zhang et al. |
| 2012/0272145 A1 | 10/2012 | Ryan et al. |
| 2012/0272181 A1 | 10/2012 | Rogers et al. |
| 2012/0278725 A1 | 11/2012 | Gordon et al. |
| 2012/0278755 A1 | 11/2012 | Lehmann et al. |
| 2012/0284674 A1 | 11/2012 | Geng et al. |
| 2012/0289290 A1 | 11/2012 | Chae et al. |
| 2012/0290472 A1 | 11/2012 | Mullen et al. |
| 2012/0297324 A1 | 11/2012 | Dollar et al. |
| 2012/0297342 A1 | 11/2012 | Jang et al. |
| 2012/0304113 A1 | 11/2012 | Patten et al. |
| 2012/0306765 A1 | 12/2012 | Moore et al. |
| 2012/0306930 A1 | 12/2012 | Decker et al. |
| 2012/0311055 A1 | 12/2012 | Adams et al. |
| 2012/0324357 A1 | 12/2012 | Viegers et al. |
| 2012/0324390 A1 | 12/2012 | Tao et al. |
| 2012/0327006 A1 | 12/2012 | Israr et al. |
| 2012/0327009 A1 | 12/2012 | Fleizach |
| 2013/0019182 A1 | 1/2013 | Gil et al. |
| 2013/0021362 A1 | 1/2013 | Sakurada et al. |
| 2013/0024780 A1 | 1/2013 | Sutedja et al. |
| 2013/0024811 A1 | 1/2013 | Gleadall et al. |
| 2013/0027412 A1 | 1/2013 | Roddy |
| 2013/0031507 A1 | 1/2013 | George |
| 2013/0031514 A1 | 1/2013 | Gabbert |
| 2013/0036005 A1 | 2/2013 | Rappe |
| 2013/0038636 A1 | 2/2013 | Fujiwaka |
| 2013/0046397 A1 | 2/2013 | Fadell et al. |
| 2013/0055160 A1 | 2/2013 | Yamada et al. |
| 2013/0063383 A1 | 3/2013 | Anderssonreimer et al. |
| 2013/0067390 A1 | 3/2013 | Kwiatkowski et al. |
| 2013/0073932 A1 | 3/2013 | Migos et al. |
| 2013/0097526 A1 | 4/2013 | Stovicek et al. |
| 2013/0097556 A1 | 4/2013 | Louch et al. |
| 2013/0097566 A1 | 4/2013 | Berglund |
| 2013/0104039 A1 | 4/2013 | Ormin et al. |
| 2013/0111342 A1 | 5/2013 | Alameh et al. |
| 2013/0111384 A1 | 5/2013 | Kim et al. |
| 2013/0111396 A1 | 5/2013 | Brid |
| 2013/0111407 A1 | 5/2013 | Mullen |
| 2013/0117689 A1 | 5/2013 | Lessing et al. |
| 2013/0117698 A1 | 5/2013 | Park et al. |
| 2013/0120295 A1 | 5/2013 | Kim et al. |
| 2013/0132883 A1 | 5/2013 | Vayrynen |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-Nainar |
| 2013/0159941 A1 | 6/2013 | Langlois et al. |
| 2013/0169579 A1 | 7/2013 | Havnor |
| 2013/0174031 A1 | 7/2013 | Constantinou |
| 2013/0176020 A1 | 7/2013 | Chauvin et al. |
| 2013/0191220 A1 | 7/2013 | Dent et al. |
| 2013/0205939 A1 | 8/2013 | Meerovitsch et al. |
| 2013/0208013 A1 | 8/2013 | Yuu et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0227412 A1 | 8/2013 | Ornstein et al. |
| 2013/0227419 A1 | 8/2013 | Lee et al. |
| 2013/0244615 A1 | 9/2013 | Miller |
| 2013/0254708 A1 | 9/2013 | Dorcey |
| 2013/0258819 A1 | 10/2013 | Hoover |
| 2013/0262564 A1 | 10/2013 | Wall et al. |
| 2013/0275899 A1 | 10/2013 | Schubert et al. |
| 2013/0282360 A1 | 10/2013 | Shimota et al. |
| 2013/0282459 A1 | 10/2013 | Smets et al. |
| 2013/0283204 A1 | 10/2013 | Pasquero et al. |
| 2013/0290116 A1 | 10/2013 | Hepworth et al. |
| 2013/0303087 A1 | 11/2013 | Hauser et al. |
| 2013/0305184 A1 | 11/2013 | Kim et al. |
| 2013/0305187 A1 | 11/2013 | Phillips et al. |
| 2013/0318437 A1 | 11/2013 | Jung et al. |
| 2013/0324093 A1 | 12/2013 | Santamaria et al. |
| 2013/0328786 A1 | 12/2013 | Hinckley |
| 2013/0339343 A1 | 12/2013 | Hierons et al. |
| 2013/0339345 A1 | 12/2013 | Soto Matamala et al. |
| 2013/0342457 A1 | 12/2013 | Cox et al. |
| 2014/0002502 A1 | 1/2014 | Han |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0036639 A1 | 2/2014 | Boni et al. |
| 2014/0040742 A1 | 2/2014 | Park et al. |
| 2014/0068751 A1 | 3/2014 | Last |
| 2014/0075311 A1 | 3/2014 | Boettcher et al. |
| 2014/0075368 A1 | 3/2014 | Kim et al. |
| 2014/0092037 A1 | 4/2014 | Kim |
| 2014/0092143 A1 | 4/2014 | Vanbion et al. |
| 2014/0105278 A1 | 4/2014 | Bivolarsky |

(56) References Cited

U.S. PATENT DOCUMENTS

| | | |
|---|---|---|
| 2014/0106734 A1 | 4/2014 | Lee |
| 2014/0108936 A1 | 4/2014 | Khosropour et al. |
| 2014/0109002 A1 | 4/2014 | Kimball et al. |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0152585 A1 | 6/2014 | Andersson Reimer |
| 2014/0155031 A1 | 6/2014 | Lee et al. |
| 2014/0157160 A1 | 6/2014 | Cudak et al. |
| 2014/0160078 A1 | 6/2014 | Seo et al. |
| 2014/0164966 A1 | 6/2014 | Kim et al. |
| 2014/0189608 A1 | 7/2014 | Shuttleworth et al. |
| 2014/0204229 A1 | 7/2014 | Leung et al. |
| 2014/0215340 A1 | 7/2014 | Shetty et al. |
| 2014/0222916 A1 | 8/2014 | Foley et al. |
| 2014/0237382 A1 | 8/2014 | Grandhi |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0267441 A1 | 9/2014 | Matas et al. |
| 2014/0282005 A1 | 9/2014 | Gutowitz |
| 2014/0282016 A1 | 9/2014 | Hosier, Jr. |
| 2014/0282142 A1 | 9/2014 | Lin |
| 2014/0282214 A1 | 9/2014 | Shirzadi et al. |
| 2014/0289659 A1 | 9/2014 | Harrison et al. |
| 2014/0292668 A1 | 10/2014 | Fricklas et al. |
| 2014/0298233 A1 | 10/2014 | Pettey et al. |
| 2014/0304389 A1 | 10/2014 | Reavis |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0347289 A1 | 11/2014 | Lee et al. |
| 2014/0362024 A1 | 12/2014 | Hicks |
| 2014/0365126 A1 | 12/2014 | Vulcano et al. |
| 2014/0372115 A1 | 12/2014 | Lebeau et al. |
| 2015/0007025 A1 | 1/2015 | Sassi et al. |
| 2015/0007048 A1 | 1/2015 | Dumans |
| 2015/0009784 A1 | 1/2015 | Cho et al. |
| 2015/0036555 A1 | 2/2015 | Shin et al. |
| 2015/0046871 A1 | 2/2015 | Lewis |
| 2015/0049591 A1 | 2/2015 | Adams et al. |
| 2015/0058723 A1 | 2/2015 | Cieplinski et al. |
| 2015/0058744 A1 | 2/2015 | Dhingra et al. |
| 2015/0065821 A1 | 3/2015 | Conrad |
| 2015/0067495 A1 | 3/2015 | Bernstein et al. |
| 2015/0067497 A1 | 3/2015 | Cieplinski et al. |
| 2015/0067513 A1 | 3/2015 | Zambetti et al. |
| 2015/0067555 A1 | 3/2015 | Joo et al. |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0121224 A1 | 4/2015 | Krasnahill, Jr. |
| 2015/0121311 A1 | 4/2015 | Lou et al. |
| 2015/0148927 A1 | 5/2015 | Georges et al. |
| 2015/0149899 A1 | 5/2015 | Bernstein et al. |
| 2015/0149956 A1 | 5/2015 | Kempinski et al. |
| 2015/0160856 A1 | 6/2015 | Jang et al. |
| 2015/0178041 A1 | 6/2015 | Uskoreit |
| 2015/0185845 A1 | 7/2015 | Nagara et al. |
| 2015/0193099 A1 | 7/2015 | Murphy |
| 2015/0193951 A1 | 7/2015 | Lee et al. |
| 2015/0199012 A1 | 7/2015 | Palmer |
| 2015/0199110 A1 | 7/2015 | Nakazato |
| 2015/0205476 A1 | 7/2015 | Kuscher et al. |
| 2015/0234518 A1 | 8/2015 | Teller et al. |
| 2015/0234562 A1 | 8/2015 | Ording |
| 2015/0261310 A1 | 9/2015 | Walmsley et al. |
| 2015/0269944 A1 | 9/2015 | Wang |
| 2015/0277559 A1 | 10/2015 | Vescovi et al. |
| 2015/0277563 A1 | 10/2015 | Huang et al. |
| 2015/0286391 A1 | 10/2015 | Jacobs et al. |
| 2015/0302301 A1 | 10/2015 | Petersen |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1 | 12/2015 | Ramanathan et al. |
| 2015/0379476 A1 | 12/2015 | Chaudhri et al. |
| 2016/0004393 A1 | 1/2016 | Faaborg et al. |
| 2016/0011758 A1 | 1/2016 | Meggs et al. |
| 2016/0012018 A1 | 1/2016 | Do Ba |
| 2016/0028875 A1 | 1/2016 | Brown et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034153 A1 | 2/2016 | Lejeune et al. |
| 2016/0034166 A1 | 2/2016 | Wilson et al. |
| 2016/0034167 A1 | 2/2016 | Wilson et al. |
| 2016/0054710 A1 | 2/2016 | Jo et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062573 A1 | 3/2016 | Dascola et al. |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065509 A1 | 3/2016 | Butcher et al. |
| 2016/0065525 A1 | 3/2016 | Dye et al. |
| 2016/0071241 A1 | 3/2016 | Anzures et al. |
| 2016/0091971 A1 | 3/2016 | Burr |
| 2016/0098016 A1 | 4/2016 | Shedletsky et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0198319 A1 | 7/2016 | Huang et al. |
| 2016/0202866 A1 | 7/2016 | Zambetti |
| 2016/0209939 A1 | 7/2016 | Zambetti et al. |
| 2016/0231883 A1 | 8/2016 | Zambetti |
| 2016/0259499 A1 | 9/2016 | Kocienda et al. |
| 2016/0259530 A1 | 9/2016 | Everitt et al. |
| 2016/0259535 A1 | 9/2016 | Seymour et al. |
| 2016/0269540 A1 | 9/2016 | Butcher et al. |
| 2016/0299912 A1 | 10/2016 | Acuna et al. |
| 2016/0327911 A1 | 11/2016 | Eim et al. |
| 2016/0357368 A1 | 12/2016 | Federighi et al. |
| 2017/0010678 A1 | 1/2017 | Tuli |
| 2017/0010751 A1 | 1/2017 | Shedletsky et al. |
| 2017/0045958 A1 | 2/2017 | Battlogg |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0242933 A1 | 8/2017 | Liu |
| 2017/0269692 A1 | 9/2017 | Eck et al. |
| 2017/0315716 A1 | 11/2017 | Zambetti et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0074693 A1 | 3/2018 | Jones et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0204425 A1 | 7/2018 | Moussette et al. |
| 2018/0210516 A1 | 7/2018 | Zambetti et al. |
| 2018/0307363 A1 | 10/2018 | Ely et al. |
| 2018/0329587 A1 | 11/2018 | Ko et al. |
| 2018/0335891 A1 | 11/2018 | Shedletsky et al. |
| 2018/0335901 A1 | 11/2018 | Manzari et al. |

(56) References Cited

U.S. PATENT DOCUMENTS

| | | | |
|---|---|---|---|
| 2018/0336866 A1 | 11/2018 | Triverio et al. |
| 2018/0341344 A1 | 11/2018 | Foss et al. |
| 2018/0367489 A1 | 12/2018 | Dye et al. |
| 2018/0369691 A1 | 12/2018 | Rihn et al. |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0072912 A1 | 3/2019 | Pandya et al. |
| 2019/0080066 A1 | 3/2019 | Van Os et al. |
| 2019/0080072 A1 | 3/2019 | Van Os et al. |
| 2019/0101870 A1 | 4/2019 | Pandya et al. |
| 2019/0163324 A1 | 5/2019 | Shedletsky et al. |
| 2019/0163329 A1 | 5/2019 | Yang et al. |
| 2019/0172016 A1 | 6/2019 | Chaudhri et al. |
| 2019/0212885 A1 | 7/2019 | Zambetti et al. |
| 2019/0243471 A1 | 8/2019 | Foss et al. |
| 2019/0272036 A1 | 9/2019 | Grant et al. |
| 2019/0274565 A1 | 9/2019 | Soli et al. |
| 2019/0279520 A1 | 9/2019 | Wilson et al. |
| 2019/0342622 A1 | 11/2019 | Carrigan et al. |
| 2019/0354268 A1 | 11/2019 | Everitt et al. |
| 2019/0369755 A1 | 12/2019 | Roper et al. |
| 2019/0369838 A1 | 12/2019 | Josephson et al. |
| 2020/0050332 A1 | 2/2020 | Yang et al. |
| 2020/0081538 A1 | 3/2020 | Moussette et al. |
| 2020/0081539 A1 | 3/2020 | Moussette et al. |
| 2020/0110522 A1 | 4/2020 | Zambetti et al. |
| 2020/0145361 A1 | 5/2020 | Dye et al. |
| 2020/0167047 A1 | 5/2020 | Dascola et al. |
| 2020/0192473 A1* | 6/2020 | Wang .............. G06F 1/163 |
| 2020/0272287 A1 | 8/2020 | Yang et al. |
| 2020/0272293 A1 | 8/2020 | Zambetti et al. |
| 2020/0333940 A1* | 10/2020 | Lee .............. G06F 3/017 |
| 2020/0341553 A1 | 10/2020 | Moussette et al. |
| 2020/0344439 A1* | 10/2020 | Choi .............. H04N 5/655 |
| 2020/0368616 A1 | 11/2020 | Delamont |
| 2021/0073741 A1 | 3/2021 | Chaudhri et al. |
| 2021/0208750 A1 | 7/2021 | Zambetti et al. |
| 2022/0129858 A1 | 4/2022 | Chaudhri et al. |
| 2022/0137759 A1 | 5/2022 | Yang et al. |

FOREIGN PATENT DOCUMENTS

| | | |
|---|---|---|
| AU | 2016231505 A1 | 10/2016 |
| AU | 2018100429 A4 | 5/2018 |
| AU | 2018100429 B4 | 8/2018 |
| CN | 1263425 A | 8/2000 |
| CN | 1330310 A | 1/2002 |
| CN | 1341889 A | 3/2002 |
| CN | 1398366 A | 2/2003 |
| CN | 1549998 A | 11/2004 |
| CN | 1650251 A | 8/2005 |
| CN | 1757011 A | 4/2006 |
| CN | 1797295 A | 7/2006 |
| CN | 1811899 A | 8/2006 |
| CN | 101042300 A | 9/2007 |
| CN | 101059730 A | 10/2007 |
| CN | 101101595 A | 1/2008 |
| CN | 101203821 A | 6/2008 |
| CN | 101431545 A | 5/2009 |
| CN | 101446802 A | 6/2009 |
| CN | 101611374 A | 12/2009 |
| CN | 101625620 A | 1/2010 |
| CN | 101634659 A | 1/2010 |
| CN | 101776968 A | 7/2010 |
| CN | 101876877 A | 11/2010 |
| CN | 101893992 A | 11/2010 |
| CN | 101976171 A | 2/2011 |
| CN | 102033710 A | 4/2011 |
| CN | 101241407 B | 7/2011 |
| CN | 102144213 A | 8/2011 |
| CN | 102402328 A | 4/2012 |
| CN | 102479053 A | 5/2012 |
| CN | 102508707 A | 6/2012 |
| CN | 102591579 A | 7/2012 |
| CN | 102612679 A | 7/2012 |
| CN | 102725724 A | 10/2012 |
| CN | 102750066 A | 10/2012 |
| CN | 102763066 A | 10/2012 |
| CN | 102812426 A | 12/2012 |
| CN | 102859482 A | 1/2013 |
| CN | 102902453 A | 1/2013 |
| CN | 102902454 A | 1/2013 |
| CN | 102905181 A | 1/2013 |
| CN | 101034328 B | 2/2013 |
| CN | 102981770 A | 3/2013 |
| CN | 103069378 A | 4/2013 |
| CN | 103154878 A | 6/2013 |
| CN | 103212197 A | 7/2013 |
| CN | 103270486 A | 8/2013 |
| CN | 103460164 A | 12/2013 |
| CN | 103703437 A | 4/2014 |
| CN | 103782252 A | 5/2014 |
| CN | 103793138 A | 5/2014 |
| CN | 103858088 A | 6/2014 |
| CN | 103870255 A | 6/2014 |
| CN | 103914261 A | 7/2014 |
| CN | 103970413 A | 8/2014 |
| CN | 104166458 A | 11/2014 |
| CN | 105955591 A | 9/2016 |
| CN | 107710135 A | 2/2018 |
| CN | 107797657 A | 3/2018 |
| CN | 108139863 A | 6/2018 |
| CN | 108304106 A | 7/2018 |
| CN | 108334190 A | 7/2018 |
| CN | 108369455 A | 8/2018 |
| CN | 101634659 A | 3/2022 |
| CN | 102812426 A | 3/2022 |
| EP | 1052566 A1 | 11/2000 |
| EP | 1168149 A2 | 1/2002 |
| EP | 1406158 A2 | 4/2004 |
| EP | 1486860 A1 | 12/2004 |
| EP | 1505484 A1 | 2/2005 |
| EP | 1571538 A1 | 9/2005 |
| EP | 1679879 A2 | 7/2006 |
| EP | 1847920 A2 | 10/2007 |
| EP | 1850213 A2 | 10/2007 |
| EP | 1942401 A1 | 7/2008 |
| EP | 1944677 A2 | 7/2008 |
| EP | 1956433 A1 | 8/2008 |
| EP | 1956446 A2 | 8/2008 |
| EP | 1959337 A2 | 8/2008 |
| EP | 2124131 A2 | 11/2009 |
| EP | 2207084 A2 | 7/2010 |
| EP | 2224317 A1 | 9/2010 |
| EP | 2237140 A2 | 10/2010 |
| EP | 2284646 A1 | 2/2011 |
| EP | 2302492 A2 | 3/2011 |
| EP | 2302493 A2 | 3/2011 |
| EP | 2385451 A1 | 11/2011 |
| EP | 2547117 A1 | 1/2013 |
| EP | 2551784 A1 | 1/2013 |
| EP | 2610738 A2 | 7/2013 |
| EP | 2693382 A2 | 2/2014 |
| EP | 2733579 A2 | 5/2014 |
| EP | 2733598 A2 | 5/2014 |
| EP | 2741176 A2 | 6/2014 |
| EP | 3401770 A1 | 11/2018 |
| GB | 2392773 A | 3/2004 |
| GB | 2489580 A | 10/2012 |
| JP | 55-80084 A | 6/1980 |
| JP | 5-88812 A | 4/1993 |
| JP | 6-348408 A | 12/1994 |
| JP | 7-152478 A | 6/1995 |
| JP | 11-110106 A | 4/1999 |
| JP | 2000-503153 A | 3/2000 |
| JP | 2000-305760 A | 11/2000 |
| JP | 2001-100905 A | 4/2001 |
| JP | 2001-202178 A | 7/2001 |
| JP | 2001-202181 A | 7/2001 |
| JP | 2002-175139 A | 6/2002 |
| JP | 2002-288690 A | 10/2002 |
| JP | 2003-248544 A | 9/2003 |
| JP | 2003-330586 A | 11/2003 |

(56) References Cited

FOREIGN PATENT DOCUMENTS

| | | |
|---|---|---|
| JP | 2003-330856 A | 11/2003 |
| JP | 2004-21522 A | 1/2004 |
| JP | 2004-178584 A | 6/2004 |
| JP | 2004-184396 A | 7/2004 |
| JP | 2004-259063 A | 9/2004 |
| JP | 2005-4891 A | 1/2005 |
| JP | 2005-196077 A | 7/2005 |
| JP | 2006-11690 A | 1/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2008-97057 A | 4/2008 |
| JP | 2008-518539 A | 5/2008 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-246553 A | 10/2009 |
| JP | 2009-265793 A | 11/2009 |
| JP | 2009-294526 A | 12/2009 |
| JP | 2010-515978 A | 5/2010 |
| JP | 2010-257051 A | 11/2010 |
| JP | 2011-8540 A | 1/2011 |
| JP | 2011-90640 A | 5/2011 |
| JP | 20110-96043 A | 5/2011 |
| JP | 2011-530738 A | 12/2011 |
| JP | 2012-27797 A | 2/2012 |
| JP | 2012-58979 A | 3/2012 |
| JP | 2012-115519 A | 6/2012 |
| JP | 2012-155698 A | 8/2012 |
| JP | 2012-252384 A | 12/2012 |
| JP | 2012-531607 A | 12/2012 |
| JP | 2013-114844 A | 6/2013 |
| JP | 2013-122738 A | 6/2013 |
| JP | 2013-137750 A | 7/2013 |
| JP | 2013-164700 A | 8/2013 |
| JP | 2014-42164 A | 3/2014 |
| JP | 2016538653 A | 12/2016 |
| JP | 2017-500656 A | 1/2017 |
| JP | 2017-516163 A | 6/2017 |
| JP | 2018-508076 A | 3/2018 |
| JP | 2018-508900 A | 3/2018 |
| KR | 10-2004-0107472 A | 12/2004 |
| KR | 10-0630154 B1 | 9/2006 |
| KR | 10-2007-0024702 A | 3/2007 |
| KR | 10-2008-0095085 A | 10/2008 |
| KR | 10-2010-0003589 A | 1/2010 |
| KR | 10-0971452 B1 | 7/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2013-0052751 A | 5/2013 |
| TW | I269202 B | 12/2006 |
| TW | D122820 S | 5/2008 |
| TW | 200843452 A | 11/2008 |
| TW | 201119339 A | 6/2011 |
| TW | I349212 B | 9/2011 |
| TW | I381305 B | 1/2013 |
| TW | I384394 B | 2/2013 |
| TW | I394410 B1 | 4/2013 |
| TW | I395498 B | 5/2013 |
| TW | I405106 B | 8/2013 |
| TW | 201403363 A | 1/2014 |
| TW | I426416 B | 2/2014 |
| TW | 201421340 A | 6/2014 |
| TW | I443547 B | 7/2014 |
| WO | 93/08517 A1 | 4/1993 |
| WO | 96/19872 A1 | 6/1996 |
| WO | 01/69369 A1 | 9/2001 |
| WO | 03/021568 A1 | 3/2003 |
| WO | 03/036457 A2 | 5/2003 |
| WO | 2005/055034 A1 | 6/2005 |
| WO | 2006/037545 A2 | 4/2006 |
| WO | 2006/042309 A1 | 4/2006 |
| WO | 2006/094308 A2 | 9/2006 |
| WO | 2006/094308 A3 | 12/2006 |
| WO | 2008/030779 A2 | 3/2008 |
| WO | 2008/033853 A2 | 3/2008 |
| WO | 2008/085742 A2 | 7/2008 |
| WO | 2008/086218 A2 | 7/2008 |
| WO | 2008/099251 A1 | 8/2008 |
| WO | 2008/106777 A1 | 9/2008 |
| WO | 2009/026508 A1 | 2/2009 |
| WO | 2009/084368 A1 | 7/2009 |
| WO | 2009/085378 A1 | 7/2009 |
| WO | 2009/097592 A1 | 8/2009 |
| WO | 2010/024969 A1 | 3/2010 |
| WO | 2010/150768 A1 | 12/2010 |
| WO | 2011/084859 A1 | 7/2011 |
| WO | 2011/126502 A1 | 10/2011 |
| WO | 2012/006494 A1 | 1/2012 |
| WO | 2012/080020 A1 | 6/2012 |
| WO | 2012/129359 A1 | 9/2012 |
| WO | 2013/085580 A1 | 6/2013 |
| WO | 2013/105664 A1 | 7/2013 |
| WO | 2013/114844 A1 | 8/2013 |
| WO | 2013/133901 A2 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2014/078965 A1 | 5/2014 |
| WO | 2014/105276 A1 | 7/2014 |
| WO | 2015/034969 A2 | 3/2015 |
| WO | 2015/057320 A1 | 4/2015 |
| WO | 2016/141057 A1 | 9/2016 |
| WO | 2016/144385 A1 | 9/2016 |
| WO | 2016/144563 A1 | 9/2016 |
| WO | 2016/144696 A2 | 9/2016 |
| WO | 2016/144975 A2 | 9/2016 |
| WO | 2017/027625 A2 | 2/2017 |
| WO | 2018/048518 A1 | 3/2018 |
| WO | 2018048632 A1 | 3/2018 |

OTHER PUBLICATIONS

Applicant-Initiated Interview Summary received for U.S. Appl. No. 16/734,173, dated Sep. 27, 2021, 2 pages.
Board Opinion received for Chinese Patent Application No. 201910164962.3, dated Sep. 16, 2021, 16 pages (6 pages of English Translation and 10 pages of Official Copy).
Decision to Grant received for Danish Patent Application No. PA201970259, dated Sep. 17, 2021, 2 pages.
Examiner-Initiated Interview Summary received for U.S. Appl. No. 14/913,349, dated Sep. 22, 2021, 2 pages.
Examiner's Answer to Appeal Brief received for U.S. Appl. No. 14/913,349, dated Sep. 30, 2021, 23 pages.
Notice of Allowance received for U.S. Appl. No. 16/263,280, dated Sep. 17, 2021, 8 pages.
Applicant-Initiated Interview Summary received for U.S. Appl. No. 16/734,173, dated Sep. 9, 2021, 2 pages.
Applicant-Initiated Interview Summary received for U.S. Appl. No. 16/775,528, dated Aug. 30, 2021, 4 pages.
Non-Final Office Action received for U.S. Appl. No. 16/775,528, dated Sep. 13, 2021, 14 pages.
Notice of Allowance received for Korean Patent Application No. 10-2021-7005523, dated Aug. 26, 2021, 4 pages (1 page of English Translation and 3 pages of Official Copy).
Office Action received for Japanese Patent Application No. 2019-116590, dated Feb. 4, 2022, 17 pages (8 pages of English Translation and 9 pages of Official Copy).
Office Action received for Korean Patent Application No. 10-2021-7001482, dated Jan. 24, 2022, 9 pages (4 pages of English Translation and 5 pages of Official Copy).

(56) References Cited

OTHER PUBLICATIONS

Applicant-Initiated Interview Summary received for U.S. Appl. No. 16/775,528, dated Jan. 13, 2022, 4 pages.
Applicant-Initiated Interview Summary received for U.S. Appl. No. 17/212,850, dated Jan. 13, 2022, 5 pages.
Office Action received for Chinese Patent Application No. 201910447678.7, dated Nov. 29, 2021, 17 pages (7 pages of English Translation and 10 pages of Official Copy).
Decision on Appeal received for Korean Patent Application No. 10-2018-7033888, dated Oct. 27, 2021, 34 pages (4 pages of English Translation and 30 pages of Official Copy).
Final Office Action received for U.S. Appl. No. 15/818,500, dated Nov. 30, 2021, 14 pages.
Office Action received for Indian Patent Application No. 202018015998, dated Nov. 17, 2021, 6 pages.
Office Action received for Indian Patent Application No. 202018016000, dated Nov. 16, 2021, 6 pages.
Office Action received for Korean Patent Application No. 10-2021-7001918, dated Nov. 16, 2021, 12 pages (5 pages of English Translation and 7 pages of Official Copy).
Advisory Action received for U.S. Appl. No. 15/655,253, dated May 11, 2021, 6 pages.
Android Central, "Gmail on iOS versus Android", Online Available at https://www.youtube.com/watch?v=w2aVeZLxU5Q, Nov. 3, 2011, 3 pages.
Applicant Initiated Interview Summary received for U.S. Appl. No. 16/871,995, dated Jul. 16, 2021, 4 pages.
Applicant-Initiated Interview Summary received for U.S. Appl. No. 15/655,253, dated Mar. 29, 2021, 4 pages.
Applicant-Initiated Interview Summary received for U.S. Appl. No. 15/818,500, dated Aug. 9, 2021, 6 pages.
Applicant-Initiated Interview Summary received for U.S. Appl. No. 16/263,280, dated Apr. 26, 2021, 2 pages.
Board Decision received for Chinese Patent Application No. 201580046339.8, dated Jun. 22, 2021, 12 pages (1 page of English Translation and 11 pages of Official Copy).
Board Opinion received for Chinese Patent Application No. 201580046339.8, dated Mar. 19, 2021, 11 pages (3 pages of English Translation and 8 pages of Official Copy).
Corrected Notice of Allowance received for U.S. Appl. No. 16/263,280, dated Aug. 5, 2021, 4 pages.
Decision of Appeal received for Korean Patent Application No. 10-2019-7028736, dated May 24, 2021, 16 pages (2 pages of English Translation and 14 pages of Official Copy).
European Search Report received for European Patent Application No. 20217518.8, dated Apr. 16, 2021, 4 pages.
Final Office Action received for U.S. Appl. No. 16/734,173, dated Jul. 13, 2021, 12 pages.
Final Office Action received for U.S. Appl. No. 16/775,528, dated May 25, 2021, 15 pages.
Final Office Action received for U.S. Appl. No. 16/871,995, dated Aug. 20, 2021, 25 pages.
FTScroller v0.2.2, Online available at https://github.com/ftlabs/ftscroller/tree/v0.2.2, Mar. 18, 2013, 9 pages.
Intention to Grant received for Danish Patent Application No. PA201970259, dated Mar. 23, 2021, 2 pages.
International Preliminary Report on Patentability received for PCT Patent Application No. PCT/US2019/049237, dated Mar. 25, 2021, 15 pages.
Narayanaswami et al., "Challenges and considerations for the design and production of a purpose-optimized body-worn wristwatch computer", Online available at https://www.spiedigitallibrary.org/conference-proceedings-of-spie/5443/0000/Challenges-and-considerations-for-the-design-and-production-of-a/10.1117/12.561263.short?SSO=1, Defense and Security, Florida, United States, Sep. 15, 2004, 13 pages.
Non-Final Office Action received for U.S. Appl. No. 15/818,500, dated Jul. 12, 2021, 18 pages.
Non-Final Office Action received for U.S. Appl. No. 16/871,995, dated Apr. 26, 2021, 14 pages.
Notice of Allowance received for Chinese Patent Application No. 201911127193.6, dated May 8, 2021, 4 pages (1 page of English Translation and 3 pages of Official Copy).
Notice of Allowance received for Japanese Patent Application No. 2019-138053, dated Jul. 2, 2021, 4 pages (1 page of English Translation and 3 pages of Official Copy).
Notice of Allowance received for Korean Patent Application No. 10-2020-7019035, dated Jun. 18, 2021, 4 pages (1 page of English Translation and 3 pages of Official Copy).
Notice of Allowance received for Korean Patent Application No. 10-2020-7022802, dated Mar. 4, 2021, 6 pages (2 pages of English Translation and 4 pages of Official Copy).
Notice of Allowance received for U.S. Appl. No. 16/263,280, dated Jun. 8, 2021, 8 pages.
Notice of Allowance received for U.S. Appl. No. 16/358,483, dated May 17, 2021, 5 pages.
Office Action received for Australian Patent Application No. 2019257521, dated Apr. 8, 2021, 6 pages.
Office Action received for Australian Patent Application No. 2019257521, dated Jul. 27, 2021, 6 pages.
Office Action received for Australian Patent Application No. 2019337519, dated Mar. 18, 2021, 5 pages.
Office Action received for European Patent Application No. 19156614.0, dated Jul. 16, 2021, 10 pages.
Office Action received for European Patent Application No. 19173371.6, dated Mar. 15, 2021, 6 pages.
Office Action received for European Patent Application No. 19173886.3, dated Mar. 16, 2021, 6 pages.
Office Action received for European Patent Application No. 20217518.8, dated Apr. 30, 2021, 8 pages.
Office Action received for Indian Patent Application No. 201818001531, dated Mar. 12, 2021, 6 pages.
Office Action received for Japanese Patent Application No. 2019-088503, dated Apr. 2, 2021, 6 pages (3 pages of English Translation and 3 pages of Official Copy).
Office Action received for Japanese Patent Application No. 2019-116590, dated Mar. 15, 2021, 6 pages (3 pages of English Translation and 3 pages of Official Copy).
Office Action received for Korean Patent Application No. 10-2021-7001482, dated Apr. 9, 2021, 10 pages (4 pages of English Translation and 6 pages of Official Copy).
Office Action received for Korean Patent Application No. 10-2021-7001918, dated May 7, 2021, 5 pages (2 pages of English Translation and 3 pages of Official Copy).
Office Action received for Korean Patent Application No. 10-2021-7005523, dated Mar. 31, 2021, 8 pages (3 pages of English Translation and 5 pages of Official Copy).
Office Action received for Korean Patent Application No. 10-2021-7017259, dated Jul. 19, 2021, 10 pages (4 pages of English Translation and 6 pages of Official Copy).
Office Action received for Taiwanese Patent Application No. 104107318, dated Jul. 9, 2021, 5 pages (2 pages of English Translation and 3 pages of Official Copy).
Advisory Action received for U.S. Appl. No. 15/818,500, dated Feb. 18, 2022, 4 pages.
Final Office Action received for U.S. Appl. No. 16/734,173, dated Feb. 22, 2022, 16 pages.
Notice of Allowance received for Japanese Patent Application No. 2019-088503, dated Feb. 18, 2022, 4 pages (1 page of English Translation and 3 pages of Official Copy).
Notice of Allowance received for U.S. Appl. No. 16/775,528, dated Feb. 24, 2022, 18 pages.
Office Action received for Indian Patent Application No. 202018011347, dated Mar. 2, 2022, 6 pages.
Applicant-Initiated Interview Summary received for U.S. Appl. No. 15/818,500, dated Jan. 24, 2022, 4 pages.
Applicant-Initiated Interview Summary received for U.S. Appl. No. 16/734,173, dated Jan. 25, 2022, 4 pages.
Non-Final Office Action received for U.S. Appl. No. 16/703,486, dated Jan. 27, 2022, 13 pages.
Non-Final Office Action received for U.S. Appl. No. 16/871,995, dated Feb. 1, 2022, 18 pages.

(56) References Cited

OTHER PUBLICATIONS

Non-Final Office Action received for U.S. Appl. No. 16/926,512, dated Jan. 21, 2022, 20 pages.
Office Action received for Korean Patent Application No. 10-2021-7017259, dated Jan. 10, 2022, 6 pages (3 pages of English Translation and 3 pages of Official Copy).
"Accepted Outlook Meetings Move to Deleted Folder", Available online at: https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 14/752,776, dated Aug. 31, 2018, 3 pages.
Advisory Action received for U.S. Appl. No. 16/734,173, dated Oct. 14, 2021, 3 pages.
"Android 2.3.4 User's Guide", Online available at: https://static.googleusercontent.com/media/www.google.com/en//help/hc/pdfs/mobile/AndroidUsersGuide-2.3.4.pdf, May 20, 2011, 384 pages.
Applicant Initiated Interview Summary received for U.S. Appl. No. 16/265,938, dated Mar. 11, 2020, 5 pages.
Applicant-Initiated Interview Summary received for U.S. Appl. No. 16/265,938, dated May 28, 2020, 5 pages.
Applicant-Initiated Interview Summary received for U.S. Appl. No. 17/103,436, dated Sep. 22, 2021, 2 pages.
"Clock & Calendar for Smartwatch 2", https://www.youtube.com/watch?v=Uj-K2vMnrj8, Nov. 20, 2013, 2 pages.
Decision to Grant received for European Patent Application No. 15739110.3, dated Sep. 19, 2019, 2 pages.
Ellis Benus, "Use a Phone Number in the Google Calendar Where Line for One Click Calling", Available online at: https://ellisbenus.com/ellis-benus/use-a-phone-number-in-the-google-calender-where-line-for-one-click-calling, Ellis Benus-Small Business Web Guru, Oct. 3, 2012, 2 pages.
Extended European Search Report (includes Partial European Search Report and European Search Opinion) received for European Patent Application No. 16190252.3, dated Mar. 1, 2017, 10 pages.
Extended European Search Report for European Application No. 19185318.3, dated Nov. 20, 2019, 8 pages.
Final Office Action received for U.S. Appl. No. 14/752,776, dated May 29, 2018, 36 pages.
Final Office Action received for U.S. Appl. No. 16/265,938, dated Apr. 7, 2020, 45 pages.
Intention to Grant received for European Patent Application No. 15739110.3, dated Mar. 7, 2019, 8 pages.
Intention to Grant received for European Patent Application No. 15739110.3, dated Sep. 11, 2019, 6 pages.
International Preliminary Report on Patentability received for PCT Patent Application No. PCT/US2015/038173, dated Jan. 5, 2017, 10 pages.
International Preliminary Report on Patentability received for PCT Patent Application No. PCT/US2015/038174, dated Jan. 5, 2017, 27 pages.
International Search Report and Written Opinion received for PCT Patent Application No. PCT/US2015/038173 dated Sep. 25, 2015, 13 pages.
International Search Report and Written Opinion received for PCT Patent Application No. PCT/US2015/038174, dated Jan. 18, 2016, 38 pages.
Invitation to Pay Additional Fees received for PCT Patent Application No. PCT/US2015/038174, dated Oct. 5, 2015, 5 pages.
Jepson, Tom, "How to auto-forward specific emails in gmail?", Available online at: <http://www.tomjepson.co.uk/how-to-auto-forward-specific-emails-in-gmail/>, May 19, 2013, 7 pages.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
"Microsoft Outlook 2010(TM) A Beginners Guide", Available online at: http://www.reading.ac.uk/web/files/its/outlook2010.pdf, Apr. 1, 2012, 24 pages.

Netsapiens, "Click to Call in MS Outlook", Available online at: <https://netsapiens.com/click-to-call-in-ms-outlook-windows-apps/>, May 4, 2012, 8 pages.
Non-Final Office Action received for U.S. Appl. No. 14/752,776, dated Jan. 2, 2018, 30 pages.
Non-Final Office Action received for U.S. Appl. No. 14/752,776, dated Nov. 5, 2018, 48 pages.
Non-Final Office Action received for U.S. Appl. No. 16/265,938, dated Nov. 4, 2019, 28 pages.
Non-Final Office Action received for U.S. Appl. No. 17/103,436, dated Aug. 18, 2021, 16 pages.
Non-Final Office Action received for U.S. Appl. No. 17/212,850, dated Oct. 8, 2021, 14 pages.
Notice of Acceptance received for Australian Patent Application No. 2015279544, dated Mar. 1, 2018, 3 pages.
Notice of Acceptance received for Australian Patent Application No. 2016231598, dated Mar. 1, 2018, 3 pages.
Notice of Acceptance received for Australian Patent Application No. 2018204286, dated Feb. 27, 2020, 3 pages.
Notice of Acceptance received for Australian Patent Application No. 2020203919, dated Sep. 3, 2021, 3 pages.
Notice of Acceptance received for Australian Patent Application No. 2015279545, dated Feb. 9, 2018, 3 pages.
Notice of Allowance received for Chinese Patent Application No. 201580029054.3, dated Jul. 19, 2019, 2 pages (1 page of English Translation and 1 page of Official Copy).
Notice of Allowance received for U.S. Appl. No. 16/265,938, dated Oct. 15, 2020, 8 pages.
Office Action received for Australian Patent Application No. 2015279544, dated Apr. 18, 2017, 4 pages.
Office Action received for Australian Patent Application No. 2015279544, dated Feb. 13, 2018, 5 pages.
Office Action received for Australian Patent Application No. 2016231598, dated Apr. 7, 2017, 5 pages.
Office Action received for Australian Patent Application No. 2018204286, dated Apr. 17, 2019, 5 pages.
Office Action received for Australian Patent Application No. 2018204286, dated Nov. 12, 2019, 5 pages.
Office Action received for Australian Patent Application No. 2018204286, dated Sep. 5, 2019, 5 pages.
Office Action received for Australian Patent Application No. 2019337519, dated Oct. 8, 2021, 7 pages.
Office Action received for Australian Patent Application No. 2020203919, dated Dec. 23, 2020, 5 pages.
Office Action received for Australian Patent Application No. 2020203919, dated Jul. 19, 2021, 7 pages.
Office Action received for Australian Patent Application No. 2020203919, dated Mar. 30, 2021, 5 pages.
Office Action received for Australian Patent Application No. 2020203919, dated Oct. 19, 2020, 5 pages.
Office Action received for Australian Patent Application No. 2015279545, dated Apr. 13, 2017, 3 pages.
Office Action received for Chinese Patent Application No. 201580029054.3, dated Dec. 5, 2018, 12 pages (6 pages of English Translation and 6 pages of Official Copy).
Office Action Received for European Patent Application No. 15739109.5, dated Jan. 31, 2018, 7 pages.
Office Action Received for European Patent Application No. 15739110.3, dated Jan. 31, 2018, 8 pages.
Office Action received for European Patent Application No. 16190252.3, dated Feb. 19, 2018, 7 pages.
Office Action received for Taiwanese Patent Application No. 104120843, dated Jan. 30, 2016, 5 pages (1 page of English Translation of Search Report and 4 pages of Official Copy).
"Remote Phone Call", Available online at: <https://web.archive.org/web/20140625104844/https://www.justremotephone.com/>, Jun. 25, 2014, 22 pages.
"Responding to a meeting invitation", Available online at: https://web.archive.org/web/20121128174157/https://www.zimbra.com/desktop7/help/en_US/Calendar/Responding_to_an_invitation.htm, Nov. 28, 2012, 1 page.
Summons to Attend Oral Proceedings received for European Patent Application No. 15739109.5, mailed on Aug. 23, 2018, 9 pages.

(56) References Cited

OTHER PUBLICATIONS

Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Tablet Talk, "Tablet Talk App: Frequently Asked Questions—Tablet Talk.", Online available at: https://web.archive.org/web/20140625102903/http:/1www.tablettalapp.com/faq, Jun. 25, 2014, pp. 1-6.
Applicant Initiated Interview Summary received for U.S. Appl. No. 16/871,995, dated Dec. 6, 2021, 4 pages.
Corrected Notice of Allowance received for U.S. Appl. No. 17/103,436, dated Dec. 22, 2021, 2 pages.
Intention to Grant received for European Patent Application No. 19185318.3, dated Dec. 10, 2021, 12 pages.
Notice of Acceptance received for Australian Patent Application No. 2019337519, dated Dec. 15, 2021, 3 pages.
Notice of Allowance received for U.S. Appl. No. 17/103,436, dated Dec. 8, 2021, 12 pages.
Office Action received for European Patent Application No. 19217240.1, dated Dec. 17, 2021, 8 pages.
Non-Final Office Action received for U.S. Appl. No. 16/734,173, dated Nov. 2, 2021, 13 pages.
Notice of Allowance received for Taiwanese Patent Application No. 104107318, dated Oct. 19, 2021, 5 pages (2 page of English Translation and 3 pages of Official Copy).
Office Action received for Indian Patent Application No. 202018012249, dated Nov. 1, 2021, 6 pages.
Office Action received for Japanese Patent Application No. 2021-510409, dated Oct. 8, 2021, 9 pages (5 pages of English Translation and 4 pages of Official Copy).
"Headset Button Controller v7.3 APK Full APP Download for Andriod, Blackberry, iPhone", Available online at: http://fullappdownload.com/headset-button-controller-v7-3-apk/, Jan. 27, 2014, 11 pages.
"The interview with a key person. IBM and CITIZEN met and applied Linux to a watch", ASCII Corporation, vol. 25, No. 12., Dec. 12, 2001, pp. 136-143.
"Watchpad 1.5.mpeg", YouTube.com, Online Available at <https://www.youtube.com/watch?v=7xjvVbeUn80>, Uploaded on Jun. 20, 2010, 2 pages.
"WatchPad 1.5", Online Available at: http://web.archive.org/web/20011205071448/http://www.trl.ibm.com:80/projects/ngm/index_e.htm, Dec. 5, 2001, 2 pages.
Advisory Action received for U.S. Appl. No. 14/641,308, dated Nov. 14, 2019, 4 pages.
Advisory Action received for U.S. Appl. No. 14/839,912, dated Nov. 14, 2019, 6 pages.
Advisory Action received for U.S. Appl. No. 14/841,646, dated Nov. 21, 2018, 5 pages.
Advisory Action received for U.S. Appl. No. 14/913,349, dated Oct. 29, 2019, 4 pages.
Advisory Action received for U.S. Appl. No. 15/049,052, dated Sep. 11, 2017, 2 pages.
Advisory Action received for U.S. Appl. No. 15/049,058, dated Oct. 18, 2017, 3 pages.
Advisory Action received for U.S. Appl. No. 15/049,064, dated May 10, 2017, 3 pages.
Advisory Action received for U.S. Appl. No. 16/144,950, dated Feb. 20, 2020, 5 pages.
Advisory Action received for U.S. Appl. No. 16/147,413, dated Nov. 25, 2019, 2019, 6 pages.
Agarwal Deepesh, "DexClock—Live Clock and Date Blended into Beautiful Artwork as Your Desktop Wallpaper", available at: https://www.megaleecher.net/DexCiock_Wallpaper_Designs, Jul. 6, 2013, 4 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant Initiated Interview Summary received for U.S. Appl. No. 14/913,345, dated Nov. 4, 2019, 5 pages.
Applicant Initiated Interview Summary received for U.S. Appl. No. 14/913,349, dated Oct. 7, 2019, 4 pages.
Applicant Initiated Interview Summary received for U.S. Appl. No. 15/655,253, dated Mar. 31, 2020, 5 pages.
Applicant Initiated Interview Summary received for U.S. Appl. No. 15/655,253, dated Nov. 12, 2019, 3 pages.
Applicant Initiated Interview Summary received for U.S. Appl. No. 16/144,950, dated Jan. 29, 2020, 5 pages.
Applicant Initiated Interview Summary received for U.S. Appl. No. 16/147,413, dated Oct. 28, 2019, 5 pages.
Applicant Initiated Interview Summary received for U.S. Appl. No. 16/384,726, dated Nov. 5, 2020, 3 pages.
Applicant Initiated Interview Summary received for U.S. Appl. No. 14/839,912, dated Nov. 5, 2019, 5 pages.
Applicant-Initiated Interview Summary received for U.S. Appl. No. 14/641,308, dated Oct. 10, 2019, 5 pages.
Applicant-Initiated Interview Summary received for U.S. Appl. No. 15/655,253, dated Nov. 30, 2020, 5 pages.
Applicant-Initiated Interview Summary received for U.S. Appl. No. 15/818,500, dated Jan. 30, 2020, 5 pages.
Applicant-Initiated Interview Summary received for U.S. Appl. No. 15/818,500, dated Oct. 13, 2020, 4 pages.
Applicant-Initiated Interview Summary received for U.S. Appl. No. 15/930,300, dated Oct. 27, 2020, 3 pages.
Applicant-Initiated Interview Summary received for U.S. Appl. No. 16/147,413, dated Jun. 2, 2020, 4 pages.
Applicant-Initiated Interview Summary received for U.S. Appl. No. 16/263,280, dated Nov. 25, 2020, 3 pages.
Applicant-Initiated Interview Summary received for U.S. Appl. No. 16/358,483, dated Sep. 28, 2020, 6 pages.
Applicant-Initiated Interview Summary received for U.S. Appl. No. 16/525,082, dated Jul. 28, 2020, 4 pages.
Applicant-Initiated Interview Summary received for U.S. Appl. No. 16/734,173, dated Feb. 25, 2021, 3 pages.
Applicant-Initiated Interview Summary received for U.S. Appl. No. 16/775,528, dated Feb. 23, 2021, 4 pages.
Askabouttech, "How to Change Android Smartwatch Wallpaper", also online available at: https://www.youtube.com/watch?v=SBYrsyuHqBA (Year: 2014), Jul. 12, 2014, 5 pages.
Brinkmann Martin, "How to Zoom in Firefox", Ghacks, Available at: <https://web.archive.org/web/20130804034728/https://www.ghacks.net/2009/02/23/how-to-zoom-in-firefox/>, Feb. 23, 2009, 11 pages.
Colt Sam, "Here's One Way Apple's Smartwatch Could Be Better Than Anything Else", Business Insider, Aug. 21, 2014, pp. 1-4.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 pages.
Corrected Notice of Allowance received for U.S. Appl. No. 14/641,252, dated May 10, 2018, 10 pages.
Corrected Notice of Allowance received for U.S. Appl. No. 14/641,308, dated Mar. 10, 2020, 4 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.

(56) References Cited

OTHER PUBLICATIONS

Corrected Notice of Allowance received for U.S. Appl. No. 14/913,345, dated Apr. 13, 2020, 4 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 15/930,300, dated Dec. 24, 2020, 3 pages.
Corrected Notice of Allowance received for U.S. Appl. No. 16/055,489, dated Feb. 26, 2019, 2 pages.
Corrected Notice of Allowance received for U.S. Appl. No. 16/109,120, dated Nov. 12, 2019, 2 pages.
Corrected Notice of Allowance received for U.S. Appl. No. 16/147,413, dated Jan. 8, 2021, 7 pages.
Corrected Notice of Allowance received for U.S. Appl. No. 16/147,413, dated Nov. 25, 2020, 7 pages.
Corrected Notice of Allowance received for U.S. Appl. No. 16/147,413, dated Sep. 17, 2020, 7 pages.
Corrected Notice of Allowance received for U.S. Appl. No. 16/358,483, dated Feb. 12, 2021, 4 pages.
Corrected Notice of Allowance received for U.S. Appl. No. 16/384,726, dated Apr. 2, 2021, 2 pages.
Decision on Appeal received for Korean Patent Application No. 10-2016-7008449, dated Jul. 30, 2019, 29 pages.
Decision on Appeal received for Korean Patent Application No. 10-2016-7008474, dated Jan. 29, 2020, 21 pages.
Decision on Appeal received for Korean Patent Application No. 10-2016-7008488, dated Oct. 18, 2019, 33 pages.
Decision on Appeal received for Korean Patent Application No. 10-2018-7010872, dated Jan. 20, 2020, 20 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for Danish Patent Application No. PA201770181, dated Mar. 7, 2018, 2 pages.
Decision to Grant received for Danish Patent Application No. PA201770794, dated Nov. 11, 2019, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for European Patent Application No. 14772001.5, dated Dec. 5, 2019, 2 pages.
Decision to Grant received for European Patent Application No. 14772002.3, dated Feb. 20, 2020, 2 pages.
Decision to Grant received for European Patent Application No. 14772494.2, dated Jul. 23, 2020, 2 pages.
Decision to Grant received for European Patent Application No. 15782209.9, dated Feb. 14, 2019, 2 pages.
Decision to Grant received for European Patent Application No. 18157131.6, dated May 16, 2019, 2 pages.
Decision to Grant received for European Patent Application No. 19199004.3, dated Jan. 21, 2021, 2 pages.
Dewsbery Victor, "Designing for Small Screens", AVA Publishing, 2005, 27 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19199004.3, dated Nov. 12, 2019, 6 pages.
European Search Report received for European Patent Application No. 19206249.5, dated Dec. 19, 2019, 4 pages.
Examiner-Initiated Interview Summary received for U.S. Appl. No. 14/913,349, dated Oct. 27, 2020, 3 pages.
Extended European Search Report received for European Patent Application No. 19156614.0, dated May 28, 2019, 9 pages.
Extended European Search Report received for European Patent Application No. 19195247.2, dated Mar. 9, 2020, 7 pages.
Extended European Search Report received for European Patent Application No. 19217240.1, dated May 25, 2020, 7 pages.
Extended European Search Report received for European Patent Application No. 20190670.8, dated Nov. 2, 2020, 10 pages.
Feng Lipeng, "Bound for computer lovers", Dec. 31, 2009, 2 pages.
Final Office Action received for U.S. Appl. No. 13/038,276, dated Mar. 27, 2014, 24 pages.
Final Office Action received for U.S. Appl. No. 13/038,276, dated Mar. 11, 2016, 36 pages.
Final Office Action received for U.S. Appl. No. 14/641,308, dated Jul. 1, 2019, 46 pages.
Final Office Action received for U.S. Appl. No. 14/641,308, dated Mar. 14, 2018, 42 pages.
Final Office Action received for U.S. Appl. No. 14/830,629, dated Apr. 16, 2018, 27 pages.
Final Office Action received for U.S. Appl. No. 14/841,646, dated Aug. 2, 2018, 22 pages.
Final Office Action received for U.S. Appl. No. 14/913,345, dated Oct. 26, 2018, 20 pages.
Final Office Action received for U.S. Appl. No. 14/913,349, dated Jul. 22, 2019, 20 pages.
Final Office Action received for U.S. Appl. No. 14/913,349, dated Jul. 30, 2018, 18 pages.
Final Office Action received for U.S. Appl. No. 14/913,349, dated Oct. 30, 2020, 33 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Final Office Action received for U.S. Appl. No. 15/655,253, dated Feb. 4, 2020, 20 pages.
Final Office Action received for U.S. Appl. No. 15/655,253, dated Feb. 9, 2021, 16 pages.
Final Office Action received for U.S. Appl. No. 15/818,500, dated Apr. 6, 2020, 15 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Final Office Action received for U.S. Appl. No. 16/263,280, dated Mar. 4, 2021, 13 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for Danish Patent Application No. PA201770794, dated Aug. 15, 2019, 2 pages.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for European Patent Application No. 14772001.5, dated Jul. 18, 2019, 16 pages.
Intention to Grant received for European Patent Application No. 14772001.5, dated Mar. 22, 2019, 17 pages.

(56) References Cited

OTHER PUBLICATIONS

Intention to Grant received for European Patent Application No. 14772002.3, dated Jun. 24, 2019, 9 pages.
Intention to Grant received for European Patent Application No. 14772002.3, dated Nov. 6, 2019, 9 pages.
Intention to Grant received for European Patent Application No. 14772494.2, dated Mar. 16, 2020, 10 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
Intention to Grant received for European Patent Application No. 19199004.3, dated Sep. 14, 2020, 9 pages.
Intention to Grant received for Indian Patent Application No. 201617009216, dated Aug. 27, 2020, 2 pages.
International Preliminary Report on Patentability received for PCT Patent Application No. PCT/US2012/025519, dated Sep. 12, 2013, 6 pages.
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053957, dated Mar. 17, 2016, 8 pages.
International Preliminary Report on Patentability received for PCT Patent Application No. PCT/US2014/053958, dated Mar. 17, 2016, 8 pages.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/045936, dated Mar. 16, 2017, 9 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/047704, dated Mar. 16, 2017, 19 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 pages.
International Search Report and Written Opinion received for PCT Patent Application No. PCT/US2012/025519, dated Jun. 11, 2012, 7 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/047704, dated Feb. 22, 2016, 25 pages.
International Search Report and Written Opinion received for PCT Patent Application No. PCT/US2015/054310, dated Jan. 20, 2016, 10 pages.
International Search Report and Written Opinion received for PCT Patent Application No. PCT/US2016/019637, dated Aug. 18, 2016, 18 pages.
International Search Report and Written Opinion received for PCT Patent Application No. PCT/US2019/049237, dated Jan. 8, 2020, 21 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fees received for PCT Patent Application No. PCT/US2014/053961, dated Aug. 3, 2015, 6 pages.
Invitation to Pay Additional Fees received for PCT Patent Application No. PCT/US2015/047704, dated Dec. 16, 2015, 10 pages.
Invitation to Pay Additional Fees received for PCT Patent Application No. PCT/US2016/019637, dated Jun. 1, 2016, 6 pages.
Invitation to Pay Additional Fees received for PCT Patent Application No. PCT/US2019/049237, dated Oct. 31, 2019, 18 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, 24 pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/829,573, dated Jan. 22, 2018, 26 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/841,646, dated Dec. 1, 2017, 23 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,349, dated Apr. 2, 2019, 15 pages.
Non-Final Office Action received for U.S. Appl. No. 14/913,349, dated Apr. 22, 2020, 20 pages.
Non-Final Office Action received for U.S. Appl. No. 14/913,349, dated Jan. 2, 2020, 25 pages.

(56) References Cited

OTHER PUBLICATIONS

Non-Final Office Action received for U.S. Appl. No. 14/913,349, dated Jan. 11, 2018, 6 pages.
Non-Final Office Action received for U.S. Appl. No. 14/913,350, dated May 14, 2018, 30 pages.
Non-Final Office Action received for U.S. Appl. No. 15/049,049 dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/655,253, dated Jul. 10, 2019, 16 pages.
Non-Final Office Action received for U.S. Appl. No. 15/655,253, dated Sep. 10, 2020, 17 pages.
Non-Final Office Action received for U.S. Appl. No. 15/818,500, dated Aug. 30, 2019, 17 pages.
Non-Final Office Action received for U.S. Appl. No. 16/144,950, dated Mar. 6, 2019, 24 pages.
Non-Final Office Action received for U.S. Appl. No. 16/147,413, dated Mar. 11, 2020, 22 pages.
Non-Final Office Action received for U.S. Appl. No. 16/147,413, dated Feb. 7, 2019, 18 pages.
Non-Final Office Action received for U.S. Appl. No. 16/263,280, dated Jul. 27, 2020, 11 pages.
Non-Final Office Action received for U.S. Appl. No. 16/358,483, dated May 1, 2020, 37 pages.
Non-Final Office Action received for U.S. Appl. No. 16/384,726, dated May 14, 2020, 16 pages.
Non-Final Office Action received for U.S. Appl. No. 16/525,082, dated Jul. 9, 2020, 20 pages.
Non-Final Office Action received for U.S. Appl. No. 16/734,173, dated Jan. 6, 2021, 14 pages.
Non-Final Office Action received for U.S. Appl. No. 16/734,173, dated Jul. 23, 2020, 16 pages.
Non-Final Office Action received for U.S. Appl. No. 16/775,528, dated Nov. 20, 2020, 15 pages.
Non-Final Office Action received for U.S. Appl. No. 14/839,912, dated Feb. 12, 2018, 30 pages.
Non-Final Office Action received for U.S. Appl. No. 14/913,345, dated Jun. 26, 2019, 23 pages.
Non-Final Office Action Received for U.S. Appl. No. 14/839,912, dated Jun. 8, 2017, 26 pages.
Notice of Acceptance received for Australian Patent Application No. 2014315319, dated Oct. 12, 2017, 3 pages.
Notice of Acceptance received for Australian Patent Application No. 2014315324, dated Sep. 28, 2017, 3 pages.
Notice of Acceptance received for Australian Patent Application No. 2014315325, dated Apr. 19, 2017, 3 pages.
Notice of Acceptance received for Australian Patent Application No. 2017276285, dated Apr. 3, 2019, 3 pages.
Notice of Acceptance received for Australian Patent Application No. 2018200289, dated Jul. 23, 2019, 3 pages.
Notice of Acceptance received for Australian Patent Application No. 2019201628, dated Sep. 10, 2019, 3 pages.
Notice of Acceptance received for Australian Patent Application No. 2019206101, dated Dec. 11, 2020, 3 pages.
Notice of Acceptance received for Australian Patent Application No. 2019272034, dated Dec. 14, 2020, 3 pages.
Notice of Allowance and Search Report received for Taiwanese Patent Application No. 104128687, dated Jun. 7, 2016, 4 pages.
Notice of Allowance received for Chinese Patent Application No. 201480059543.9, dated Sep. 4, 2019, 2 pages.
Notice of Allowance received for Chinese Patent Application No. 201480060044.1, dated Mar. 29, 2019, 3 pages.
Notice of Allowance received for Chinese Patent Application No. 201480060082.7, dated Mar. 12, 2019, 2 pages.
Notice of Allowance received for Chinese Patent Application No. 201580077206.7, dated Feb. 3, 2021, 2 pages.
Notice of Allowance received for Chinese Patent Application No. 201810074876.9, dated Jan. 12, 2021, 2 pages.
Notice of Allowance received for Chinese Patent Application No. 201910454069.4, dated Nov. 2, 2020, 7 pages.
Notice of Allowance received for Chinese Patent Application No. 201910454076.4, dated Feb. 4, 2021, 2 pages.
Notice of Allowance received for Danish Patent Application No. PA201570776, dated Feb. 8, 2017, 2 pages.
Notice of Allowance received for Danish Patent Application No. PA201670118, dated Mar. 30, 2017, 2 pages.
Notice of Allowance received for Japanese Patent Application No. 2016-537945, dated Aug. 3, 2018, 4 pages.
Notice of Allowance received for Japanese Patent Application No. 2016-537946, dated Mar. 26, 2018, 4 pages.
Notice of Allowance received for Japanese Patent Application No. 2016-537947, dated Jun. 5, 2017, 6 pages.
Notice of Allowance received for Japanese Patent Application No. 2016-537948, dated Nov. 11, 2019, 3 pages.
Notice of Allowance received for Japanese Patent Application No. 2017-545561, dated Jul. 12, 2019, 4 pages.
Notice of Allowance received for Japanese Patent Application No. 2018-083313, dated Jul. 1, 2019, 4 pages.
Notice of Allowance received for Japanese Patent Application No. 2018-090084, dated May 24, 2019, 4 pages.
Notice of Allowance received for Japanese Patent Application No. 2018-143982, dated Apr. 8, 2019, 4 pages.
Notice of Allowance received for Korean Patent Application No. 10-2016-7008449, dated Aug. 9, 2019, 6 pages.
Notice of Allowance received for Korean Patent Application No. 10-2016-7008488, dated Oct. 25, 2019, 4 pages.
Notice of Allowance received for Korean Patent Application No. 10-2018-7002695, dated Oct. 8, 2018, 5 pages.
Notice of Allowance received for Korean Patent Application No. 10-2018-7010872, dated Feb. 10, 2020, 6 pages.
Notice of Allowance received for Korean Patent Application No. 10-2018-7013265, dated Apr. 1, 2020, 4 pages.
Notice of Allowance received for Korean Patent Application No. 10-2018-7032106, dated Jun. 28, 2019, 5 pages.
Notice of Allowance received for Korean Patent Application No. 10-2019-7007748, dated May 6, 2020, 5 pages.
Notice of Allowance received for Taiwanese Patent Application No. 103130517, dated May 14, 2018, 5 pages.
Notice of Allowance received for Taiwanese Patent Application No. 103130518, dated May 19, 2016, 6 pages.
Notice of Allowance received for Taiwanese Patent Application No. 103130519, dated Oct. 27, 2016, 3 pages.
Notice of Allowance received for Taiwanese Patent Application No. 103130520, dated Apr. 25, 2018, 4 pages.
Notice of Allowance received for Taiwanese Patent Application No. 104107327, dated Jul. 19, 2019, 5 pages.
Notice of Allowance received for Taiwanese Patent Application No. 104107333, dated Nov. 8, 2016, 2 pages.
Notice of Allowance received for Taiwanese Patent Application No. 104107334, dated Jan. 26, 2017, 3 pages.
Notice of Allowance received for Taiwanese Patent Application No. 104133281, dated Mar. 29, 2018, 4 pages.
Notice of Allowance received for U.S. Appl. No. 13/038,276, dated Nov. 3, 2016, 10 pages.

(56) References Cited

OTHER PUBLICATIONS

Notice of Allowance received for U.S. Appl. No. 13/038,276, dated Nov. 30, 2016, 2 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 pages.
Notice of Allowance received for U.S. Appl. No. 14/641,252, dated Apr. 11, 2018, 14 pages.
Notice of Allowance received for U.S. Appl. No. 14/641,252, dated Jul. 18, 2018, 9 pages.
Notice of Allowance received for U.S. Appl. No. 14/641,308, dated Jan. 15, 2020, 7 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/839,914, dated Jun. 22, 2018, 12 pages.
Notice of Allowance received for U.S. Appl. No. 14/841,646, dated Apr. 18, 2019, 7 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/913,345, dated Feb. 10, 2020, 10 pages.
Notice of Allowance received for U.S. Appl. No. 14/913,350, dated Dec. 19, 2018, 27 pages.
Notice of Allowance received for U.S. Appl. No. 15/049,049, dated Jul. 25, 2019, 8 pages.
Notice of Allowance received for U.S. Appl. No. 15/049,052, dated Sep. 16, 2019, 5 pages.
Notice of Allowance received for U.S. Appl. No. 15/049,064, dated Jul. 18, 2017, 24 pages.
Notice of Allowance received for U.S. Appl. No. 15/818,500, dated Feb. 22, 2021, 11 pages.
Notice of Allowance received for U.S. Appl. No. 15/927,768, dated May 31, 2019, 13 pages.
Notice of Allowance received for U.S. Appl. No. 15/930,300, dated Aug. 5, 2020, 14 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Notice of Allowance received for U.S. Appl. No. 16/109,120, dated Sep. 11, 2019, 12 pages.
Notice of Allowance received for U.S. Appl. No. 16/144,950, dated Mar. 19, 2020, 14 pages.
Notice of Allowance received for U.S. Appl. No. 16/147,413, dated Jul. 20, 2020, 11 pages.
Notice of Allowance received for U.S. Appl. No. 16/147,413, dated Nov. 5, 2020, 10 pages.
Notice of Allowance received for U.S. Appl. No. 16/358,483, dated Jan. 19, 2021, 9 pages.
Notice of Allowance received for U.S. Appl. No. 16/384,726, dated Mar. 17, 2021, 9 pages.
Notice of Allowance received for U.S. Appl. No. 16/525,082, dated Aug. 20, 2020, 5 pages.
Notice of Allowance received for U.S. Appl. No. 16/525,082, dated Nov. 17, 2020, 7 pages.
Office Action and Search Report received for Danish Patent Application No. PA 201670118, dated Jul. 1, 2016, 7 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2014315325, dated Nov. 3, 2016, 3 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2017254897, dated Aug. 29, 2018, 4 pages.
Office Action received for Australian Patent Application No. 2017254897, dated Jun. 28, 2019, 4 pages.
Office Action received for Australian Patent Application No. 2017276285, dated Nov. 26, 2018, 2 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2019201628, dated May 13, 2019, 2 pages.
Office Action received for Australian Patent Application No. 2019206101, dated Jul. 14, 2020, 4 pages.
Office Action received for Australian Patent Application No. 2019216614, dated Apr. 1, 2020, 4 pages.
Office Action received for Australian Patent Application No. 2019216614, dated Aug. 13, 2020, 4 pages.
Office Action received for Australian Patent Application No. 2019216614, dated Aug. 22, 2019, 3 pages.
Office Action received for Australian Patent Application No. 2019257521, dated Aug. 7, 2020, 5 pages.
Office Action received for Australian Patent Application No. 2019257521, dated Oct. 21, 2020, 6 pages.
Office Action received for Australian Patent Application No. 2019272034, dated Sep. 14, 2020, 4 pages.
Office Action received for Australian Patent Application No. 2014315234, dated Apr. 19, 2017, 4 pages.
Office Action received for Chinese Patent Application No. 201480059543.9, dated Feb. 28, 2019, 16 pages.
Office Action received for Chinese Patent Application No. 201480059543.9, dated Jan. 26, 2018, 17 pages.
Office Action received for Chinese Patent Application No. 201480059543.9, dated Sep. 19, 2018, 18 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Chinese Patent Application No. 201480060082.7, dated Jan. 26, 2018, 15 pages.
Office Action received for Chinese Patent Application No. 201480060082.7, dated Sep. 25, 2018, 6 pages.
Office Action received for Chinese Patent Application No. 201480060083.1, dated Aug. 13, 2019, 6 pages.
Office Action received for Chinese Patent Application No. 201480060083.1, dated Dec. 5, 2018, 11 pages.
Office Action received for Chinese Patent Application No. 201580046339.8, dated Feb. 26, 2019, 18 pages.
Office Action received for Chinese Patent Application No. 201580046339.8, dated Jun. 3, 2020, 19 pages.
Office Action received for Chinese Patent Application No. 201580046339.8, dated Oct. 19, 2020, 12 pages.

(56) References Cited

OTHER PUBLICATIONS

Office Action received for Chinese Patent Application No. 201580046339.8, dated Oct. 31, 2019, 9 pages.
Office Action received for Chinese Patent Application No. 201580077206.7, dated Feb. 3, 2020, 29 pages.
Office Action received for Chinese Patent Application No. 201580077206.7, dated Nov. 11, 2020, 11 pages.
Office Action received for Chinese Patent Application No. 201680012759.9, dated Jun. 19, 2020, 18 pages.
Office Action received for Chinese Patent Application No. 201810074876.9, dated Jul. 31, 2020, 11 pages.
Office Action received for Chinese Patent Application No. 201910164962.3, dated Apr. 8, 2020, 25 pages.
Office Action received for Chinese Patent Application No. 201910164962.3, dated Jan. 12, 2021, 14 pages.
Office Action received for Chinese Patent Application No. 201910164962.3, dated Sep. 18, 2020, 19 pages.
Office Action received for Chinese Patent Application No. 201910454069.4, dated Dec. 20, 2019, 6 pages.
Office Action received for Chinese Patent Application No. 201910454069.4, dated Jul. 24, 2020, 8 pages.
Office Action received for Chinese Patent Application No. 201910454076.4, dated Dec. 18, 2019, 14 pages.
Office Action received for Chinese Patent Application No. 201910454076.4, dated Oct. 16, 2020, 14 pages.
Office Action received for Chinese Patent Application No. 201911127193.6, dated Dec. 17, 2020, 21 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201770181, dated Jan. 3, 2018, 2 pages.
Office Action received for Danish Patent Application No. PA201770181, dated Jun. 13, 2017, 6 pages.
Office Action received for Danish Patent Application No. PA201770794, dated Apr. 5, 2018, 4 pages.
Office Action received for Danish Patent Application No. PA201770794, dated Dec. 19, 2017, 8 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for Danish Patent Application No. PA201970259, dated Jan. 15, 2020, 4 pages.
Office Action received for Danish Patent Application No. PA201970259, dated Nov. 23, 2020, 3 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 14772002.3, dated Jul. 4, 2017, 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 16710372.0, dated Feb. 22, 2019, 7 pages.
Office Action received for European Patent Application No. 18157131.6, dated May 8, 2018, 12 pages.
Office Action received for European Patent Application No. 19173371.6, dated Nov. 12, 2019, 11 pages.
Office Action received for European Patent Application No. 19173886.3, dated Nov. 12, 2019, 9 pages.
Office Action received for European Patent Application No. 19199004.3, dated Nov. 22, 2019, 10 pages.
Office Action received for European Patent Application No. 19206249.5, dated Jan. 11, 2021, 8 pages.
Office Action received for European Patent Application No. 19206249.5, dated Jan. 20, 2020, 8 pages.
Office Action received for Indian Patent Application No. 201617008291, dated Jan. 14, 2020, 7 pages.
Office Action received for Indian Patent Application No. 201617008296, dated Jan. 14, 2020, 7 pages.
Office Action received for Indian Patent Application No. 201617009216, dated Jan. 24, 2020, 6 pages.
Office Action received for Indian Patent Application No. 201617009428, dated Feb. 26, 2020, 7 pages.
Office Action received for Japanese Patent Application No. 2016-537945, dated Apr. 7, 2017, 6 pages.
Office Action received for Japanese Patent Application No. 2016-537945, dated Jan. 9, 2018, 5 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2016-537947, dated Feb. 24, 2017, 6 pages.
Office Action received for Japanese Patent Application No. 2016-537948, dated Apr. 6, 2018, 5 pages.
Office Action received for Japanese Patent Application No. 2016-537948, dated Jun. 9, 2017, 10 pages.
Office Action received for Japanese Patent Application No. 2016-537948, dated Sep. 3, 2018, 4 pages.
Office Action received for Japanese Patent Application No. 2017-545561, dated Aug. 6, 2018, 8 pages.
Office Action received for Japanese Patent Application No. 2018-083313, dated Feb. 12, 2019, 4 pages.
Office Action received for Japanese Patent Application No. 2018-090084, dated Feb. 15, 2019, 6 pages.
Office Action received for Japanese Patent Application No. 2018-143982, dated Dec. 7, 2018, 10 pages.
Office Action received for Japanese Patent Application No. 2019-088503, dated Jul. 31, 2020, 7 pages.
Office Action received for Japanese Patent Application No. 2019-116590, dated Oct. 5, 2020, 6 pages.
Office Action received for Japanese Patent Application No. 2019-138053, dated Oct. 2, 2020, 6 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2016-7008474, dated Aug. 6, 2018, 10 pages.
Office Action received for Korean Patent Application No. 10-2016-7008474, dated Dec. 30, 2016, 10 pages.
Office Action received for Korean Patent Application No. 10-2016-7008474, dated May 15, 2018, 7 pages.
Office Action received for Korean Patent Application No. 10-2016-7008474, dated Nov. 27, 2017, 6 pages.

(56) References Cited

OTHER PUBLICATIONS

Office Action received for Korean Patent Application No. 10-2016-7008488, dated Feb. 8, 2018, 8 pages.
Office Action received for Korean Patent Application No. 10-2016-7008488, dated Jan. 12, 2017, 14 pages.
Office Action received for Korean Patent Application No. 10-2016-7008488, dated Nov. 27, 2017, 6 pages.
Office Action received for Korean Patent Application No. 10-2016-7008682, dated Dec. 30, 2016, 11 pages.
Office Action received for Korean Patent Application No. 10-2016-7008682, dated Feb. 8, 2018, 7 pages.
Office Action received for Korean Patent Application No. 10-2016-7008682, dated Nov. 27, 2017, 7 pages.
Office Action received for Korean Patent Application No. 10-2017-7024506, dated Aug. 12, 2019, 6 pages.
Office Action received for Korean Patent Application No. 10-2017-7024506, dated Feb. 19, 2020, 12 pages.
Office Action received for Korean Patent Application No. 10-2017-7024506, dated Jul. 8, 2020, 6 pages.
Office Action received for Korean Patent Application No. 10-2017-7024506, dated Sep. 28, 2018, 11 pages.
Office Action received for Korean Patent Application No. 10-2018-7002695, dated Feb. 27, 2018, 12 pages.
Office Action received for Korean Patent Application No. 10-2018-7002695, dated Jun. 19, 2018, 8 pages.
Office Action received for Korean Patent Application No. 10-2018-7010872, dated Dec. 21, 2018, 7 pages.
Office Action received for Korean Patent Application No. 10-2018-7010872, dated May 21, 2018, 10 pages.
Office Action received for Korean Patent Application No. 10-2018-7013265, dated Aug. 10, 2018, 12 pages.
Office Action received for Korean Patent Application No. 10-2018-7013265, dated Jun. 14, 2019, 6 pages.
Office Action received for Korean Patent Application No. 10-2018-7032106, dated Dec. 26, 2018, 10 pages.
Office Action received for Korean Patent Application No. 10-2018-7033888, dated Jul. 7, 2020, 7 pages.
Office Action received for Korean Patent Application No. 10-2018-7033888, dated Nov. 28, 2019, 10 pages.
Office Action received for Korean Patent Application No. 10-2018-7033888, dated Oct. 19, 2020, 10 pages.
Office Action received for Korean Patent Application No. 10-2019-7007748, dated Nov. 15, 2019, 9 pages.
Office Action received for Korean Patent Application No. 10-2019-7028736, dated May 7, 2020, 8 pages.
Office Action received for Korean Patent Application No. 10-2019-7028736, dated Nov. 28, 2019, 8 pages.
Office Action received for Korean Patent Application No. 10-2019-7028736, dated Oct. 22, 2020, 6 pages.
Office Action received for Korean Patent Application No. 10-2020-7019035, dated Aug. 28, 2020, 6 pages.
Office Action received for Korean Patent Application No. 10-2020-7022802, dated Aug. 28, 2020, 7 pages.
Office Action received for Korean Patent Application No. 10-2018-7010872, dated Feb. 13, 2019, 7 pages.
Office Action received for Taiwan Patent Application No. 103130519, dated Mar. 25, 2016, 14 pages.
Office Action received for Taiwanese Patent Application No. 103130517, dated Feb. 6, 2018, 5 pages.
Office Action received for Taiwanese Patent Application No. 103130517, dated Feb. 22, 2016, 7 pages.
Office Action received for Taiwanese Patent Application No. 103130517, dated Jul. 29, 2016, 7 pages.
Office Action received for Taiwanese Patent Application No. 103130518, dated Oct. 15, 2015, 7 pages.
Office Action received for Taiwanese Patent Application No. 103130520, dated Apr. 17, 2017, 8 pages.
Office Action received for Taiwanese Patent Application No. 103130520, dated Jan. 23, 2018, 5 pages.
Office Action received for Taiwanese Patent Application No. 103130520, dated May 23, 2016, 38 pages.
Office Action received for Taiwanese Patent Application No. 103130520, dated Oct. 1, 2015, 58 pages.
Office Action received for Taiwanese Patent Application No. 103130520, dated Sep. 29, 2016, 39 pages.
Office Action received for Taiwanese Patent Application No. 104107318, dated Dec. 26, 2018, 33 pages.
Office Action received for Taiwanese Patent Application No. 104107318, dated Feb. 18, 2020, 10 pages.
Office Action received for Taiwanese Patent Application No. 104107327, dated Sep. 28, 2018, 7 pages.
Office Action received for Taiwanese Patent Application No. 104107329, dated Jul. 24, 2020, 7 pages.
Office Action received for Taiwanese Patent Application No. 104107329, dated Mar. 5, 2020, 22 pages.
Office Action received for Taiwanese Patent Application No. 104107333, dated May 17, 2016, 6 pages.
Office Action received for Taiwanese Patent Application No. 104107334, dated Sep. 19, 2016, 15 pages.
Office Action received for Taiwanese Patent Application No. 104128701, dated Jul. 22, 2016, 25 pages.
Office Action received for Taiwanese Patent Application No. 104128701, dated Mar. 16, 2017, 8 pages.
Office Action received for Taiwanese Patent Application No. 104133281, dated Mar. 30, 2017, 10 pages.
Office Action received for Taiwanese Patent Application No. 104133281, dated Sep. 1, 2016, 10 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Pedersen Isabel, "Ready to Wear (or Not) Examining the Rhetorical Impact of Proposed Wearable Devices", 2013 IEEE International Symposium on Technology and Society (ISTAS) Social Implications of Wearable Computing and Augmediated Reality III Everyday Life, Dec. 31, 2013, pp. 201-202.
Raghunath et al., "User Interfaces for Applications on a Wrist Watch", Personal and Ubiquitous Computing, vol. 6, Springer Verlag, London, Ltd., 2002, pp. 17-30.
Rev. Some Culture, "It's super easy for middle-aged and elderly people to learn compute", Jul. 31, 2013, 2 pages.
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.
Search Report received for Danish Patent Application No. PA201570781, dated Mar. 8, 2016, 10 pages.
Search Report received for European Patent Application No. 18157131.6, dated Apr. 19, 2018, 4 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Supplemental Notice of Allowance received for U.S. Appl. No. 15/818,500, dated Mar. 5, 2021, 2 pages.
The Window Club, "How to Set GIF as Background Windows 7", Online Available at <https://www.youtube.com/watch?v=tUec42Qd7ng>, Dec. 24, 2012, pp. 1-5.
Tong et al., "Discussion About the Influence of Wearable Device on Mobile Operators' Service", Telecom science, Oct. 31, 2014, pp. 134-142.
Wikipedia, "Rotary encoder", Online Available at: <https://en.wikipedia.org/wiki/Rotary_encoder>, Retrieved on May 17, 2017, 17 pages.
WZ Science Alliance, "Very simple geriatrics computer and Internet bestselling upgrade", Sep. 30, 2013, 3 pages.
Yang et al., "U.S. Appl. No. 62/004,886, filed May 29, 2014, titled "User Interface for Payments"", 198 pages.
Applicant-Initiated Interview Summary received for U.S. Appl. No. 16/734,173, dated Mar. 21, 2022, 3 pages.

(56) References Cited

OTHER PUBLICATIONS

Examiner's Answer to Appeal Brief received for U.S. Appl. No. 15/655,253, dated Mar. 10, 2022, 16 pages.
Office Action received for Indian Patent Application No. 202018014953, dated Mar. 7, 2022, 7 pages.
Office Action received for Korean Patent Application No. 10-2021-7017259, dated Mar. 3, 2022, 8 pages (4 pages of English Translation and 4 pages of Official Copy).
Advisory Action received for U.S. Appl. No. 16/734,173, dated Apr. 4, 2022, 5 pages.
Applicant-Initiated Interview Summary received for U.S. Appl. No. 16/703,486, dated May 12, 2022, 4 pages.
Applicant-Initiated Interview Summary received for U.S. Appl. No. 16/871,995, dated Apr. 5, 2022, 5 pages.
Applicant-Initiated Interview Summary received for U.S. Appl. No. 16/926,512, dated Apr. 21, 2022, 4 pages.
Corrected Notice of Allowance received for U.S. Appl. No. 16/775,528, dated Mar. 25, 2022, 2 pages.
Decision on Appeal received for U.S. Appl. No. 14/913,349, dated Apr. 20, 2022, 13 pages.
Decision to Grant received for European Patent Application No. 19185318.3, dated Mar. 31, 2022, 3 pages.
Extended European Search Report received for European Patent Application No. 22157106.0, dated Jun. 27, 2022, 8 pages.
Final Office Action received for U.S. Appl. No. 17/212,850, dated Jun. 1, 2022, 14 pages.
Notice of Acceptance received for Australian Patent Application No. 2021201748, dated Jun. 23, 2022, 3 pages.
Notice of Allowance received for Chinese Patent Application No. 201910447678.7, dated Jun. 20, 2022, 2 pages (1 page of English Translation and 1 page of Official Copy).
Notice of Allowance received for Chinese Patent Application No. 202110396782.5, dated Mar. 30, 2022, 5 pages (1 page of English Translation and 4 pages of Official Copy).
Notice of Allowance received for U.S. Appl. No. 16/775,528, dated Jun. 15, 2022, 6 pages.
Notice of Allowance received for U.S. Appl. No. 16/926,512, dated May 18, 2022, 9 pages.
Office Action received for Australian Patent Application No. 2021201748, dated Mar. 18, 2022, 6 pages.
Office Action received for Australian Patent Application No. 2021201780, dated Mar. 22, 2022, 3 pages.
Office Action received for Australian Patent Application No. 2022202044, dated Apr. 6, 2022, 3 pages.
Office Action received for Chinese Patent Application No. 201910438645.6, dated Mar. 2, 2022, 11 pages (5 pages of English Translation and 6 pages of Official Copy).
Office Action received for Chinese Patent Application No. 201910446753.8, dated Mar. 2, 2022, 11 pages (5 pages of English Translation and 6 pages of Official Copy).
Office Action received for Chinese Patent Application No. 201910447678.7, dated Mar. 21, 2022, 14 pages (6 pages of English Translation and 8 pages of Official Copy).
Office Action received for Japanese Patent Application No. 2021-510409, dated Apr. 8, 2022, 5 pages (2 pages of English Translation and 3 pages of Official Copy).
Office Action received for Korean Patent Application No. 10-2021-7001918, dated Apr. 28, 2022, 7 pages (3 pages of English Translation and 4 pages of Official Copy).
Office Action received for Korean Patent Application No. 10-2021-7039120, dated May 30, 2022, 7 pages (3 pages of English Translation and 4 pages of Official Copy).

\* cited by examiner

BUTTON FUNCTIONALITY

CROSS-REFERENCE TO RELATED APPLICATIONS

This application is a continuation of U.S. patent application Ser. No. 16/384,726, entitled "BUTTON FUNCTIONALITY," filed Apr. 15, 2019, which is a continuation of U.S. patent application Ser. No. 16/055,489, now U.S. Pat. No. 10,281,999, entitled "BUTTON FUNCTIONALITY," filed Aug. 6, 2018, which is a continuation of U.S. patent application Ser. No. 14/641,252, now U.S. Pat. No. 10,082,892, entitled "BUTTON FUNCTIONALITY," filed Mar. 6, 2015, which claims priority to U.S. Provisional Patent Application No. 62/044,922, entitled "BUTTON FUNCTIONALITY," filed Sep. 2, 2014, the contents of each of which are hereby incorporated by reference in their entireties.

This application relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 13, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012; U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" U.S. Provisional Patent Application Ser. No. 61/681,098, filed on Aug. 8, 2012, entitled "Adaptive Haptic Feedback for Electronic Devices;" U.S. Utility application Ser. No. 12/987,982, filed Jan. 10, 2011, entitled "Intelligent Automated Assistant;" and U.S. Provisional Patent Application Ser. No. 62/004,886, filed May 29, 2014, entitled "User Interface for Payments". The content of these applications is hereby incorporated by reference in their entirety.

FIELD

The present disclosure relates generally to computer user interfaces, and more specifically to button functionalities for user interfaces.

BACKGROUND

Users rely on portable multifunction devices for a variety of operations, such as communicating with friends, accessing and displaying information, and running software applications. A user may wish to invoke user interfaces for these operations in a quick and convenient way. It is desirable for the user interface for invoking operations to be intuitive and comprehensible to a user. As electronics packaging techniques improve, smaller and more portable devices are made, which further challenges computer user interface designers by reducing the available real estate to display affordances, user interface objects, and icons for accessing various user interfaces.

SUMMARY

It is desirable to provide user access to numerous user interfaces in a way that is intuitive and comprehensible to a user. Therefore, multifunctional button functionalities for portable multifunction devices are increasingly desirable for providing access to user interfaces.

In some embodiments, a method of providing button functionalities for user interfaces comprises: at an electronic device with a display and a rotatable and depressible input mechanism: receiving data representing an activation of the rotatable and depressible input mechanism, the activation having an associated activation duration; determining whether the activation duration exceeds a predetermined threshold; determining a state of an active application; and in accordance with a determination that the activation duration exceeds the predetermined threshold, and in accordance with a determination of the state of the active application: performing an action.

In some embodiments, a method of providing button functionalities for user interfaces comprises: at an electronic device with a display and a rotatable and depressible input mechanism: receiving data representing an activation of the rotatable and depressible input mechanism, the activation having an associated activation duration; determining whether the activation duration exceeds a predetermined threshold; in accordance with a determination that the activation duration does not exceed the predetermined threshold: displaying a first user interface screen on the display, the first user interface screen including a plurality of affordances, the plurality of affordances comprising an affordance representing an application; while the first user interface screen is displayed, receiving second data representing a second activation of the rotatable and depressible input mechanism, the second activation having an associated second activation duration; determining whether the second activation duration exceeds a second predetermined threshold; and in accordance with a determination that the second activation duration does not exceed the second predetermined threshold: substituting the display of the first user interface screen with a display of a second user interface screen, the second user interface screen including a clock face.

In some embodiments, a method of providing button functionalities for user interfaces comprises: at an electronic device with a display and a rotatable and depressible input mechanism: receiving first data representing a first activation of the rotatable and depressible input mechanism and a second activation of the rotatable and depressible input mechanism, the first and the second activations having an associated interval between the first and the second activations; in response to receiving the first data, determining whether the interval between the first and the second activations exceeds a predetermined threshold; and in accordance with a determination that the interval does not exceed the predetermined threshold: invoking a previously invoked application.

In some embodiments, a method of providing button functionalities for user interfaces comprises: at an electronic device with a touch-sensitive display, a button, and a rotatable and depressible input mechanism: receiving first data representing an activation of the button, the activation having an associated activation duration; determining whether the activation duration exceeds a predetermined threshold; and in accordance with a determination that the activation duration does not exceed the predetermined threshold: displaying a user interface screen, the user interface screen including at least a first affordance indicating a contact from a designated list of one or more contacts, wherein the designated list is a subset of a full list of contacts on the electronic device.

In some embodiments, a method of providing button functionalities for user interfaces comprises: at an electronic device with a touch-sensitive display, a button, and a rotatable and depressible input mechanism: receiving first data representing a first activation of the button and a second activation of the button, the first and the second activations having an associated interval between the first and the second activations; determining whether the interval between the first and the second activations exceeds a predetermined threshold; and in accordance with a determination that the interval does not exceed the predetermined threshold: invoking a payments application.

In some embodiments, a method of providing button functionalities for user interfaces comprises: at an electronic device with a display, a button, and a rotatable and depressible input mechanism: receiving data representing an activation of the button and an activation of the rotatable and depressible input mechanism, wherein the activation of the button has a first associated activation duration, wherein the activation of the rotatable and depressible input mechanism has a second associated activation duration and overlaps with the activation of the button for an overlap interval, and wherein the activation of the button and the activation of the rotatable and depressible input mechanism are received substantially simultaneously; determining whether the data meet predetermined criteria; and in accordance with a determination that the data meet the predetermined criteria: rebooting the electronic device.

In some embodiments, a method of providing button functionalities for user interfaces comprises: at an electronic device with a display, a rotatable and depressible input mechanism and a button: receiving first data representing an activation of the rotatable and depressible input mechanism; determining whether the activation represents: a single press of the rotatable and depressible input mechanism, the single press having an associated press duration; a double press of the rotatable and depressible input mechanism, the double press having an associated interval between a first press of the rotatable and depressible input mechanism and a second press of the rotatable and depressible input mechanism, the first and the second presses of the rotatable and depressible input mechanism each having an associated press duration; or an extended press of the rotatable and depressible input mechanism, the extended press having an associated press duration; and in accordance with a determination that the activation represents a single press of the rotatable and depressible input mechanism: displaying a first user interface screen on the display, the first user interface screen including a plurality of affordances, the plurality of affordances comprising an affordance representing an application; in accordance with a determination that the activation represents a double press of the rotatable and depressible input mechanism: invoking a previously invoked application; and in accordance with a determination that the activation represents an extended press of the rotatable and depressible input mechanism: determining a state of an active application; and in accordance with a determination of the state of the active application: performing an action.

In some embodiments, a method of providing button functionalities for user interfaces comprises: at an electronic device with a display, a rotatable and depressible input mechanism and a button: receiving first data representing an activation of the button; determining whether the activation represents: a single press of the button, the single press having an associated press duration; a double press of the button, the double press having an associated interval between a first consecutive press and a second consecutive press, the first and second consecutive presses each having an associated press duration; or an extended press of the button, the extended press having an associated press duration; and in accordance with a determination that the activation represents a single press of the button: displaying a first user interface screen, the first user interface screen including at least a first affordance indicating a contact from a designated list of one or more contacts, wherein the designated list is a subset of a full list of contacts on the electronic device; in accordance with a determination that the activation represents a double press of the button: invoking a payments application; and in accordance with a determination that the activation represents an extended press of the button: displaying a second user interface screen, the second user interface screen comprising a second affordance representing a user prompt to power off the electronic device.

In some embodiments, a device comprises means for receiving data representing an activation of a rotatable and depressible input mechanism, the activation having an associated activation duration; means for determining whether the activation duration exceeds a predetermined threshold; means for determining a state of an active application; and means for performing an action in accordance with a determination that the activation duration exceeds the predetermined threshold and in accordance with a determination of the state of the active application.

In some embodiments, a device comprises means for receiving data representing an activation of a rotatable and depressible input mechanism, the activation having an associated activation duration; means for displaying a first user interface screen, the first user interface screen including a plurality of affordances, the plurality of affordances comprising an affordance representing an application in accordance with a determination that the activation duration does not exceed the predetermined threshold; means for receiving second data representing a second activation of the rotatable and depressible input mechanism, the second activation having an associated second activation duration; means for determining whether the second activation duration exceeds a second predetermined threshold; and means for substituting the display of the first user interface screen with a display of a second user interface screen, the second user interface screen including a clock face, in accordance with a determination that the second activation duration does not exceed the second predetermined threshold.

In some embodiments, a device comprises means for receiving first data representing a first activation of a rotatable and depressible input mechanism and a second activation of the rotatable and depressible input mechanism, the first and the second activations having an associated interval between the first and the second activations; means responsive to receiving the first data for determining whether the interval between the first and the second activations exceeds a predetermined threshold; and means for invoking a previously invoked application in accordance with a determination that the interval does not exceed the predetermined threshold.

In some embodiments, a device comprises means for receiving first data representing an activation of a button, the activation having an associated activation duration; means for determining whether the activation duration exceeds a predetermined threshold; and means for displaying a user interface screen, the user interface screen including at least a first affordance indicating a contact from a designated list of one or more contacts, wherein the designated list is a subset of a full list of contacts on the device in accordance with a determination that the activation duration does not exceed the predetermined threshold.

In some embodiments, a device comprises means for receiving first data representing a first activation of a button and a second activation of the button, the first and the second activations having an associated interval between the first and the second activations; means for determining whether the interval between the first and the second activations exceeds a predetermined threshold; and means for invoking a payments application in accordance with a determination that the interval does not exceed the predetermined threshold.

In some embodiments, a device comprises means for receiving data representing an activation of a button and an activation of a rotatable and depressible input mechanism, wherein the activation of the button has a first associated activation duration, wherein the activation of the rotatable and depressible input mechanism has a second associated activation duration and overlaps with the activation of the button for an overlap interval, and wherein the activation of the button and the activation of the rotatable and depressible input mechanism are received substantially simultaneously; means for determining whether the data meet predetermined criteria; and means for rebooting the device in accordance with a determination that the data meet the predetermined criteria.

In some embodiments, a device comprises means for receiving first data representing an activation of a rotatable and depressible input mechanism; means for determining whether the activation represents a single press of the rotatable and depressible input mechanism, a double press of the rotatable and depressible input mechanism, or an extended press of the rotatable and depressible input mechanism; means for displaying a first user interface screen, the first user interface screen including a plurality of affordances, the plurality of affordances comprising an affordance representing an application in accordance with a determination that the activation represents a single press of the rotatable and depressible input mechanism; means for invoking a previously invoked application in accordance with a determination that the activation represents a double press of the rotatable and depressible input mechanism; means for determining a state of an active application in accordance with a determination that the activation represents an extended press of the rotatable and depressible input mechanism; and means for performing an action in accordance with a determination of the state of the active application.

In some embodiments, a device comprises means for receiving first data representing an activation of a button; means for determining whether the activation represents a single press of the button, a double press of the button, or an extended press of the button; means for displaying a first user interface screen, the first user interface screen including at least a first affordance indicating a contact from a designated list of one or more contacts, wherein the designated list is a subset of a full list of contacts on the device in accordance with a determination that the activation represents a single press of the button; means for invoking a payments application in accordance with a determination that the activation represents a double press of the button; and means for displaying a second user interface screen, the second user interface screen comprising a second affordance representing a user prompt to power off the device in accordance with a determination that the activation represents an extended press of the button.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
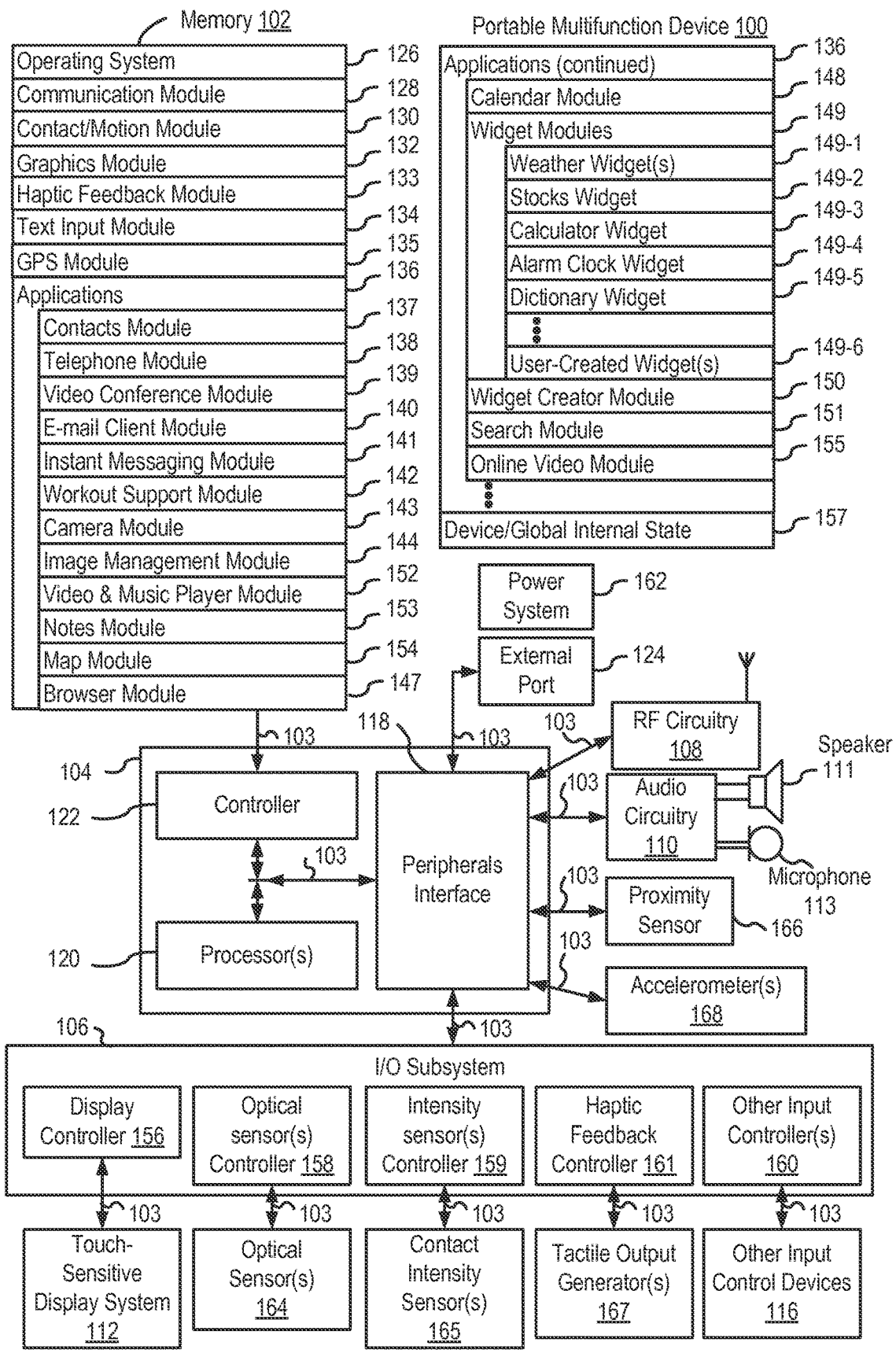
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

As discussed above, a user may wish to access various user interfaces for using different functions on a portable multifunction device. Providing functionalities for accessing such user interfaces without relying solely on displayed icons may be beneficial for multifunction devices of any size by freeing the display for other features or aspects. Other input mechanisms such as buttons may these additional functionalities, but it is highly desirable for such input mechanisms to be intuitive (since their appearance typically does not change as readily as a displayed object) and to allow for multifunctional use. Combinations of hardware buttons and rotatable and depressible input mechanisms that are multifunctional alone and in combination are highly desirable for providing different user interfaces on a portable multifunction device.

Below, FIGS. 1A-1B, 2, 3, 4A-4B, and 5A-5B provide a description of exemplary devices for performing the techniques for button functionalities for user interfaces. FIGS. 6-12 illustrate exemplary button functionalities for user interfaces. The user interfaces in the figures are also used to illustrate the processes described below, including the processes in FIGS. 13-20.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
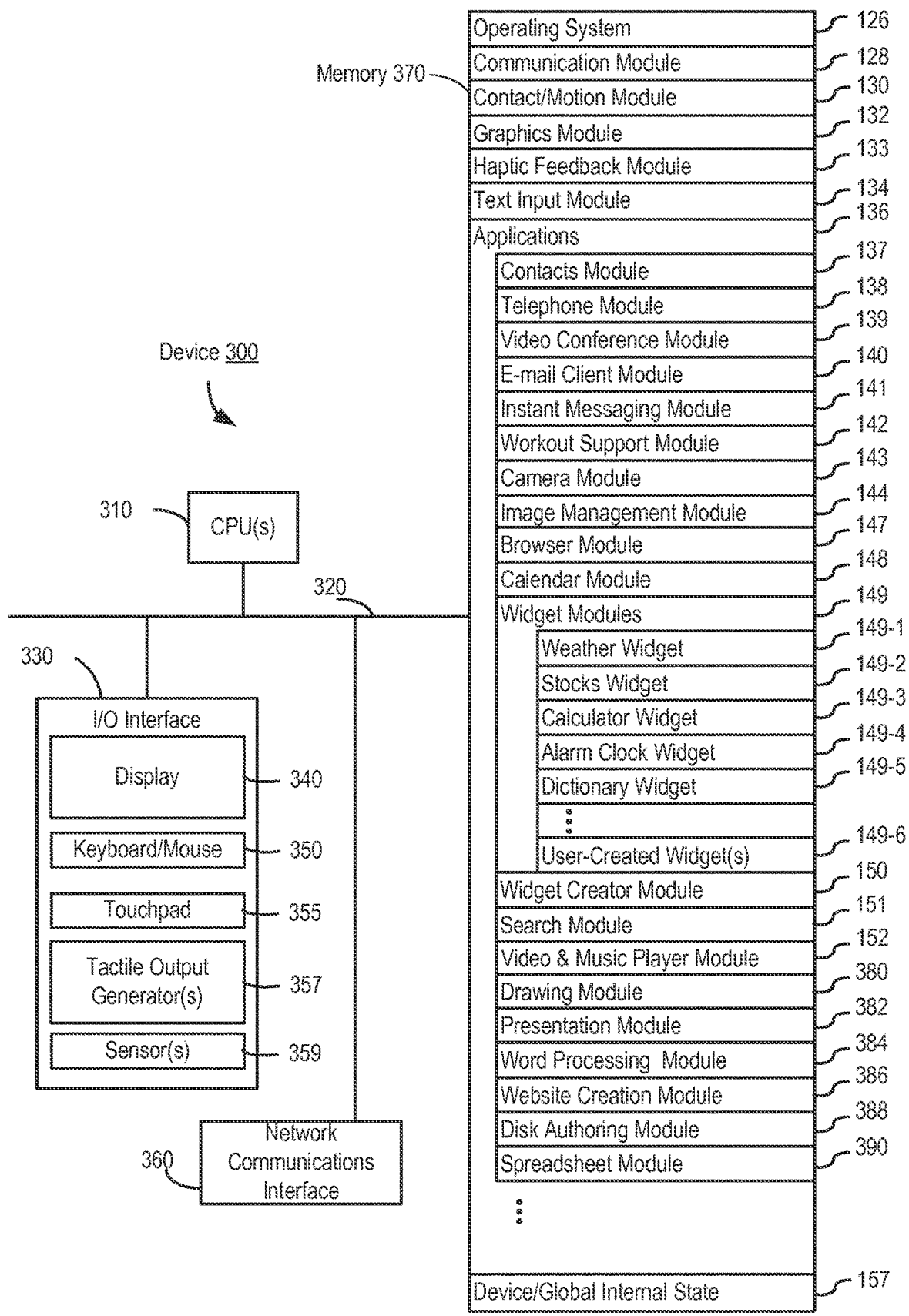
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;

Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
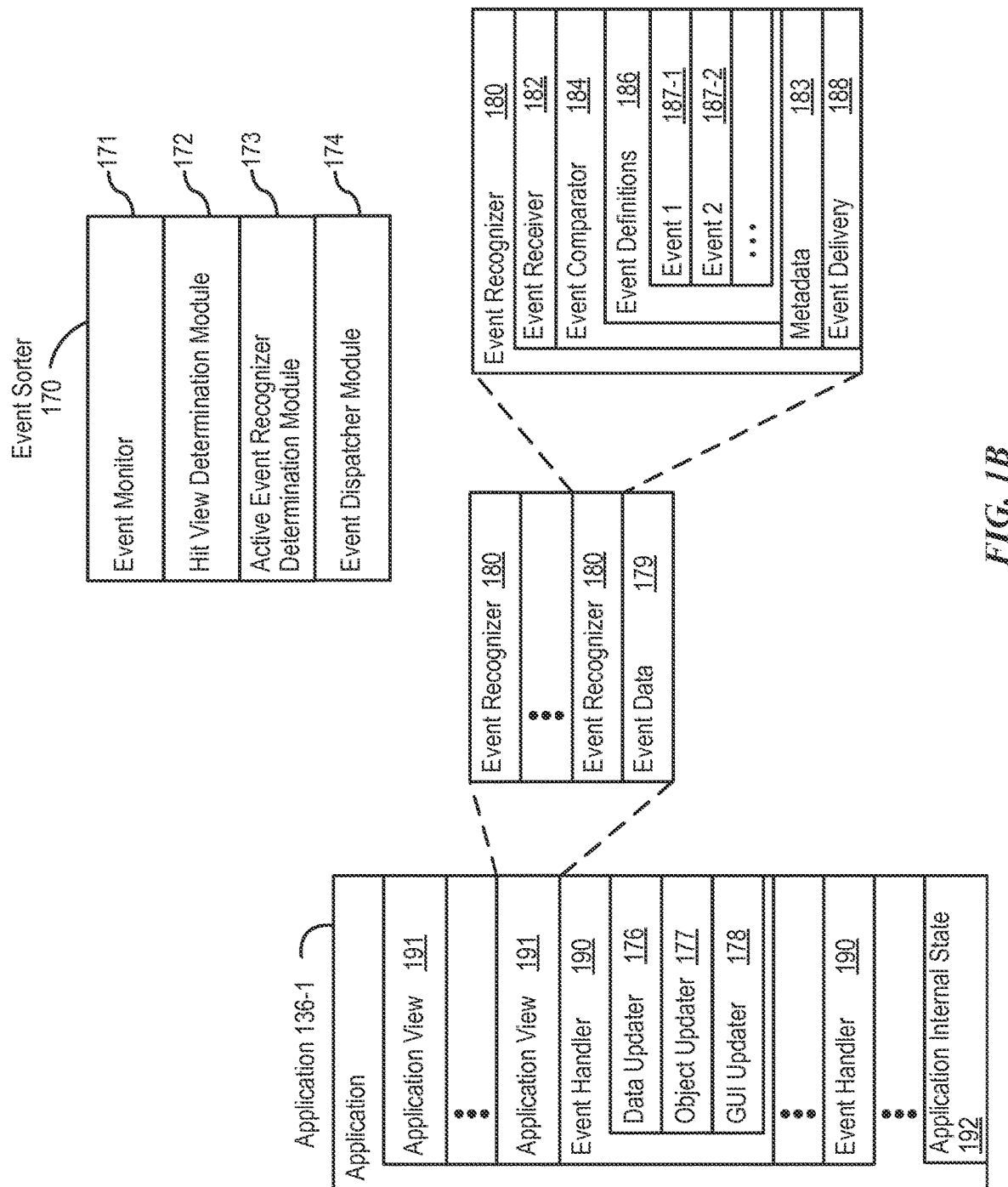
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
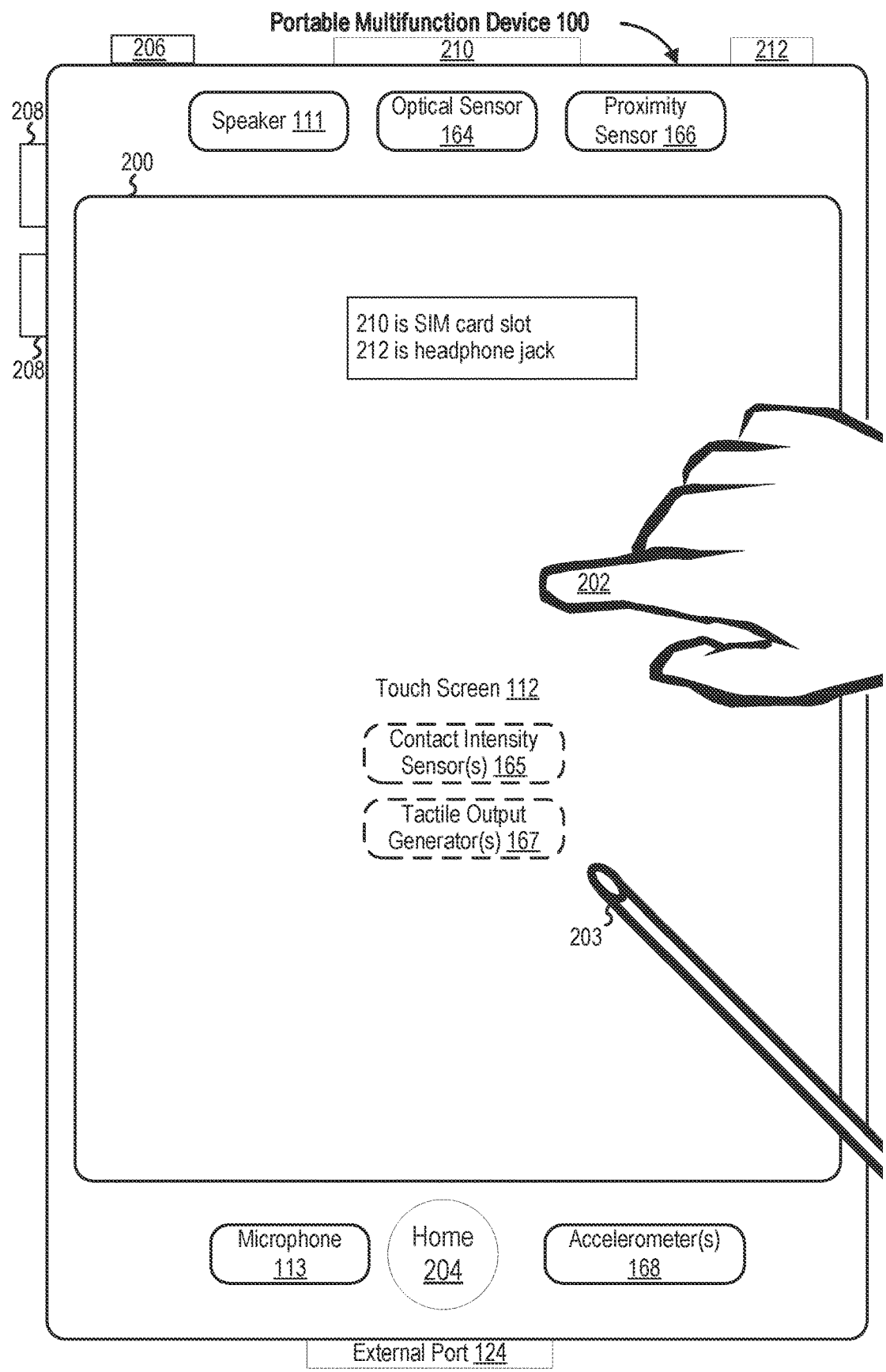
FIG. 2 illustrates a portable multifunction device having a touch-sensitive display in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
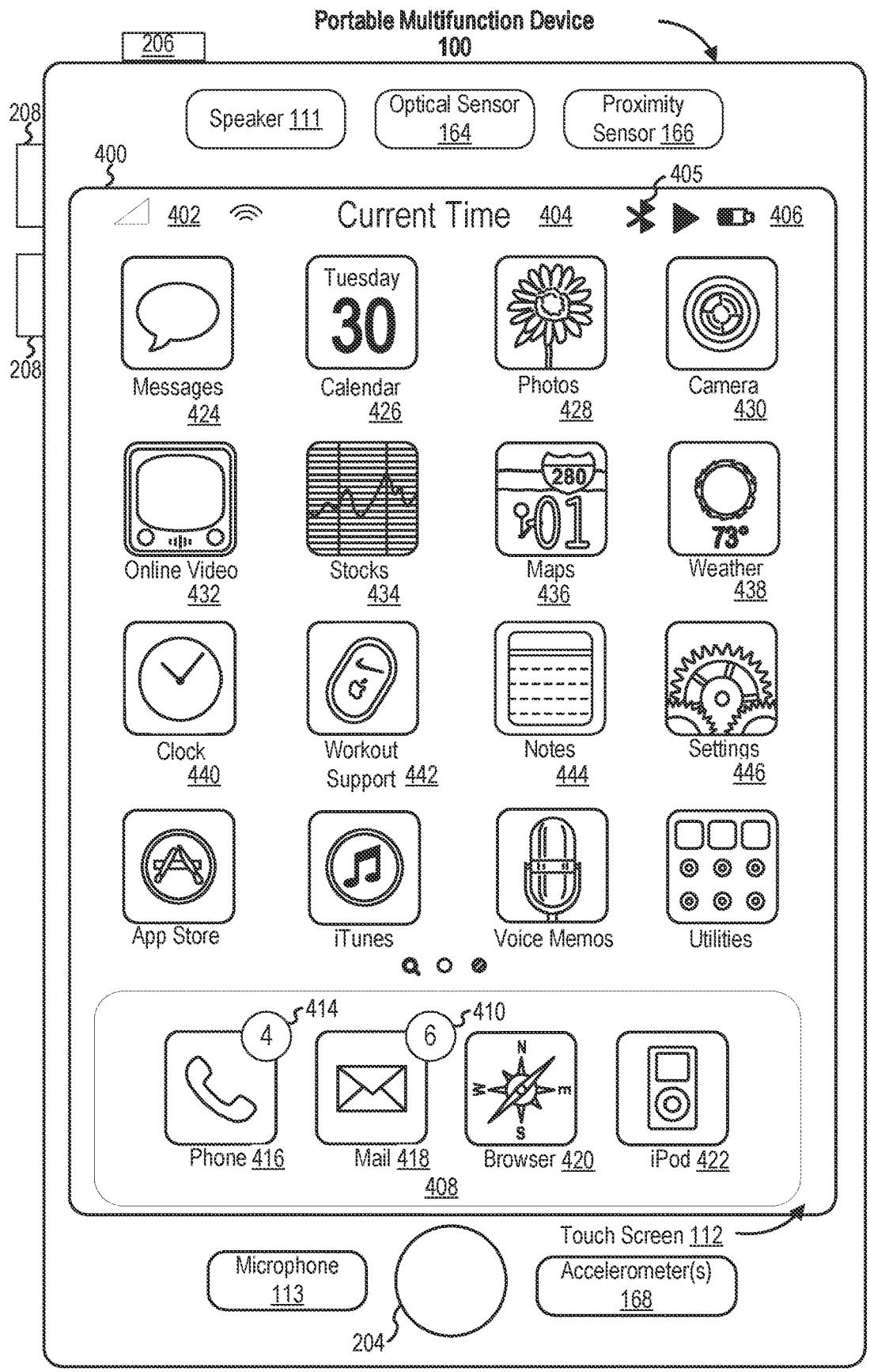
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
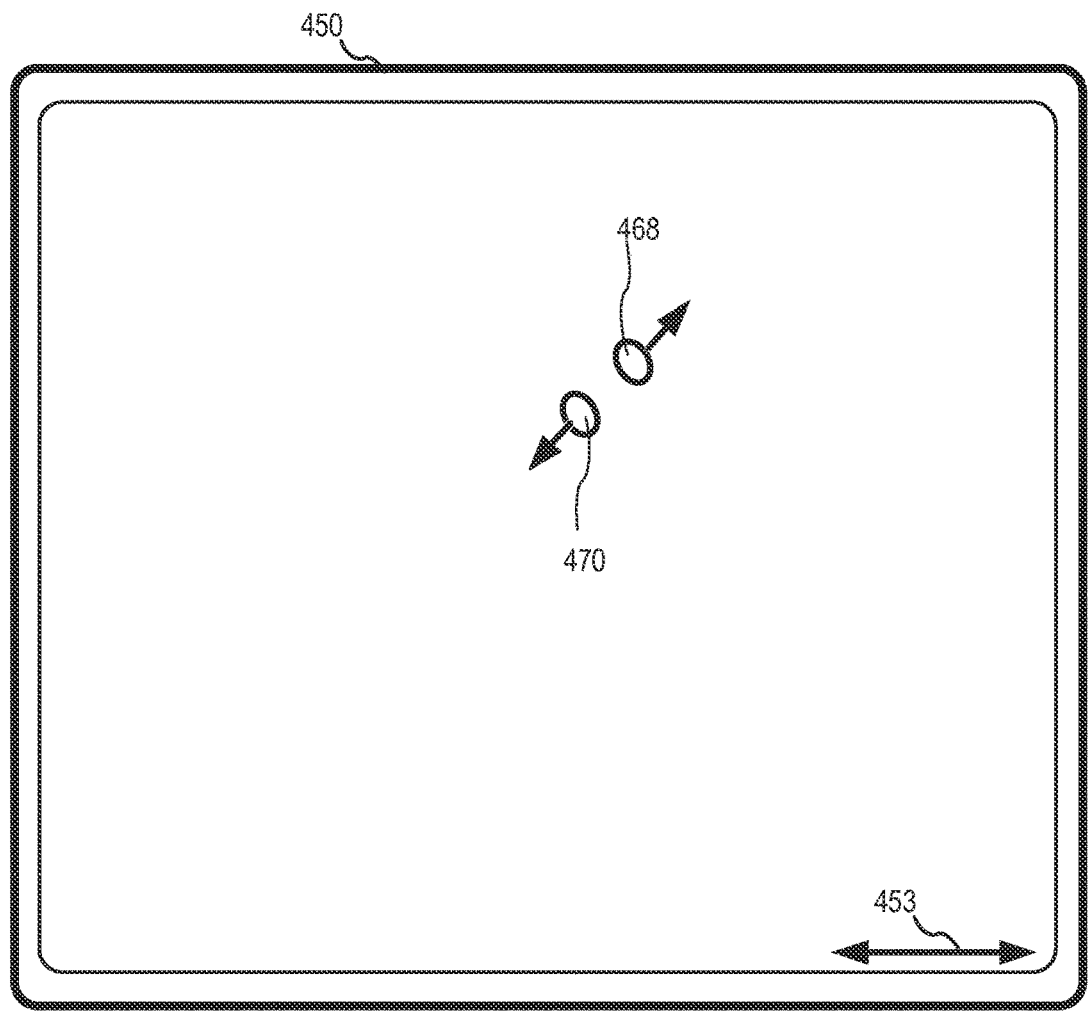
FIG. 4B illustrates an exemplary user interface for a multifunction device with a touch-sensitive surface that is separate from the display in accordance with some embodiments.
Figure 4B:
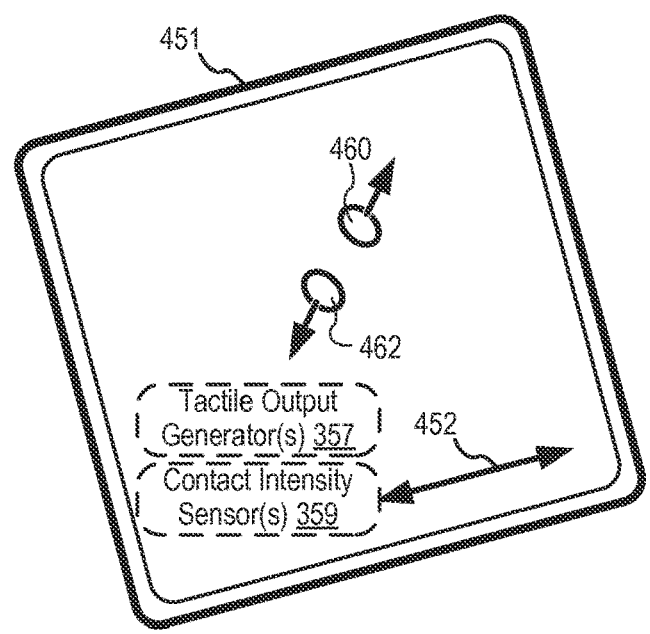

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112

(where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
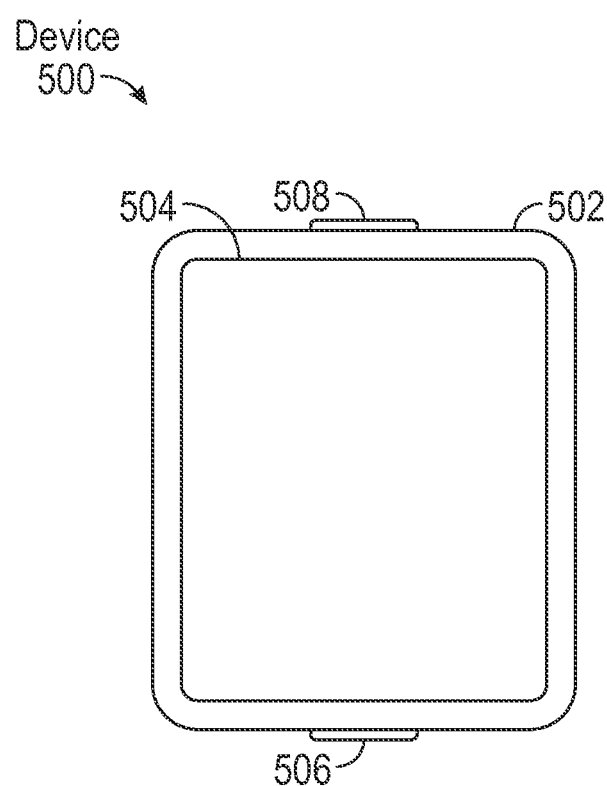
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
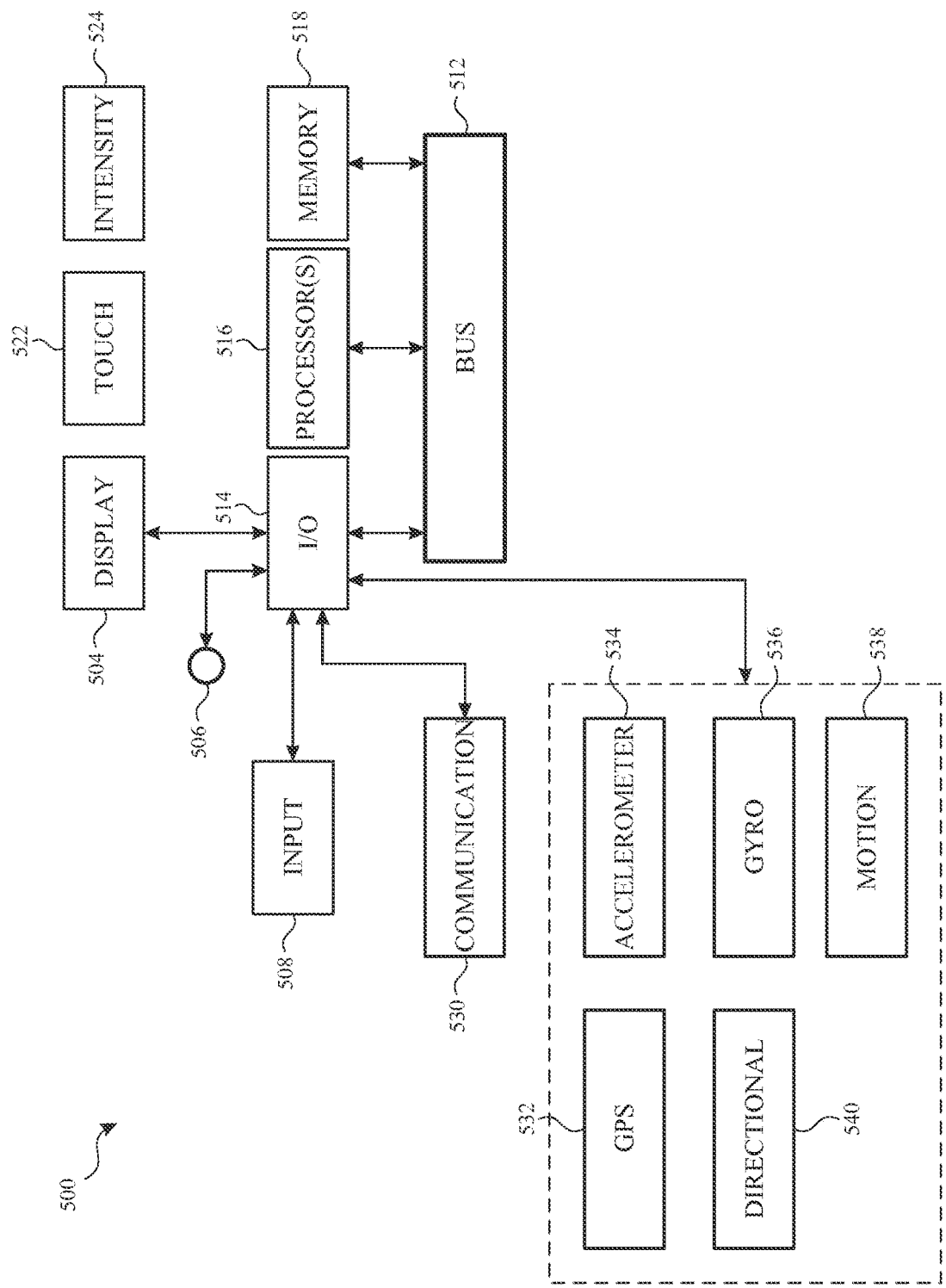
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 1300-2000 (FIGS. 13-20). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6A:
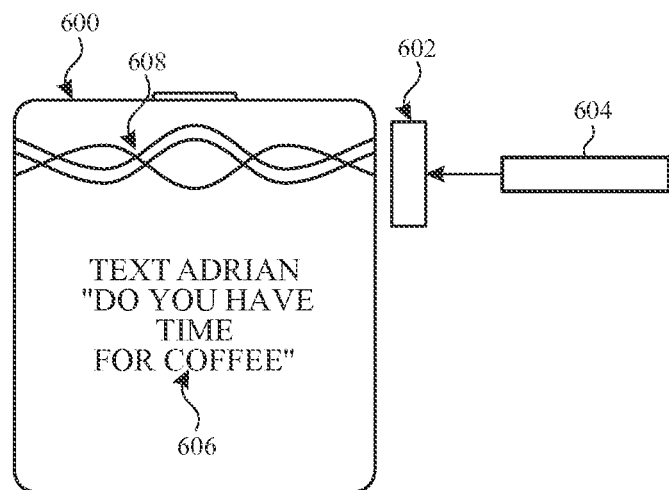
FIGS. 6A and 6B illustrate exemplary button functionalities for user interfaces.

FIG. 6A shows exemplary button functionalities for user interfaces that may be operated on device 600. Device 600 may be device 100, 300, or 500 in some embodiments. The electronic device has a display (e.g., 504). As shown in FIG. 6A, device 600 includes rotatable and depressible input mechanism 602. A rotatable and depressible input mechanism adds functionality to device 600 by providing multiple modes of user activation, thereby increasing user interactivity and/or ease of use with any of the user interfaces operable on device 600. The electronic device may also include a touch-sensitive surface (e.g., 504) and a button (e.g., 508).

A user may activate rotatable and depressible input mechanism 602 by activation 604. Depicted activation arrow blocks (e.g., activation 604) are typically not part of the displayed user interface, but are provided to aid in the interpretation of the figures. As depicted in FIG. 6A by the arrow block, activation 604 has an associated activation duration (e.g., a duration of time during which the activation is continuously detected by the device). In response to receiving data representing the activation, the device determines whether the activation duration exceeds a predetermined threshold. In some embodiments, the predetermined threshold is a predetermined length of time. In response to receiving data representing the activation, the device also determines a state of an active application. An active application may include a current application, a home screen of the device, a clock face displayed on the device, and so forth. For example, a state of a current application could be a state of an application with which the user is currently interacting. Alternatively, a state of an active application could refer to a currently displayed screen on the device, such as a clock face or a home screen.

In accordance with a determination that the activation duration exceeds the predetermined threshold (e.g., the input is an extended press of rotatable and depressible input mechanism 602, as depicted by the long arrow block shown for activation 604), and in accordance with a determination of the state of the active application, the device performs an action. In some embodiments, the action may be related or otherwise corresponding to the state of the active application. For example, the device may perform an action that is related to the currently displayed content or user interface of the device. In this way, the rotatable and depressible input mechanism may provide different functionalities depending on how the user is interacting with the device (e.g., a displayed user interface).

In some embodiments, a rotatable and depressible input mechanism (e.g., 602) is a mechanical button that is rotatable, and the activation is a physical depression of the mechanical button. In some embodiments, a rotatable and depressible input mechanism (e.g., 602) is a capacitive button that is rotatable, and the activation is a touch on the capacitive button. In either case, the rotatable and depressible input mechanism retains two modes of user interaction, which advantageously may be used for different purposes. In some embodiments, the activation (e.g., 604) does not represent a rotation of the rotatable and depressible input mechanism. In some embodiments, detection of the activation is based on detecting a press such as a physical depression or a touch and does not require a rotation for detection. For example, the device may perform an action in response to an activation of rotatable and depressible input mechanism 602, and it may scroll or cycle through content or options based on the action in response to a rotation.

In some embodiments, in accordance with a determination that the state of the active application relates to user-to-user voice communication, the device may invoke an application for low-latency asynchronous voice communication (e.g., a walkie talkie-type function). For example, if the active application provides a voice communication interface, an extended press of the rotatable and depressible input mechanism could activate a low-latency asynchronous voice communication functionality.

In some embodiments, after invoking the application for low-latency asynchronous voice communication, the device receives a voice input and transmits the voice input to a second electronic device capable of receiving the voice input. As an illustrative example, in the low-latency asynchronous voice communication application, a user may speak while activating the rotatable and depressible input mechanism for an extended press, listen to a response from the second device while the rotatable and depressible input mechanism is not being activated, then speak again while activating the rotatable and depressible input mechanism for an extended press.

In some embodiments, in accordance with a determination that the state of the active application relates to transcribing a voice input, the device may invoke a dictation application, receive a voice input, and transcribe the voice input into a displayed text. For example, if the user is in a state of an application that receives text input (e.g., from a physical or virtual keyboard, such as a notes application), an extended press on the rotatable and depressible input mechanism may invoke a dictation application to receive instead a speech input from the user, which can be transcribed by the device into displayed text. As shown in FIG. 6A, device 600 has received a voice input and shows displayed text 606, which was transcribed from the voice input.

In some embodiments, in accordance with a determination that the state of the active application relates to audio messaging, the device may invoke an audio messaging application, record a voice input, and send data representing the recorded voice input to a second electronic device capable of receiving the data. For example, if the user is in a text messaging application, an extended press on the rotatable and depressible input mechanism may invoke an audio messaging application to send an audio file to a recipient (e.g., a participant in a text messaging conversation).

In some embodiments, in accordance with a determination that the state of the active application relates to receiving a voice request to execute a task, or in accordance with a determination that the state of the current application does not relate to user-to-user voice communication or transcribing a voice input, the device may invoke a virtual assistant. Further description of a virtual assistant may be found, for example, in related application U.S. Utility application Ser. No. 12/987,982, entitled "Intelligent Automated Assistant," filed Jan. 10, 2011 application.

For example, if the user is in a state of an application for executing a task, the device may invoke the virtual assistant to execute the task. Alternatively, invoking a virtual assistant may represent a default, such that the device may invoke a virtual assistant upon receiving an extended press of the rotatable and depressible input mechanism while the user is in any state of any application not explicitly assigned to invoke a different function. As described above, the functionalities invoked by an extended press of the rotatable and depressible input mechanism all relate to a speech or voice input. This unites the functions invokable through an extended press of the rotatable and depressible input mechanism by a common general feature, which helps the comprehensibility and intuitiveness of the device. Further, this allows for invoking multiple features through the same user input by determining which feature to invoke dependent upon a state of an active application. A user may be more likely to want to invoke a particular function if the user is in a state of an active application that is related to the function.

In some embodiments, after invoking the virtual assistant, the device displays a user interface screen on the display. This user interface screen includes a user prompt for voice input. A user prompt for voice input may include a text prompting the user to enter a voice input or an affordance representing a voice input (such as a microphone, speech balloon, or other depiction related to a voice input). As used here, the term "affordance" refers to a user-interactive graphical user interface object that may be displayed on the display screen of device 100, 300, and/or 500 (FIGS. 1, 3, and 5A). For example, an image (e.g., icon), a virtual button, and text may each constitute an affordance. In some embodiments, the device may further receive a voice input.

In some embodiments, after receiving the voice input, the device transcribes the voice input into text and displays the text on the display. For example, in FIG. 6A, device 600 has transcribed a voice input from the user and displayed transcribed text (e.g., 606) based on the voice input on the display. In some embodiments, the device also displays a waveform based on the voice input on the display (e.g., waveform 608). A waveform based on a voice input may graphically represent a sound wave, but it need not depict a sound wave that is precisely based on the physical characteristics of the voice input (e.g., the waveform may not be a mathematical representation of the actual sound wave of the voice input). In some embodiments, the waveform is a stylized representation of a sound wave sufficient to connote to the user that the voice input is received by the device. In some embodiments, one or more characteristics of the waveform is based on a physical characteristic of the voice input (e.g., frequency, amplitude, wave length, and so forth).

In some embodiments, the device displays the waveform on the display at a position adjacent to the rotatable and depressible input mechanism (e.g., a portion of the waveform is at a position proximal to the rotatable and depressible input mechanism). As shown in FIG. 6A, waveform 608 is displayed by device 600 at a position next to rotatable and depressible input mechanism 602. Advantageously, this helps the user recognize that activation of the rotatable and depressible input mechanism invokes an application for receiving a voice input depicted by the waveform, thereby increasing the usability and intuitive feel of the interface through the rotatable and depressible input mechanism functionality.

In some embodiments, the device determines whether the voice input contains a request to execute a task executable by the virtual assistant, and in accordance with a determination that the voice input contains a request to execute a task executable by the virtual assistant, the device executes the task by the virtual assistant. Further details on this determination and tasks executed by a virtual assistant may be found in the related application cited above.

Figure 6B:
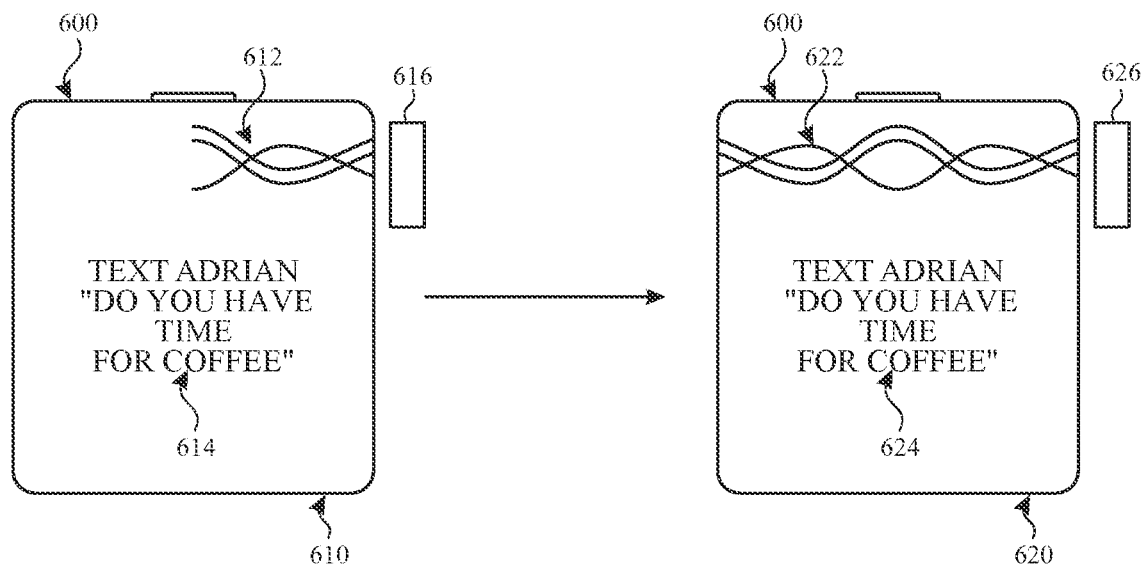

An embodiment of these concepts is illustrated in FIG. 6B. FIG. 6B shows device 600 receiving a voice input with a request to text Adrian "Do you have time for coffee." Device 600 has transcribed this voice request into displayed texts 614 and 624 on user interface screens 610 and 620, respectively. Waveform 612 is displayed on user interface screen 610 next to rotatable and depressible input mechanism 616. As illustrated by the transition from user interface screen 610 to user interface screen 620, waveform 612 is animated to appear as if emanating from rotatable and depressible input mechanism 616, as it progresses fully across the display as waveform 622 on user interface screen 620, which is positioned next to rotatable and depressible input mechanism 626. Similar to what was described above, this animation further strengthens the user's connection between the rotatable and depressible input mechanism itself and its functionality.

In some embodiments, the virtual assistant is run on the electronic device. In some embodiments, the virtual assistant is run on an external device in wireless communication with the electronic device. As used herein, invoking a virtual assistant, determining whether a voice input contains a request to execute a task executable by the virtual assistant, and/or executing a task using a virtual assistant may be performed on or by the device itself or by wirelessly communicating with one or more external devices, such as an electronic device (e.g., a phone, laptop, desktop, or tablet computer), server, and the like. For example, the device may execute a task on an external device or by using data from an external device. One or more of the functions required to execute the task (e.g., receiving a voice input, determining whether the voice input contains a request to execute a task, determining whether the task is executable by the virtual assistant, and executing the task) may be performed on an external device in wireless communication with the device (e.g., device 600) using data from the device and/or by sending data to the device.

In some embodiments, the device may send first data representing the voice input to an external device, receive from the external device second data representing a request to execute a task executable by the virtual assistant, transcribe the request into text, and display the text on the display (e.g., text 608, 614, or 624). The device may receive the second data via wireless communication (e.g., Wi-Fi, Bluetooth™, near field communication ("NFC"), cellular and/or other wireless communication techniques, and so forth).

In some embodiments, the device displays an affordance representing a user prompt to display additional data related to the request on an external device. That is to say, the device may indicate to the user that additional data may be viewed on the external device, which may be particularly advantageous if the electronic device has a display smaller than the display of the external device. Additional data related to the request may include further or more detailed data requested by the user. For example, if the request is for weather information, the device may display weather information such as a predicted or current weather condition, temperature, and the like, and the user may view more detailed weather information (such as moon phase, humidity, barometric pressure, a weekly forecast, and so forth) on the external device.

In some embodiments, a rotatable and depressible input mechanism may include any of the functionalities described above in combination with one or more of the other functionalities described herein for a rotatable and depressible input mechanism. In some embodiments, device 600 may also include a button (e.g., 508) with one or more of the functionalities described herein for a button.

Figure 7:
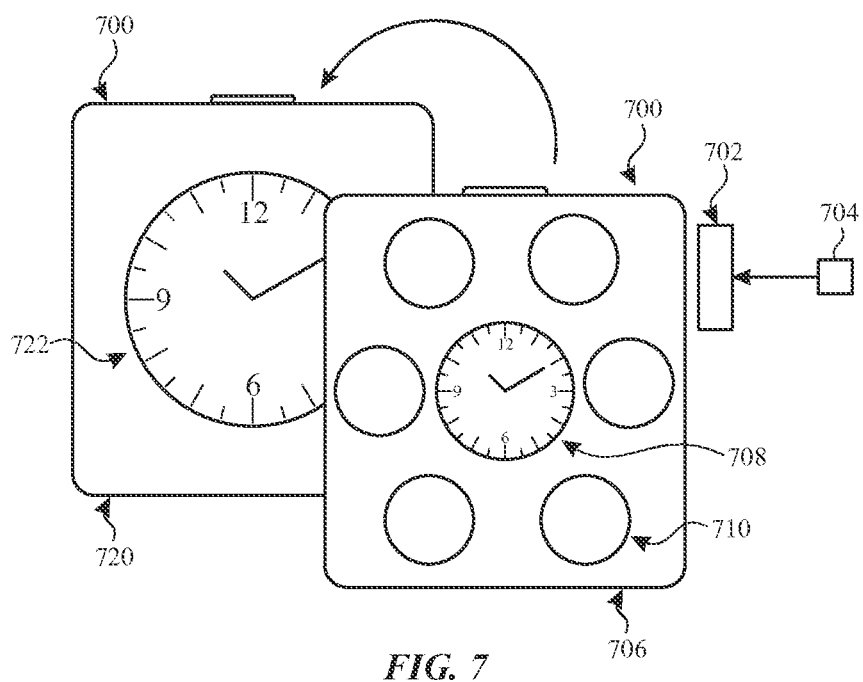
FIG. 7 illustrates exemplary button functionalities for user interfaces.

FIG. 7 shows exemplary button functionalities for user interfaces that may be operated on device 700. Device 700 may be device 100, 300, or 500 in some embodiments. The electronic device has a display (e.g., 504). As shown in FIG. 7, device 700 includes rotatable and depressible input mechanism 702. The electronic device may also include a touch-sensitive surface (e.g., 504) and a button (e.g., 508).

A user may activate rotatable and depressible input mechanism 702 by activation 704. As depicted in FIG. 7 by the arrow block, activation 704 has an associated activation duration. In response to receiving data representing the activation, the device determines whether the activation duration exceeds a predetermined threshold. In some embodiments, the predetermined threshold is a predetermined length of time.

In accordance with a determination that the activation duration does not exceed the predetermined threshold (e.g., the input is a single press of rotatable and depressible input mechanism 702, as depicted by the short, single arrow block shown for activation 704), the device displays a first user interface screen including a plurality of affordances on the display. For example, device 700 displays user interface screen 706 that includes a plurality of affordances that includes affordances 708 and 710. In the plurality, at least a first affordance represents an application. For example, the affordance may be an affordance such as an icon that, when activated, causes the application to be displayed (e.g., affordances may include user-interactive icons for launching a software application). An affordance representing an application may convey to the user the application through texts, symbols, icons, depictions of an application-related screen, or any other visual indication that represents the application. In some embodiments, user interface screen 706 may be a home screen that includes a plurality of affordances representing applications.

While the first user interface screen is displayed, a user may activate rotatable and depressible input mechanism 702 with a second activation having a second activation duration. In response to receiving the data, the device determines whether the second activation duration exceeds a second predetermined threshold. In accordance with a determination that the second activation duration does not exceed the second predetermined threshold (e.g., the input is a single press of the rotatable and depressible input mechanism), the device displays a second user interface screen (e.g., 720) that includes a clock face (e.g., 722). In some embodiments, the order of screens may be reversed, such that a first single press causes the display of a clock face (e.g., 722), and a second single press causes the display of a plurality of application affordances (e.g, 708 and 710). Linking these functions allows the user to easily navigate between a clock face and application affordances, which is advantageous if the user uses the device to keep time and to use applications.

In some embodiments, the device displays a user interface screen that includes a clock face. While the user interface screen is displayed, a user may activate rotatable and depressible input mechanism 702 with a third activation having a third activation duration. In response to receiving the data, the device determines whether the third activation duration exceeds a third predetermined threshold. In accordance with a determination that the third activation duration does not exceed the third predetermined threshold (e.g., the input is a single press of the rotatable and depressible input mechanism), the device displays a second user interface screen that includes a plurality of affordances on the display.

In some embodiments, a rotatable and depressible input mechanism (e.g., 702) is a mechanical button that is rotatable, and the activation is a physical depression of the mechanical button. In some embodiments, a rotatable and depressible input mechanism (e.g., 702) is a capacitive button that is rotatable, and the activation is a touch on the capacitive button. In some embodiments, the activation (e.g., 704) does not represent a rotation of the rotatable and depressible input mechanism. In some embodiments, detection of the activation is based on detecting a press such as a physical depression or a touch and does not require a rotation for detection. For example, the device may perform an action in response to an activation of 702, and it may scroll or cycle through content or options based on the action in response to a rotation.

In some embodiments, a clock face displayed by the device includes a user interface object that indicates time. In some embodiments, the device displays an affordance based on the user interface object on the first user interface screen. For example, the affordance may be the same object as the user interface object but smaller, or it may be approximately the same object but with fewer details, to accommodate a smaller display size (i.e., since the affordance screen has a plurality of affordances, the affordance representing the user interface object may be smaller than the user interface object when displayed as part of a clock face).

In some embodiments, the user interface object and the affordance may represent a similar meaning to the user without being the same object. For example, the user interface object may be a representation of a digital clock, and the first affordance may be a representation of an analog clock. In this case, the analog clock may convey a notion of timekeeping to the user more clearly than a pair of numbers (as with a digital clock), particularly on a reduced size display. In some embodiments, the user interface object and the affordance may display the same time. In some embodiments, the user interface object and the affordance may display different times. For example, the user interface object may display a time of interest, such as a current time, whereas the affordance may display a generic time (e.g., 10:10) as an indication to the user that activating it leads to a display of the clock face. That is to say, the affordance may simply represent the idea of timekeeping to the user so that the user recognizes that activation of the affordance displays a clock face.

In some embodiments, a single press of the rotatable and depressible input mechanism acts as a back button for the device, such that a single press may return the user to the most previously displayed screen in any interface of the device.

In some embodiments, the time indicated by the user interface object is a current time. In some embodiments, the affordance indicates a current time.

In some embodiments, the user interface object is a representation of an analog clock that includes an hour hand and a minute hand. In some embodiments, the user interface object is a representation of a digital clock with a numerical indication of an hour and a numerical indication of a minute. In some embodiments, the affordance is a representation of an analog clock that includes an hour hand and a minute hand. In some embodiments, the affordance is a representation of a digital clock with a numerical indication of an hour and a numerical indication of a minute.

In some embodiments, the predetermined threshold for the first activation duration is the same as the predetermined threshold for the second activation duration. This provides a consistent threshold to the user for interactions with the device.

In some embodiments, the first activation and the second activation have an associated interval of time between them, and this interval exceeds a third predetermined threshold (e.g., 0.5 seconds, 1 second, or 2 seconds). This allows the device to distinguish between sequential single presses and a double press (described below).

In some embodiments, a rotatable and depressible input mechanism may include any of the functionalities described above in combination with one or more of the other functionalities described herein for a rotatable and depressible input mechanism. In some embodiments, device 700 may also include a button (e.g., 508) with one or more of the functionalities described herein for a button.

Figure 8:
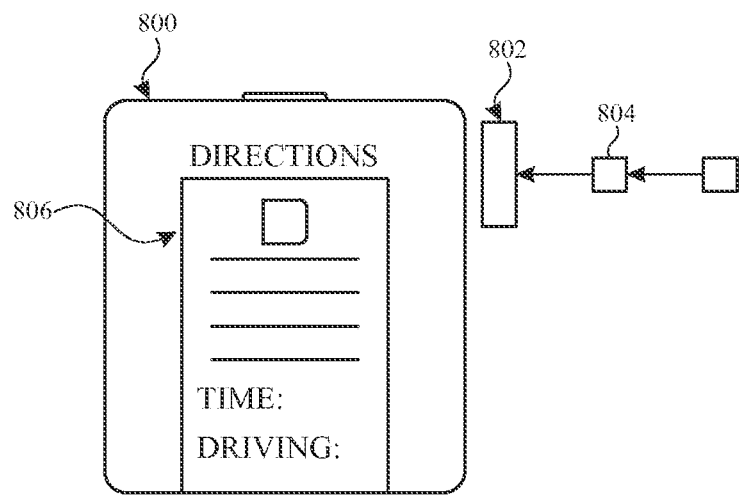
FIG. 8 illustrates exemplary button functionalities for user interfaces.

FIG. 8 shows exemplary button functionalities for user interfaces that may be operated on device 800. Device 800 may be device 100, 300, or 500 in some embodiments. The electronic device has a display (e.g., 504). As shown in FIG. 8, device 800 includes rotatable and depressible input mechanism 802. The electronic device may also include a touch-sensitive surface (e.g., 504) and a button (e.g., 508).

A user may activate rotatable and depressible input mechanism 802 by activation 804. As depicted in FIG. 8 by the arrow blocks, activation 804 has a first activation and a second activation with an associated interval between the first and the second activations. In response to receiving data representing the first and second activations, the device determines whether the interval between the first and the second activations exceeds a predetermined threshold. In some embodiments, the predetermined threshold is a predetermined length of time.

In accordance with a determination that the interval does not exceed the predetermined threshold (e.g., a double press, rather than two sequential single presses), the device invokes a previously invoked application. FIG. 8 shows an application user interface screen 806 displayed by device 800 in response to double press 804 on rotatable and depressible input mechanism 802. A previously invoked application may include any application previously invoked on the device.

In some embodiments, the previously invoked application is the latest invoked application that is not currently displayed. As an illustrative example, the user may invoke a calendar application, then switch to a weather application. In this example, while the weather application is displayed, the user may invoke and display the calendar application with a double press on the rotatable and depressible input mechanism.

In some embodiments, a rotatable and depressible input mechanism (e.g., 802) is a mechanical button that is rotatable, and the first and the second activations are physical depressions of the mechanical button. In some embodiments, a rotatable and depressible input mechanism (e.g., 802) is a capacitive button that is rotatable, and the first and the second activations are touches on the capacitive button. In some embodiments, the first and the second activations (e.g., 804) do not include a rotation of the rotatable and depressible input mechanism. In some embodiments, detection of the activation is based on detecting a press such as a physical depression or a touch and does not require a rotation for detection. For example, in some embodiments, the device may invoke a previously invoked application by a double press of the rotatable and depressible input mechanism, then scroll or cycle through application content or other application data in response to a rotation of the rotatable and depressible input mechanism.

In some embodiments, the previously invoked application is invoked in an application start state. For example, in response to a double press of 802, the device may start a previously invoked application and display the application start screen, as shown in FIG. 8. In some embodiments, the previously invoked application is invoked in a previous application state. In some embodiments, the previous application state corresponds to a state of the application after a user interaction. For example, if the user leaves the application in a particular state, then switches to another application, a double press of 802 would return the user to the particular state. If the user leaves the application on a particular screen, then switches to another application, a double press of 802 would return the user to the particular screen.

In some embodiments, the previously invoked application is invoked in a stored application state. For example, the user may save a particular state of an application and return to the state through a double press of 802.

In some embodiments, a rotatable and depressible input mechanism may include any of the functionalities described above in combination with one or more of the other functionalities described herein for a rotatable and depressible input mechanism. In some embodiments, device 800 may also include a button (e.g., 508) with one or more of the functionalities described herein for a button.

Figure 9:
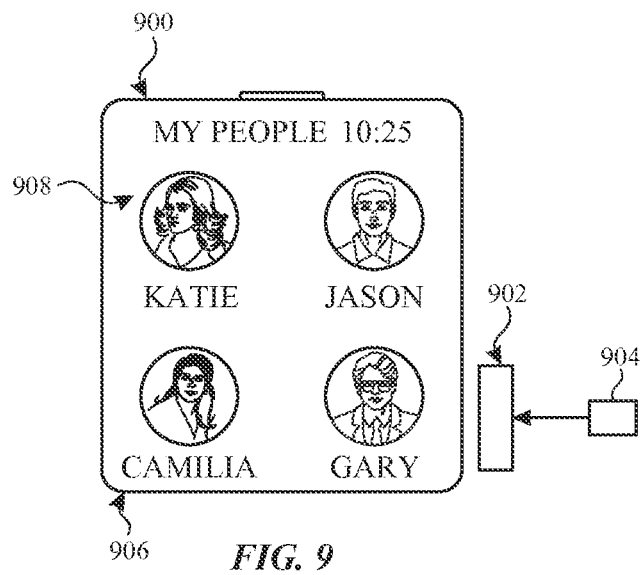
FIG. 9 illustrates exemplary button functionalities for user interfaces.

FIG. 9 shows exemplary button functionalities for user interfaces that may be operated on device 900. Device 900 may be device 100, 300, or 500 in some embodiments. The electronic device has a display (e.g., 504). As shown in FIG. 9, device 900 includes button 902. The electronic device may also include a touch-sensitive surface (e.g., 504) and a rotatable and depressible input mechanism (e.g., 506, 602, 702, or 802).

A user may activate button 902 by activation 904. As depicted in FIG. 9 by the arrow block, activation 904 has an associated activation duration. In response to receiving data representing the activation, the device determines whether the activation duration exceeds a predetermined threshold. In some embodiments, the predetermined threshold is a predetermined length of time.

In accordance with a determination that the activation duration does not exceed the predetermined threshold (e.g., the input is a single press of button 902, as depicted by the short, single arrow block shown for activation 904), the device displays a user interface screen that includes at least a first affordance indicating a contact from a designated list of one or more contacts, wherein the designated list is a subset of a full list of contacts on the electronic device. For example, FIG. 9 shows user interface screen 906 that includes several affordances indicating contacts, such as affordance 908 that indicates a contact "Katie." Contacts may be indicated by a text such as a name or an image (e.g., a user- or system-designated image associated with the contact or with a contact entry for the contact).

In some embodiments, a button (e.g., 902) is a mechanical button, and the activation is a physical depression of the mechanical button. In some embodiments, a button (e.g., 902) is a capacitive button, and the activation is a touch on the capacitive button.

In some embodiments, the designated list of contacts is different from other sets of contacts, such as VIPs (very important persons) or favorites. For example, in some embodiments, the designated list of contacts may be contacts with whom the user has an emotional connection. This functionality provides methods of communicating with these designated contacts (described below) that are more informal, intimate, and/or frequent than those used for other sets of contacts like VIPs, which may be a more practical set of contacts and means of communication (e.g., email). By providing these functionalities of communicating with contacts with whom the user is emotionally connected, the connection between the device and the user is strengthened and extends beyond purely productivity- or work-related functions.

This button functionality allows the user to quickly access a user interface screen that includes affordance(s) indicating contact(s) from a designated list of one or more contacts. It is to be noted that, in some embodiments, this screen is accessed by a single press on the button, similar to the single press on the rotatable and depressible input mechanism, which in some embodiments allows the user to access a user interface screen that includes a plurality of affordances representing application(s). These parallel functionalities enhance the usability and intuitive feel of the device by providing access to conceptual similar functionalities (e.g., a designated contacts "home screen" and an applications "home screen") through similar types of inputs (e.g., a single press on the button and a single press on the rotatable and depressible input mechanism).

In some embodiments, the designated list of contacts is based on at least one of the following: time of day of interactions between the user and a contact (e.g., designated contacts may have more interactions with the user outside of typical weekday working hours relative to other contacts), frequency of interactions between the user and a contact (e.g., designated contacts may have an increased frequency of interactions with the user relative to other contacts), and length of interactions between the user and a contact (e.g., designated contacts may have longer interactions with the user relative to other contacts).

In some embodiments, the designated list of contacts is user-designated. For example, the device may provide a selection interface for the user to select contacts for the designated list of contacts.

In some embodiments, while the user interface screen is displayed, the device may receive second data representing a touch (e.g., a single press) on the touch-sensitive display at the location of an affordance corresponding to a contact. In response to receiving the second data, the device invokes a user prompt for selecting an application configured to provide a mode of interaction with the contact.

In some embodiments, the application configured to provide a mode of interaction with the contact is a text messaging application for sending a text to the contact. Advantageously, this functionality allows the user to quickly send a text to a designated contact without needing to enter a text messaging interface and then select the designated contact, allowing the user to interact with a designated contact more easily. In some embodiments, the application configured to provide a mode of interaction with the contact is a low-latency asynchronous voice communication application for opening low-latency asynchronous voice communication with the contact. In some embodiments, the application configured to provide a mode of interaction with the contact is an application for sending a drawing to a contact.

This button functionality allows the user to select a designated contact, then select a mode of interaction, rather than selecting the mode of interaction (e.g., by opening an application), then selecting the contact. Advantageously, this makes it easier for the user to interact with a contact, e.g., a contact with whom the user may frequently interact or with whom the user may be more eager to interact. That is to say, this functionality may improve the user interface with the device by allowing the user to prioritize a particular contact through quicker access to the contact, rather than forcing the user to first select the specific application for the interaction.

In some embodiments, while the user interface screen is displayed, the device receives third data representing a second touch on the touch-sensitive display at the location of a portion representing a contact and a third touch on the touch-sensitive display at the location of a portion representing a contact. The second and third touches are separated by an associated duration interval. In response to detecting the touches, the device determines whether the duration interval is less than a predetermined duration, and in accordance with a determination that the duration interval is less than the predetermined duration (e.g., a double touch on the portion representing the contact), the device provides an interface configured to receive data representing a user input and send a signal to a second electronic device. For example, in some embodiments, a user viewing the user interface screen may activate a display of a contact with a single tap to provide a mode of interaction with the contact (as described above), or the user may activate a display of a contact with a single tap to enter the interface.

The signal represents an instruction instructing the second electronic device to generate a haptic alert based on the data. In some embodiments, the user input represented by the data includes a touch on the touch-sensitive display. For example, if the data represent a series of touches on the display in a particular pattern, the haptic alert generated could be based on the particular pattern of touches. Therefore, this interface provides a way for the user to send a customizable haptic alert to a designated contact. This further reinforces the idea that the designated contacts are contacts with whom the user has an emotional connection by allowing the user to send a tangible message to the contact, even if the user and the contact are apart.

Figure 10:
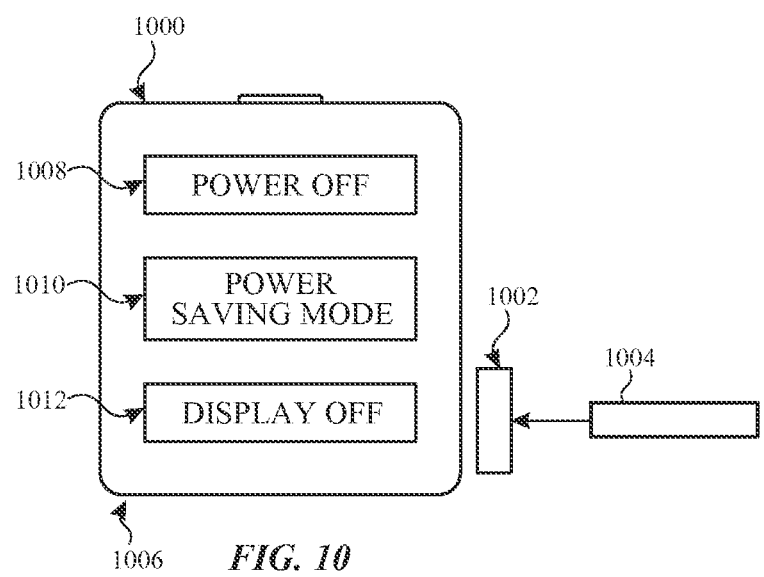
FIG. 10 illustrates exemplary button functionalities for user interfaces.

Attention is now directed to FIG. 10, which shows exemplary button functionalities for user interfaces that may be operated on device 1000. Device 1000 may be device 100, 300, or 500 in some embodiments. The electronic device has a display (e.g., 504). As shown in FIG. 10, device 1000 includes button 1002. The electronic device may also include a touch-sensitive surface (e.g., 504) and a rotatable and depressible input mechanism (e.g., 506, 602, 702, or 802).

As described above, in accordance with a determination that an activation of the button is a single press, the device displays a user interface screen that includes at least a first affordance indicating a contact from a designated list of one or more contacts. In some embodiments, in accordance with a determination that the activation duration of the button activation exceeds the predetermined threshold (e.g., an extended press on the button), the device substitutes the user interface screen with a second user interface screen that includes an affordance representing a user prompt to power off the electronic device.

For example, as depicted in FIG. 10, a user may activate button 1002 by activation 1004. As depicted by the long arrow block, activation 1004 is an extended press of button 1002. In response to receiving data representing activation 1004, the device displays user interface screen 1006, which includes affordance 1008. Affordance 1008 represents a user prompt to power off the electronic device. A user may tap, swipe, or otherwise activate affordance 1008 to power off the electronic device.

In some embodiments, screen 1006 also includes an affordance representing a user prompt to enter a power-saving mode of the electronic device (e.g., affordance 1010). In some embodiments, power-saving mode includes altering the device display (e.g., altering the color and/or brightness of one or more pixels) to reduce power consumption. In some embodiments, power-saving mode includes altering the function of one or more device components to reduce power consumption. For example, the device may alter or reduce the function of one or more RF circuitry components (such as wireless transceivers, Wi-Fi components, Bluetooth components, or other components that send and receive signals to and from external devices or servers), speakers, GPS sensor, accelerometer, directional sensor, gyroscope, motion sensor and/or other components of the device that consume power. In some embodiments, power consumption refers to battery power consumption. A user may tap, swipe, or otherwise activate affordance 1010 to enter a power-saving mode of the electronic device.

In some embodiments, screen 1006 also includes an affordance representing a user prompt to turn off the touch-sensitive display (e.g., affordance 1012). A user may tap, swipe, or otherwise activate affordance 1012 to turn off the touch-sensitive display.

In any of the embodiments described herein, the device may turn on the display in response to a user movement of the device (e.g., a wrist raise, lifting and/or rotation of the device, or any other indication that the user has moved the position of the device for viewing the display). As described above, the device may include various sensors, such as accelerometer 534, gyroscope 536, and motion sensor 538, that may allow the device to detect a user movement of the device. These can be operatively connected to I/O section 514, which could send a signal to the display to turn on the display. The device may also be configured to use these components to control turning off the display. In some embodiments, a lack of a specific motion input for a predetermined duration of time may cause the device to turn off the display.

In addition to any of these functionalities, allowing the user to further control the display through affordance 1012 is advantageous because some users may not be as capable of generating specific movements of the device configured to turn on or turn off the display. For example, if the user has interacts with or wears the device on a prosthetic limb, or uses a prosthetic limb to hold the device, the movements of the prosthetic limb may not generate the same types of movement that the device is configured to detect. Advantageously, this functionality makes the device more usable for disabled users and increases compliance with, e.g., the Americans with Disabilities Act.

In some embodiments, the device may be configured to detect the intensity of touches. This functionality is described in greater detail, for example, in reference to touchscreen 504 above. Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013.

In some embodiments, while user interface screen 1006 is displayed, device 1000 detects a first touch on the touch-sensitive display with a first characteristic intensity. In response to detecting the first touch, the device determines whether the first characteristic intensity is above an intensity threshold. In response to a determination that the first characteristic intensity is above the intensity threshold, the device executes a separate function of the electronic device. As used here, a "separate function" of the electronic device may refer to any device function not specifically ascribed to a rotatable and depressible input mechanism interaction or a button interaction described herein.

In some embodiments, when the device is powered off when the extended press of the button is received, and in accordance with a determination that the activation duration of the button activation exceeds the predetermined threshold (e.g., an extended press on the button), the device powers on. As described above, an extended press on the button may serve to power on or power off the device, depending on the state of the device when the button activation is detected.

In some embodiments, a button may include any of the functionalities described above in combination with one or more of the other functionalities described herein for a button. In some embodiments, device 900 and/or device 1000 may also include a rotatable and depressible input mechanism (e.g., 506, 602, 702, or 802) with one or more of the functionalities described herein for a rotatable and depressible input mechanism.

Figure 11:
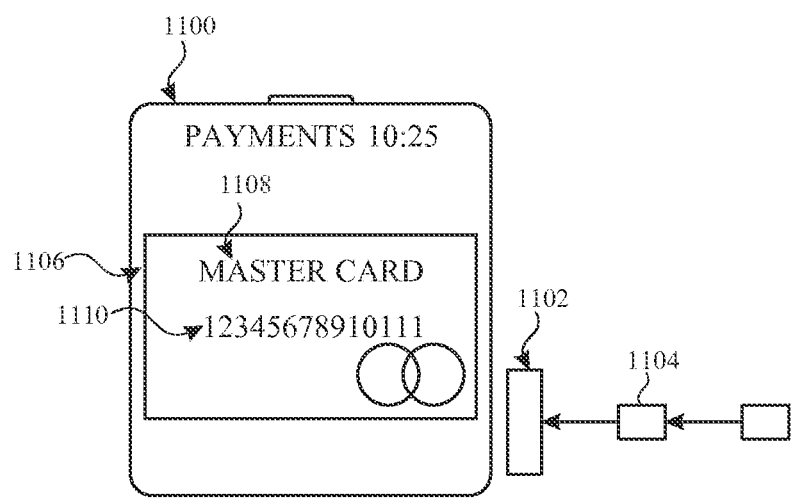
FIG. 11 illustrates exemplary button functionalities for user interfaces.

FIG. 11 shows exemplary button functionalities for user interfaces that may be operated on device 1100. Device 1100 may be device 100, 300, or 500 in some embodiments. The electronic device has a display (e.g., 504). As shown in FIG. 11, device 1100 includes button 1102. The electronic device may also include a touch-sensitive surface (e.g., 504) and a rotatable and depressible input mechanism (e.g., 506, 602, 702, or 802).

A user may activate button 1102 by activation 1104. As depicted in FIG. 11 by the arrow blocks, activation 1104 has a first activation and a second activation with an associated interval between the first and the second activations. In response to receiving data representing the first and second activations, the device determines whether the interval between the first and the second activations exceeds a predetermined threshold. In some embodiments, the predetermined threshold is a predetermined length of time.

In accordance with a determination that the interval does not exceed the predetermined threshold (e.g., a double press, rather than two sequential single presses), the device invokes a payments application. Further descriptions of exemplary payments applications may be found, for example in the related application U.S. Application Ser. No. 62/004,886, entitled "User Interface for Payments," filed May 29, 2014.

FIG. 11 shows a payments application user interface screen displayed by device 1100 in response to double press 1104 on button 1102. In some embodiments, invoking an application (e.g., a payments application) may include invoking and/or displaying an application that is already running. In some embodiments, double press 1104 may invoke a different state or screen of an already running and/or displayed application.

In some embodiments, the button (e.g., 1102) is a mechanical button, and both of the first and the second activations represent depressions of the mechanical button. In some embodiments, the button (e.g., 1102) is a capacitive button, and both of the first and the second activations represent touches on the capacitive button.

In some embodiments, the device displays a user interface screen that includes an affordance representing a mode of payment. In some embodiments, the mode of payment is a credit card. In some embodiments, the affordance depicts a visual representation of the face of the credit card, indicating a credit card number and a credit card company. As shown in FIG. 11, device 1100 displays affordance 1106, which represents a credit card. The credit card itself is indicated by the displayed credit card company name 1108 and the displayed credit card number 1110. In some embodiments, the credit card company and credit card number correspond to a user's credit card account.

In some embodiments, the mode of payment is a debit card. In some embodiments, the affordance depicts a visual representation of the face of the debit card, indicating a debit card number and a debit card bank. In some embodiments, the debit card bank and debit card number correspond to a user's debit account.

In some embodiments, the mode of payment is a bank account. In some embodiments, the affordance indicates at least one of a bank associated with the bank account, a type of the bank account, and a bank account number associated with the bank account. In some embodiments, the bank account is a checking account. In some embodiments, the bank account is a savings account.

This functionality allows the user to quickly invoke a payments application through an input (e.g., a double press of the button). It is to be noted that, in some embodiments, this application is invoked by a double press on the button, similar to the double press on the rotatable and depressible input mechanism, which in some embodiments allows the user to invoke a previously invoked application. These parallel functionalities enhance the usability and intuitive feel of the device by providing access to conceptual similar functionalities (e.g., applications) through similar types of inputs (e.g., a double press on the button and a double press on the rotatable and depressible input mechanism).

In some embodiments, a button may include any of the functionalities described above in combination with one or more of the other functionalities described herein for a button. In some embodiments, device 1100 may also include a rotatable and depressible input mechanism (e.g., 506, 602, 702, or 802) with one or more of the functionalities described herein for a rotatable and depressible input mechanism.

Figure 12:
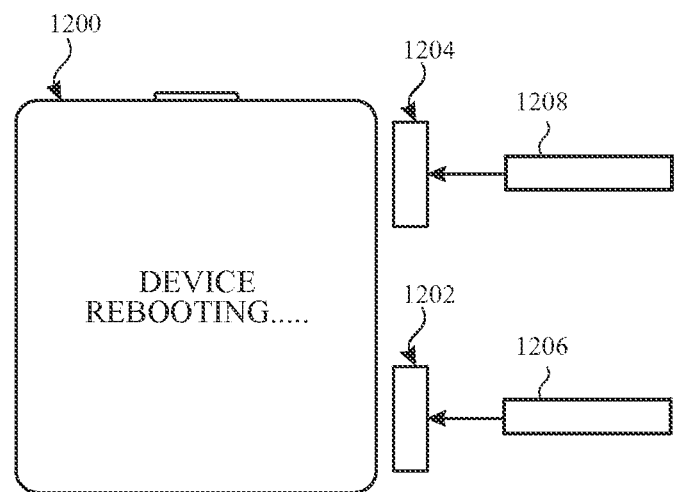
FIG. 12 illustrates exemplary button functionalities for user interfaces.

FIG. 12 shows exemplary button functionalities for user interfaces that may be operated on device 1200. Device 1200 may be device 100, 300, or 500 in some embodiments. The electronic device has a display (e.g., 504). As shown in FIG. 12, device 1200 includes button 1202 and rotatable and depressible input mechanism 1204. The electronic device may also include a touch-sensitive surface (e.g., 504).

A user may activate button 1202 and rotatable and depressible input mechanism 1204 by activations 1206 and 1208, respectively. Activation 1206 has a first associated activation duration, and activation 1208 has a second associated activation duration. As depicted in FIG. 12, activations 1206 and 1208 are received substantially simultaneously, such that activation 1208 overlaps with activation 1206 for an overlap interval.

In response to receiving the data, the device determines whether the data meet predetermined criteria. In accordance with a determination that the data meet the predetermined criteria, the device reboots. In some embodiments, the reboot is a hard reboot. In some embodiments, the reboot is a soft reboot.

In some embodiments, the rotatable and depressible input mechanism (e.g., 1204) is a mechanical button that is rotatable, and the activation of the rotatable and depressible input mechanism includes a depression of the mechanical button. In some embodiments, the rotatable and depressible input mechanism (e.g., 1204) is a capacitive button that is rotatable, and the activation of the rotatable and depressible input mechanism includes a touch on the capacitive button. In some embodiments, the activation of the rotatable and depressible input mechanism (e.g., 1208) does not include a rotation of the rotatable and depressible input mechanism. In some embodiments, detection of the activation is based on detecting a press such as a physical depression or a touch and does not require a rotation for detection.

In some embodiments, the button (e.g., 1202) is a mechanical button, and the activation of the button includes a depression of the mechanical button. In some embodiments, the button (e.g., 1202) is a capacitive button, and wherein the activation of the button includes a touch on the capacitive button.

In some embodiments, the predetermined criteria relate to the first and second activation durations. In some embodiments, device 1200 determines whether both the first and the second activation durations exceed a predetermined threshold, and in accordance with a determination that both the first and the second activation durations exceed the predetermined threshold (e.g., extended presses on button 1202 and rotatable and depressible input mechanism 1204), the device reboots. In some embodiments, the predetermined threshold is a predetermined length of time.

In some embodiments, the predetermined criteria relate to the overlap interval. In some embodiments, device 1200 determines whether overlap interval exceeds a second predetermined threshold, and in accordance with a determination that the overlap interval exceeds the second predetermined threshold (e.g., substantially simultaneous extended presses on button 1202 and rotatable and depressible input mechanism 1204), the device reboots.

In some embodiments, a button and/or a rotatable and depressible input mechanism may include any of the functionalities described above in combination with one or more of the other functionalities described herein for a button and/or a rotatable and depressible input mechanism.

In some embodiments, an electronic device (e.g., multifunction device 500) may have a rotatable and depressible input mechanism (e.g., 602, 616, 626, 702, 802, or 1204) with one or more of the associated functionalities described herein and a button (e.g., 902, 1002, 1102, or 1202) with one of more of the associated functionalities described herein. The electronic device has a display (e.g., 504). The electronic device may also include a touch-sensitive surface (e.g., 504). In some embodiments, the device receives data representing an activation of the rotatable and depressible input mechanism and determines whether the activation represents a single press of the rotatable and depressible input mechanism (as described above), a double press of the rotatable and depressible input mechanism (as described above), or an extended press of the rotatable and depressible input mechanism (as described above). In accordance with a determination that the activation represents a single press of the rotatable and depressible input mechanism, the device displays a first user interface screen on the display, the first user interface screen including a plurality of affordances with an affordance representing an application. In accordance with a determination that the activation represents a double press of the rotatable and depressible input mechanism, the device invokes a previously invoked application. In accordance with a determination that the activation represents an extended press of the rotatable and depressible input mechanism, the device determines a state of an active application, and in accordance with a determination of the state of the active application, the device performs an action. In some embodiments, the device receives data representing an activation of the button and determines whether the activation represents a single press of the button (as described above), a double press of the button (as described above), or an extended press of the button (as described above). In accordance with a determination that the activation represents a single press of the button, the device displays a first user interface screen including at least a first affordance indicating a contact from a designated list of one or more contacts, where the designated list is a subset of a full list of contacts on the electronic device. In accordance with a determination that the activation represents a double press of the button, the device invokes a payments application. In accordance with a determination that the activation represents an extended press of the button, the device displays a second user interface screen that includes a user prompt to power off the electronic device. In some embodiments, the device receives data representing an activation of the button and an activation of the rotatable and depressible input mechanism, determines whether the data meet predetermined criteria, and in accordance with a determination that the data meet the predetermined criteria, the device reboots.

Figure 13:
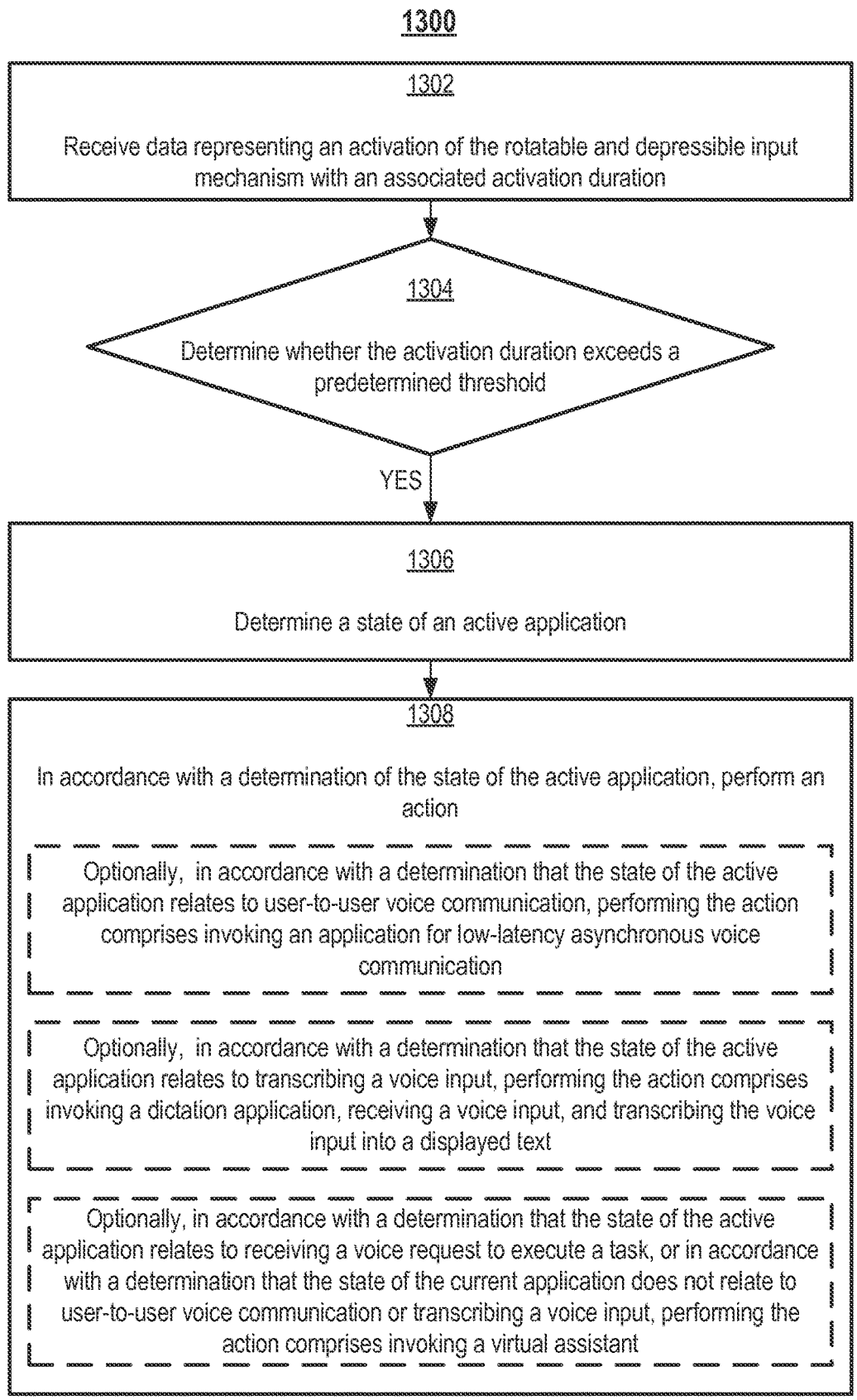
FIG. 13 is a flow diagram illustrating a process for button functionalities for user interfaces.

FIG. 13 is a flow diagram illustrating process 1300 for button functionalities for user interfaces. In some embodiments, process 1300 may be performed at an electronic device with a touch-sensitive display and a rotatable and depressible input mechanism, such as device 500 (FIG. 5) or device 600 (FIGS. 6A and 6B). Some operations in method 1300 may be combined, the order of some operations may be changed, and some operations may be omitted.

At block 1302, the device receives data representing an activation of the rotatable and depressible input mechanism with an associated activation duration. At block 1304, a determination is made as to whether the activation duration exceeds a predetermined threshold. At block 1306, a determination of a state of an active application is made. At block 1308, in accordance with a determination that the activation duration exceeds the predetermined threshold, and in accordance with a determination of the state of the active application, the device performs an action. Optionally, at block 1308, in accordance with a determination that the state of the active application relates to user-to-user voice communication, the device performs the action at least in part by invoking an application for low-latency asynchronous voice communication. Optionally, at block 1308, in accordance with a determination that the state of the active application relates to transcribing a voice input, the device performs the action at least in part by invoking a dictation application, receiving a voice input, and transcribing the voice input into a displayed text. Optionally, at block 1308, in accordance with a determination that the state of the active application relates to receiving a voice request to execute a task, or in accordance with a determination that the state of the current application does not relate to user-to-user voice communication or transcribing a voice input, the device performs the action at least in part by invoking a virtual assistant. Optionally, the device may further include any of the features described herein in reference to FIGS. 6A and 6B (e.g., device 600).

Note that details of the processes described above with respect to method 1300 (FIG. 13) are also applicable in an analogous manner to the methods described below. For example, method 1400 (FIG. 14), method 1500 (FIG. 15), method 1600 (FIG. 16), method 1700 (FIG. 17), method 1800 (FIG. 18), method 1900 (FIG. 19), and method 2000

(FIG. 20) may include one or more of the characteristics of the various methods described above with reference to method 1300. For brevity, these details are not repeated below.

It should be understood that the particular order in which the operations in FIG. 13 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1300 may be relevant to method 1400, method 1500, method 1600, method 1700, method 1800, method 1900, and method 2000.

Figure 14:
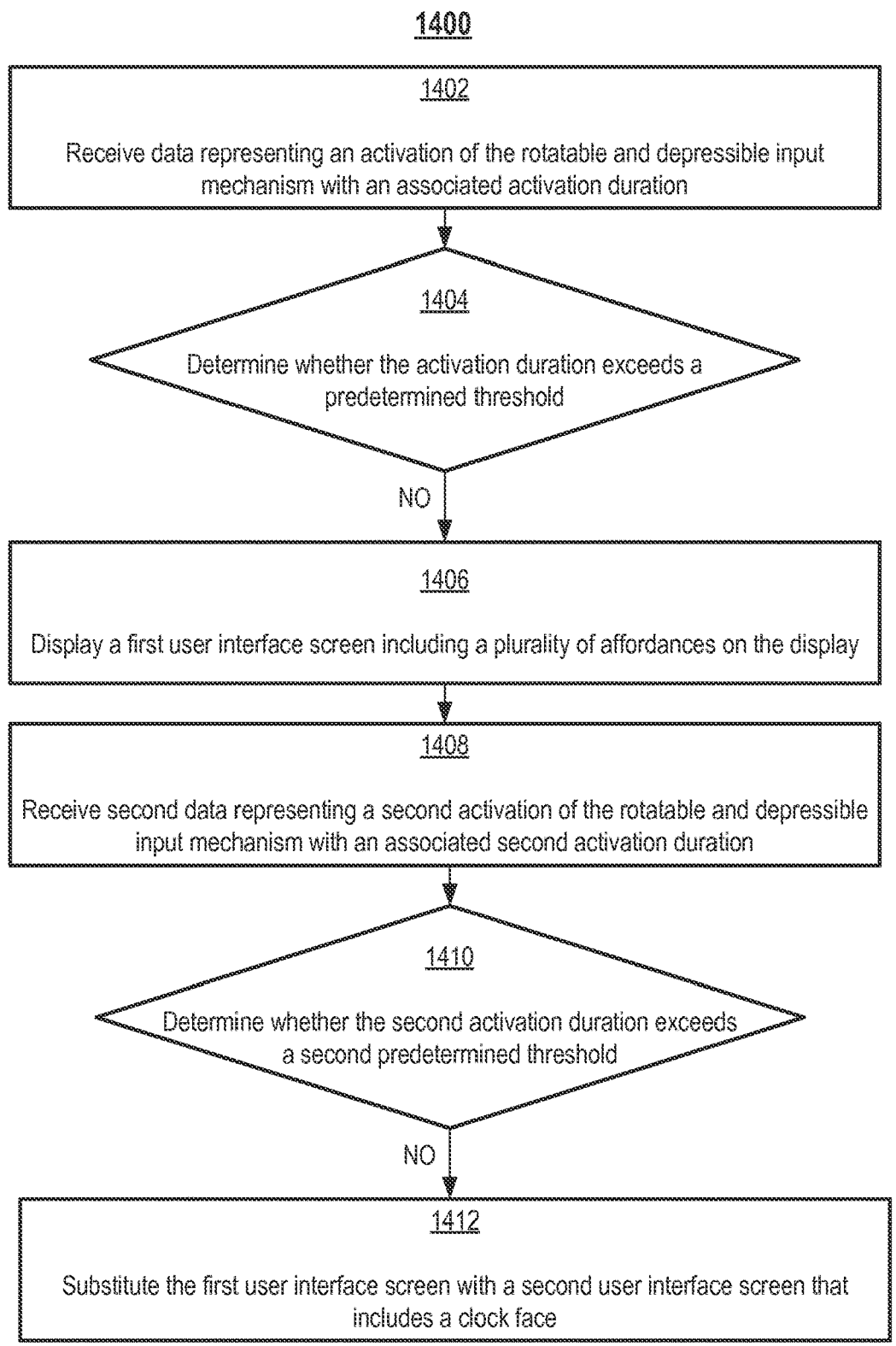
FIG. 14 is a flow diagram illustrating a process for button functionalities for user interfaces

FIG. 14 is a flow diagram illustrating process 1400 for button functionalities for user interfaces. In some embodiments, process 1400 may be performed at an electronic device with a touch-sensitive display and a rotatable and depressible input mechanism, such as device 500 (FIG. 5) or device 700 (FIG. 7). Some operations in method 1400 may be combined, the order of some operations may be changed, and some operations may be omitted.

At block 1402, the device receives data representing an activation of the rotatable and depressible input mechanism with an associated activation duration. At block 1404, a determination is made as to whether the activation duration exceeds a predetermined threshold. At block 1406, in accordance with a determination that the activation duration does not exceed the predetermined threshold, the device displays a first user interface screen including a plurality of affordances on the display. At block 1408, while the first user interface screen is displayed, the device receives second data representing a second activation of the rotatable and depressible input mechanism with an associated second activation duration. At block 1410, a determination is made as to whether the second activation duration exceeds a second predetermined threshold. At block 1412, in accordance with a determination that the second activation duration does not exceed the second predetermined threshold, the device substitutes the first user interface screen with a second user interface screen that includes a clock face. Optionally, the device may further include any of the features described herein in reference to FIG. 7 (e.g., device 700).

Note that details of the processes described above with respect to method 1400 (FIG. 14) are also applicable in an analogous manner to the methods described below. For example, method 1300 (FIG. 13), method 1500 (FIG. 15), method 1600 (FIG. 16), method 1700 (FIG. 17), method 1800 (FIG. 18), method 1900 (FIG. 19), and method 2000 (FIG. 20) may include one or more of the characteristics of the various methods described above with reference to method 1400. For brevity, these details are not repeated below.

It should be understood that the particular order in which the operations in FIG. 14 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1400 may be relevant to method 1300, method 1500, method 1600, method 1700, method 1800, method 1900, and method 2000.

Figure 15:
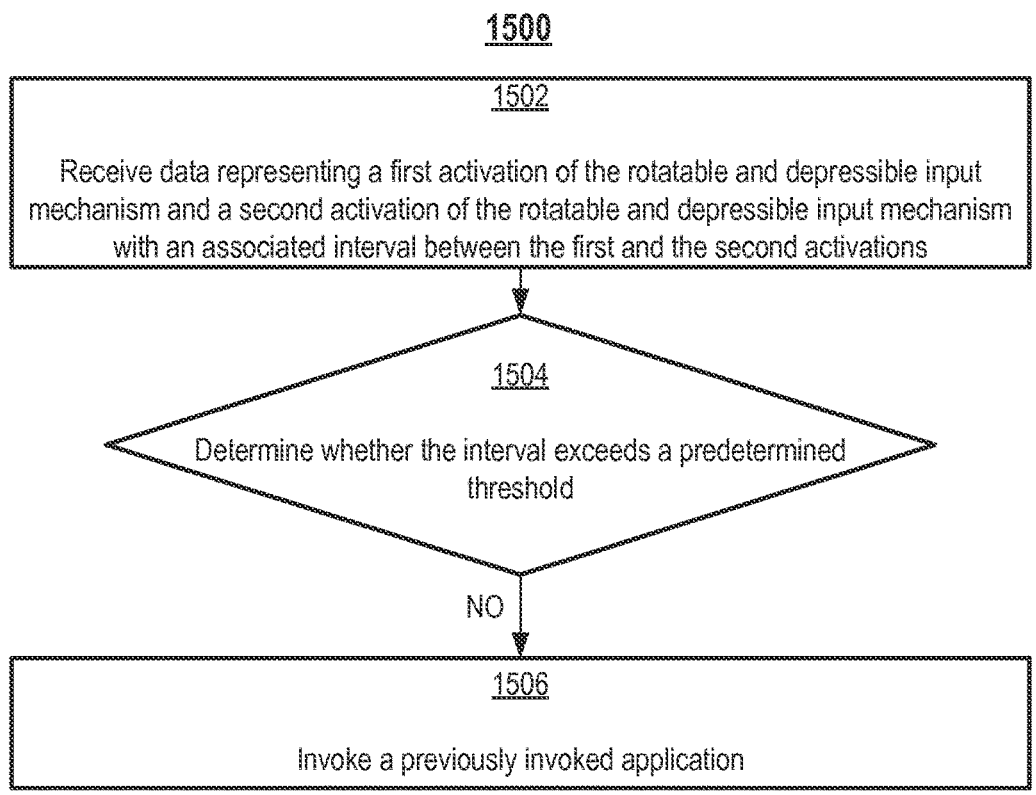
FIG. 15 is a flow diagram illustrating a process for button functionalities for user interfaces.

FIG. 15 is a flow diagram illustrating process 1500 for button functionalities for user interfaces. In some embodiments, process 1500 may be performed at an electronic device with a touch-sensitive display and a rotatable and depressible input mechanism, such as device 500 (FIG. 5) or device 800 (FIG. 8). Some operations in method 1500 may be combined, the order of some operations may be changed, and some operations may be omitted.

At block 1502, the device receives data representing a first activation of the rotatable and depressible input mechanism and a second activation of the rotatable and depressible input mechanism with an associated interval between the first and the second activations. At block 1504, a determination is made as to whether the interval exceeds a predetermined threshold. At block 1506, in accordance with a determination that the interval does not exceed the predetermined threshold, the device invokes a previously invoked application. Optionally, the device may further include any of the features described herein in reference to FIG. 8 (e.g., device 800).

Note that details of the processes described above with respect to method 1500 (FIG. 15) are also applicable in an analogous manner to the methods described below. For example, method 1300 (FIG. 13), method 1400 (FIG. 14), method 1600 (FIG. 16), method 1700 (FIG. 17), method 1800 (FIG. 18), method 1900 (FIG. 19), and method 2000 (FIG. 20) may include one or more of the characteristics of the various methods described above with reference to method 1500. For brevity, these details are not repeated below.

It should be understood that the particular order in which the operations in FIG. 15 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1500 may be relevant to method 1300, method 1400, method 1600, method 1700, method 1800, method 1900, and method 2000.

Figure 16:
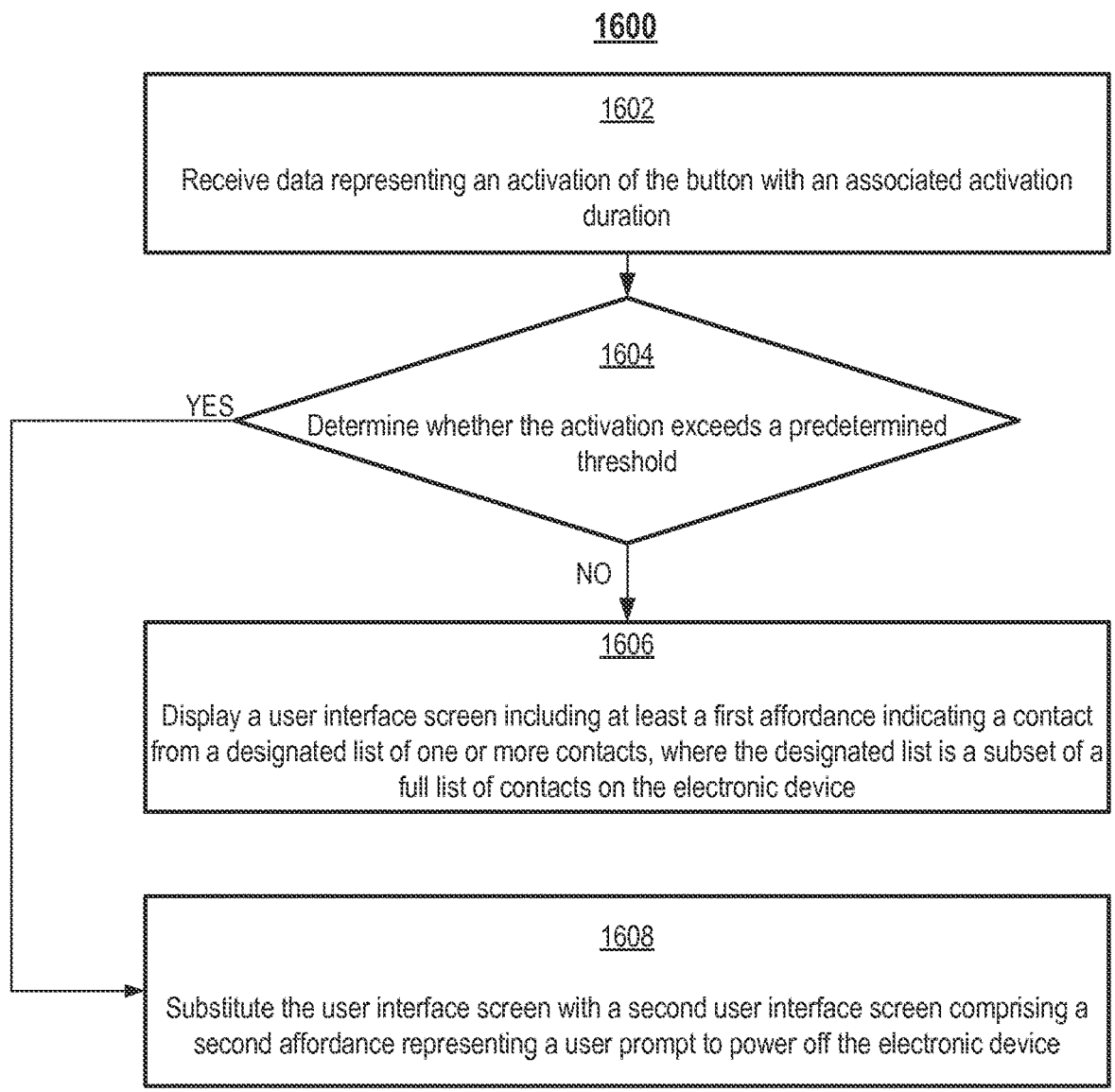
FIG. 16 is a flow diagram illustrating a process for button functionalities for user interfaces.

FIG. 16 is a flow diagram illustrating process 1600 for button functionalities for user interfaces. In some embodiments, process 1600 may be performed at an electronic device with a touch-sensitive display a rotatable and depressible input mechanism, and a button, such as device 500 (FIG. 5), device 900 (FIG. 9), or device 1000 (FIG. 10). Some operations in method 1600 may be combined, the order of some operations may be changed, and some operations may be omitted.

At block 1602, the device receives data representing an activation of the button with an associated activation duration. At block 1604, a determination is made as to whether the activation exceeds a predetermined threshold. At block 1606, in accordance with a determination that the activation does not exceed the predetermined threshold, the device displays a user interface screen including at least a first affordance indicating a contact from a designated list of one or more contacts, where the designated list is a subset of a full list of contacts on the electronic device. At block 1608, in accordance with a determination that the activation exceeds the predetermined threshold, the device substitutes the user interface screen with a second user interface screen comprising a second affordance representing a user prompt to power off the electronic device. Optionally, the device may further include any of the features described herein in reference to FIGS. 9 and 10 (e.g., device 900 or device 1000).

Note that details of the processes described above with respect to method 1600 (FIG. 16) are also applicable in an analogous manner to the methods described below. For example, method 1300 (FIG. 13), method 1400 (FIG. 14), method 1500 (FIG. 15), method 1700 (FIG. 17), method 1800 (FIG. 18), method 1900 (FIG. 19), and method 2000 (FIG. 20) may include one or more of the characteristics of the various methods described above with reference to method 1600. For brevity, these details are not repeated below.

It should be understood that the particular order in which the operations in FIG. 16 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1600 may be relevant to method 1300, method 1400, method 1500, method 1700, method 1800, method 1900, and method 2000.

Figure 17:
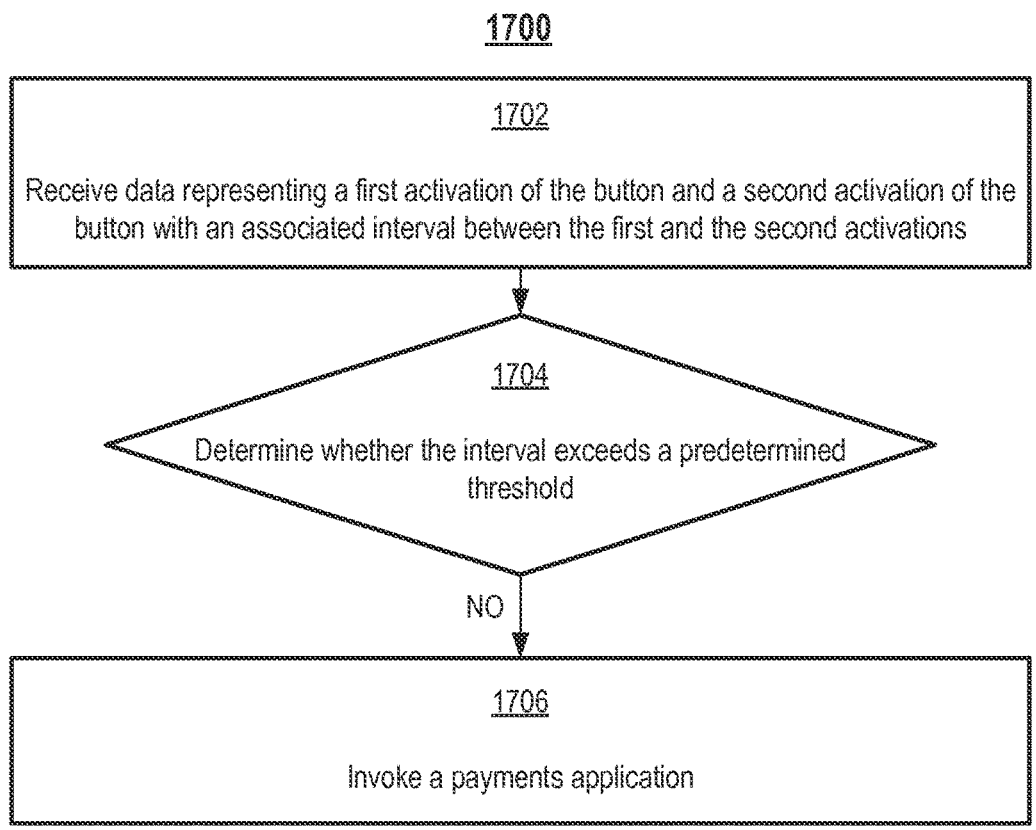
FIG. 17 is a flow diagram illustrating a process for button functionalities for user interfaces.

FIG. 17 is a flow diagram illustrating process 1700 for button functionalities for user interfaces. In some embodiments, process 1700 may be performed at an electronic device with a touch-sensitive display a rotatable and depressible input mechanism, and a button, such as device 500 (FIG. 5) or device 1100 (FIG. 11). Some operations in method 1700 may be combined, the order of some operations may be changed, and some operations may be omitted.

At block 1702, the device receives data representing a first activation of the button and a second activation of the button with an associated interval between the first and the second activations. At block 1704, a determination is made as to whether the interval exceeds a predetermined threshold. At block 1706, in accordance with a determination that the interval does not exceed the predetermined threshold, the device invokes a payments application. Optionally, the device may further include any of the features described herein in reference to FIG. 11 (e.g., device 1100).

Note that details of the processes described above with respect to method 1700 (FIG. 17) are also applicable in an analogous manner to the methods described below. For example, method 1300 (FIG. 13), method 1400 (FIG. 14), method 1500 (FIG. 15), method 1600 (FIG. 16), method 1800 (FIG. 18), method 1900 (FIG. 19), and method 2000 (FIG. 20) may include one or more of the characteristics of the various methods described above with reference to method 1700. For brevity, these details are not repeated below.

It should be understood that the particular order in which the operations in FIG. 17 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1700 may be relevant to method 1300, method 1400, method 1500, method 1600, method 1800, method 1900, and method 2000.

Figure 18:
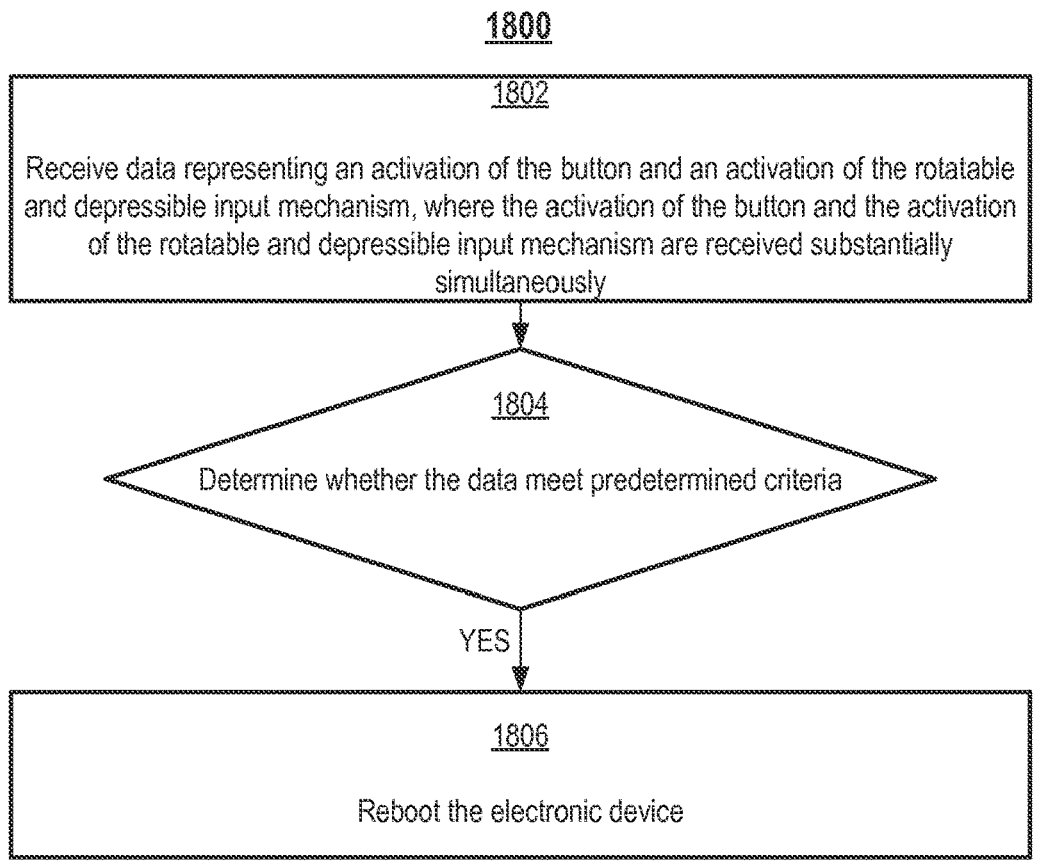
FIG. 18 is a flow diagram illustrating a process for button functionalities for user interfaces.

FIG. 18 is a flow diagram illustrating process 1800 for button functionalities for user interfaces. In some embodiments, process 1800 may be performed at an electronic device with a touch-sensitive display a rotatable and depressible input mechanism, and a button, such as device 500 (FIG. 5) or device 1200 (FIG. 12). Some operations in method 1800 may be combined, the order of some operations may be changed, and some operations may be omitted.

At block 1802, the device receives data representing an activation of the button and an activation of the rotatable and depressible input mechanism, where the activation of the button and the activation of the rotatable and depressible input mechanism are received substantially simultaneously. At block 1804, a determination is made as to whether the data meet predetermined criteria. At block 1806, in accordance with the determination that the data meet the predetermined criteria, the device is rebooted. Optionally, the device may further include any of the features described herein in reference to FIG. 12 (e.g., device 1200).

Note that details of the processes described above with respect to method 1800 (FIG. 18) are also applicable in an analogous manner to the methods described below. For example, method 1300 (FIG. 13), method 1400 (FIG. 14), method 1500 (FIG. 15), method 1600 (FIG. 16), method 1700 (FIG. 17), method 1900 (FIG. 19), and method 2000 (FIG. 20) may include one or more of the characteristics of the various methods described above with reference to method 1800. For brevity, these details are not repeated below.

It should be understood that the particular order in which the operations in FIG. 18 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1800 may be relevant to method 1300, method 1400, method 1500, method 1600, method 1700, method 1900, and method 2000.

Figure 19:
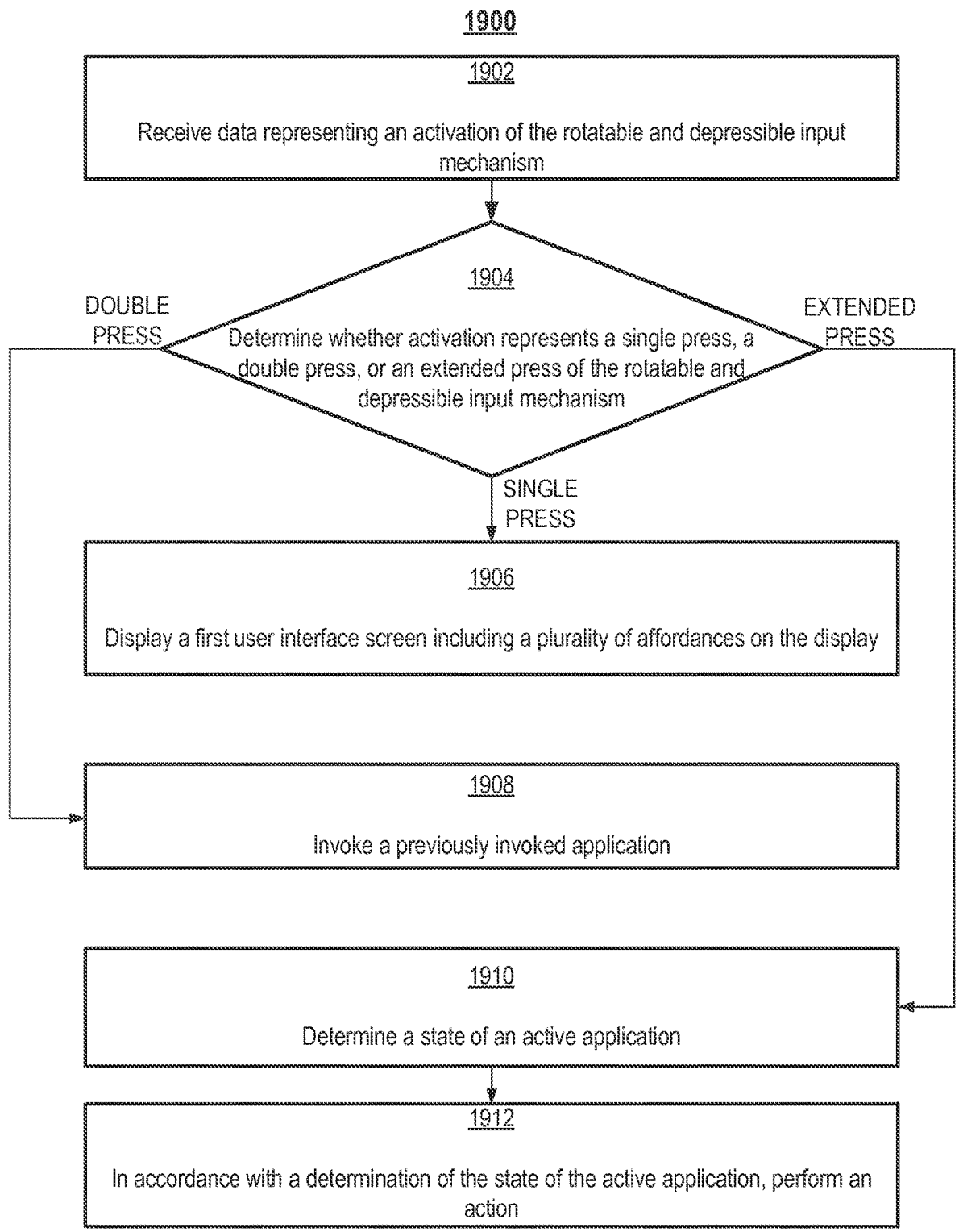
FIG. 19 is a flow diagram illustrating a process for button functionalities for user interfaces.

FIG. 19 is a flow diagram illustrating process 1900 for button functionalities for user interfaces. In some embodiments, process 1900 may be performed at an electronic device with a touch-sensitive display a rotatable and depressible input mechanism, and a button, such as device 500 (FIG. 5) or device 1200 (FIG. 12). Some operations in method 1900 may be combined, the order of some operations may be changed, and some operations may be omitted.

At block 1902, the device receives data representing an activation of the rotatable and depressible input mechanism. At block 1902, a determination is made as to whether the activation represents a single press, a double press, or an extended press of the rotatable and depressible input mechanism. At block 1906, in accordance with a determination that the activation represents a single press of the rotatable and depressible input mechanism, the device displays a first user interface screen including a plurality of affordances on the display. At block 1908, in accordance with a determination that the activation represents a double press of the rotatable and depressible input mechanism, the device invokes a previously invoked application. At block 1910, in accordance with a determination that the activation represents an extended press of the rotatable and depressible input mechanism, the device determines a state of an active application. At block 1912, in accordance with a determination of the state of the active application, the device performs an action.

Note that details of the processes described above with respect to method 1900 (FIG. 19) are also applicable in an analogous manner to the methods described below. For example, method 1300 (FIG. 13), method 1400 (FIG. 14), method 1500 (FIG. 15), method 1600 (FIG. 16), method 1700 (FIG. 17), method 1800 (FIG. 18), and method 2000 (FIG. 20) may include one or more of the characteristics of the various methods described above with reference to method 1900. For brevity, these details are not repeated below.

It should be understood that the particular order in which the operations in FIG. 19 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 1900 may be relevant to method 1300, method 1400, method 1500, method 1600, method 1700, method 1800, and method 2000.

Figure 20:
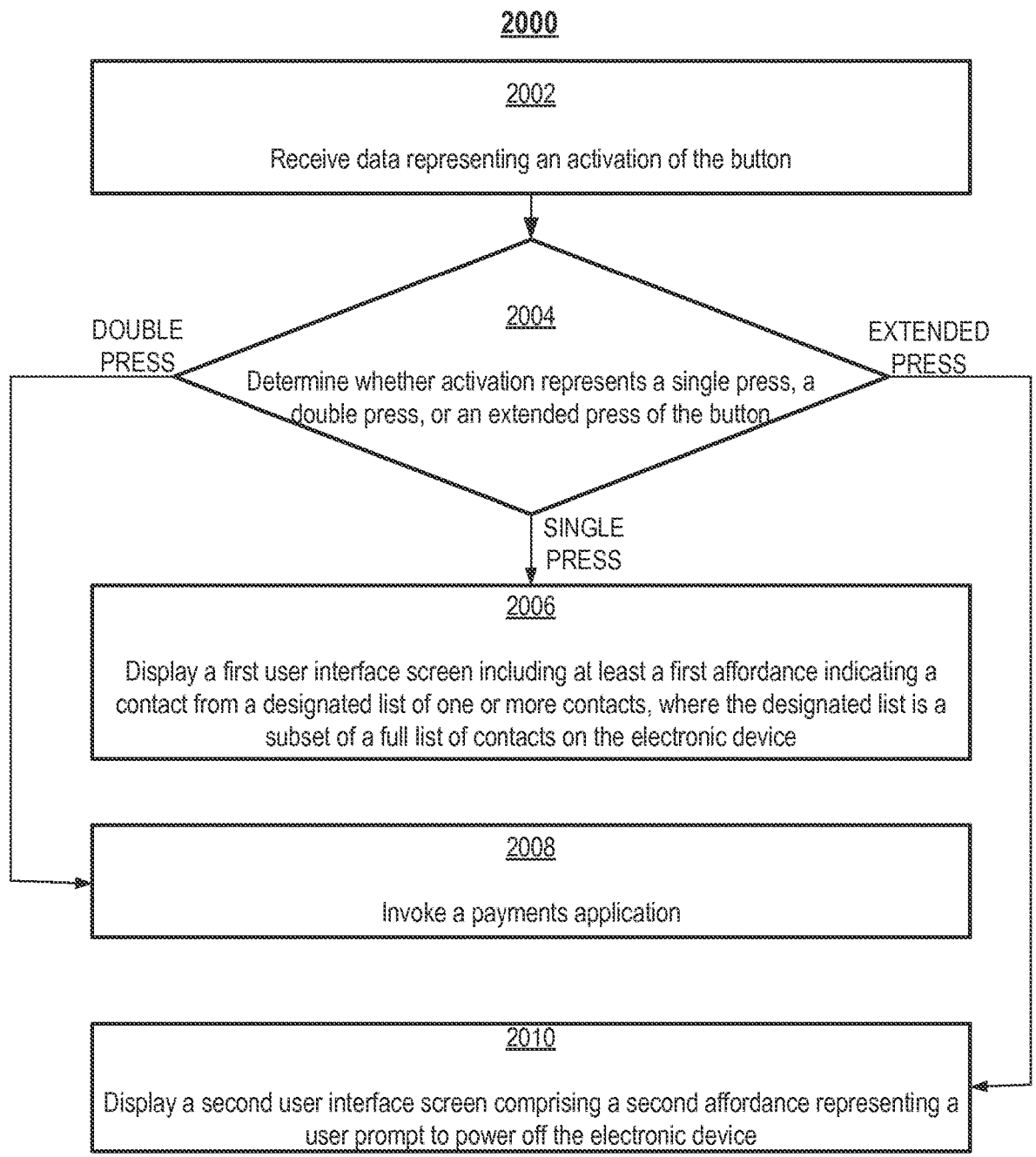
FIG. 20 is a flow diagram illustrating a process for button functionalities for user interfaces.

FIG. 20 is a flow diagram illustrating process 2000 for button functionalities for user interfaces. In some embodiments, process 2000 may be performed at an electronic device with a touch-sensitive display a rotatable and depressible input mechanism, and a button, such as device 500 (FIG. 5) or device 1200 (FIG. 12). Some operations in method 2000 may be combined, the order of some operations may be changed, and some operations may be omitted.

At block 2002, the device receives data representing an activation of the button. At block 2004, a determination is made as to whether the activation represents a single press, a double press, or an extended press of the button. At block 2006, in accordance with a determination that the activation represents a single press of the button, the device displays a first user interface screen including at least a first affordance indicating a contact from a designated list of one or more contacts, where the designated list is a subset of a full list of contacts on the electronic device. At block 2008, in accordance with a determination that the activation represents a double press of the button, the device invokes a payments application. At block 2010, in accordance with a determination that the activation represents an extended press of the button, the device displays a second user interface screen comprising a second affordance representing a user prompt to power off the electronic device.

Note that details of the processes described above with respect to method 12000 (FIG. 20) are also applicable in an analogous manner to the methods described below. For example, method 1300 (FIG. 13), method 1400 (FIG. 14), method 1500 (FIG. 15), method 1600 (FIG. 16), method 1700 (FIG. 17), method 1800 (FIG. 18), and method 1900 (FIG. 19) may include one or more of the characteristics of the various methods described above with reference to method 2000. For brevity, these details are not repeated below.

It should be understood that the particular order in which the operations in FIG. 20 have been described is exemplary and not intended to indicate that the described order is the only order in which the operations could be performed. One of ordinary skill in the art would recognize various ways to reorder the operations described herein, as well as excluding certain operations. For brevity, these details are not repeated here. Additionally, it should be noted that aspects of method 1300 (FIG. 13), method 1400 (FIG. 14), method 1500 (FIG. 15), method 1600 (FIG. 16), method 1700 (FIG. 17), method 1800 (FIG. 18), method 1900 (FIG. 19), and method 2000 (FIG. 20) may be incorporated with one another. Thus, the techniques described with respect to method 2000 may be relevant to method 1300, method 1400, method 1500, method 1600, method 1700, method 1800, and method 1900.

Figure 21:
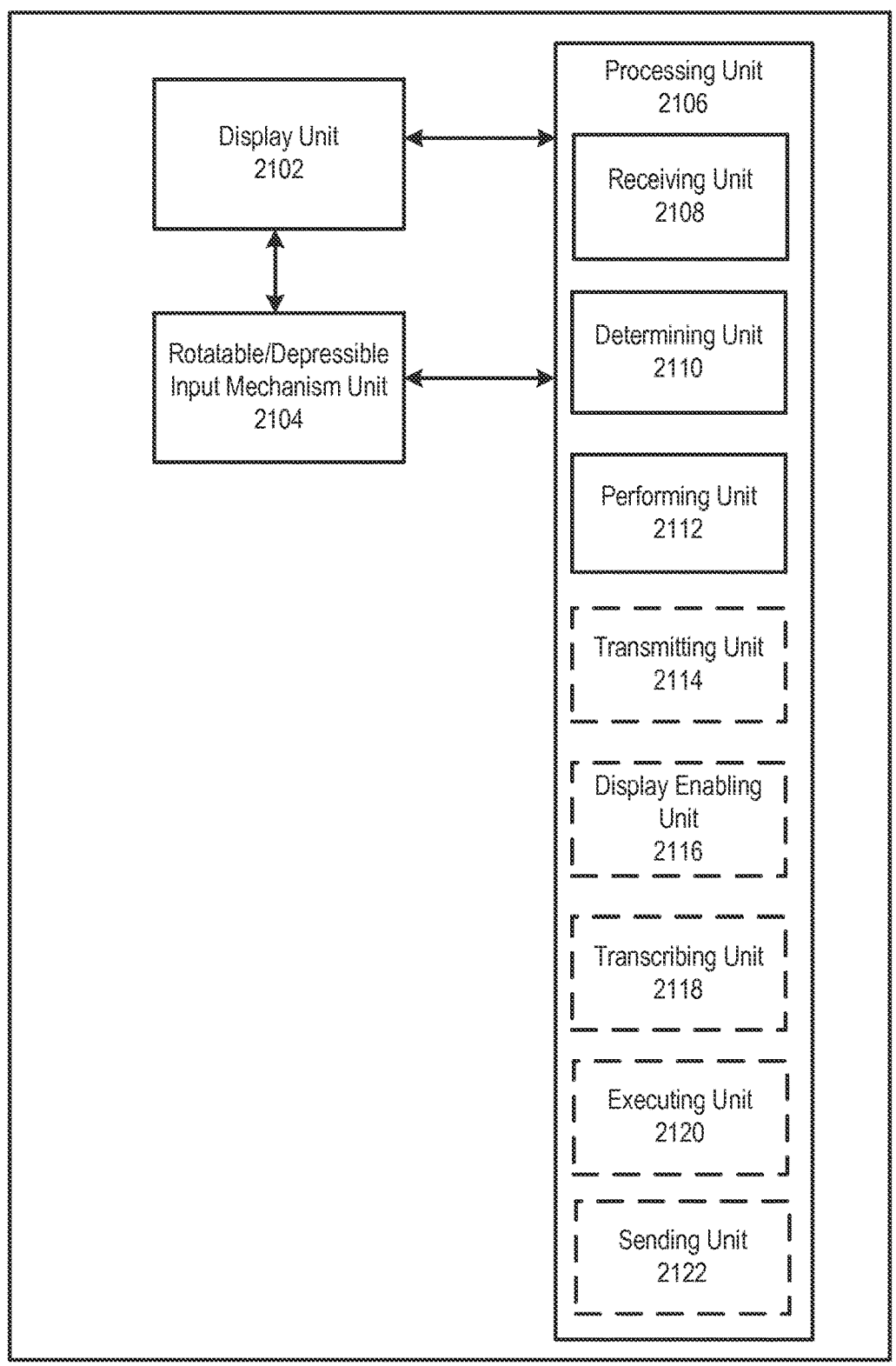
FIG. 21 is a functional block diagram of an electronic device in accordance with some embodiments.

In accordance with some embodiments, FIG. 21 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes a display unit 2102 configured to display a graphic user interface, a rotatable and depressible input mechanism unit 2104, and a processing unit 2106 coupled to the display unit 2102 and the rotatable and depressible input mechanism unit 2104. In some embodiments, the processing unit 2106 includes a receiving unit 2108, a determining unit 2110, a performing unit 2112, and optionally, a transmitting unit 2114, a display enabling unit 2116, a transcribing unit 2118, an executing unit 2120, and a sending unit 2122.

The processing unit 2106 is configured to receive (e.g., with the receiving unit 2108) data representing an activation of the rotatable and depressible input mechanism unit 2104, the activation having an associated activation duration; determine (e.g., with the determining unit 2110) whether the activation duration exceeds a predetermined threshold; determine (e.g., with the determining unit 2110) a state of an active application; and in accordance with a determination that the activation duration exceeds the predetermined threshold, and in accordance with a determination of the state of the active application, perform (e.g., with the performing unit 2112) an action.

In some embodiments, the rotatable and depressible input mechanism unit 2104 is a mechanical button that is rotatable, and the activation represents a depression of the mechanical button.

In some embodiments, the rotatable and depressible input mechanism unit 2104 is a capacitive button that is rotatable, and the activation represents a touch on the capacitive button.

In some embodiments, the activation does not represent a rotation of the rotatable and depressible input mechanism unit 2104.

In some embodiments, in accordance with a determination that the state of the active application relates to user-to-user voice communication, performing the action comprises invoking an application for low-latency asynchronous voice communication.

In some embodiments, the processing unit 2106 is further configured to, after invoking the application for low-latency asynchronous voice communication, receive (e.g., with the receiving unit 2108) a voice input; and transmit (e.g., with the transmitting unit 2114) the voice input to a second electronic device capable of receiving the voice input.

In some embodiments, in accordance with a determination that the state of the active application relates to transcribing a voice input, performing the action comprises invoking a dictation application, receiving a voice input, and transcribing the voice input into a displayed text.

In some embodiments, in accordance with a determination that the state of the active application relates to receiving a voice request to execute a task, or in accordance with a determination that the state of the current application does not relate to user-to-user voice communication or transcribing a voice input, performing the action comprises invoking a virtual assistant.

In some embodiments, the processing unit 2106 is further configured to, after invoking the virtual assistant, enable display (e.g., with the display enabling unit 2116) of a user interface screen on the display unit 2102, the user interface screen including a user prompt for voice input.

In some embodiments, the processing unit 2106 is further configured to receive a voice input.

In some embodiments, the processing unit 2106 is further configured to transcribe (e.g., with the transcribing unit 2118) the voice input into text and enable display (e.g., with the display enabling unit 2116) of the text on the display unit.

In some embodiments, the processing unit 2106 is further configured to enable display (e.g., with the display enabling unit 2116) of a waveform based on the voice input on the display unit 2102 at a first position.

In some embodiments, the first position is adjacent to the rotatable and depressible input mechanism unit 2104.

In some embodiments, the processing unit 2106 is further configured to determine (e.g., with the determining unit 2110) whether the third voice input comprises a request to execute a task executable by the virtual assistant and, in accordance with a determination that the third voice input comprises a request to execute a task executable by the virtual assistant, execute (e.g., with the executing unit 2120), by the virtual assistant, the task.

In some embodiments, the virtual assistant is run on the electronic device.

In some embodiments, the virtual assistant is run on an external device in wireless communication with the electronic device.

In some embodiments, the processing unit 2106 is further configured to send (e.g., with the sending unit 2122) first data representing the voice input to the external device; and receive (e.g., with the receiving unit 2108), via wireless communication, second data from the external device, the second data representing a request to execute a task executable by the virtual assistant; transcribe (e.g., with the transcribing unit 2118) the request into text; and enable display (e.g., with the display enabling unit 2116) of the text on the display unit 2102.

In some embodiments, the processing unit 2106 is further configured to enable display (e.g., with the display enabling unit 2116) of an affordance representing a user prompt to display additional data related to the request on the external device.

The operations described above with reference to FIG. 13 are, optionally, implemented by components depicted in FIGS. 1A-1B or FIG. 21. For example, receiving operation 1302, determining operations 1304 and 1306, and performing operation 1308 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22:
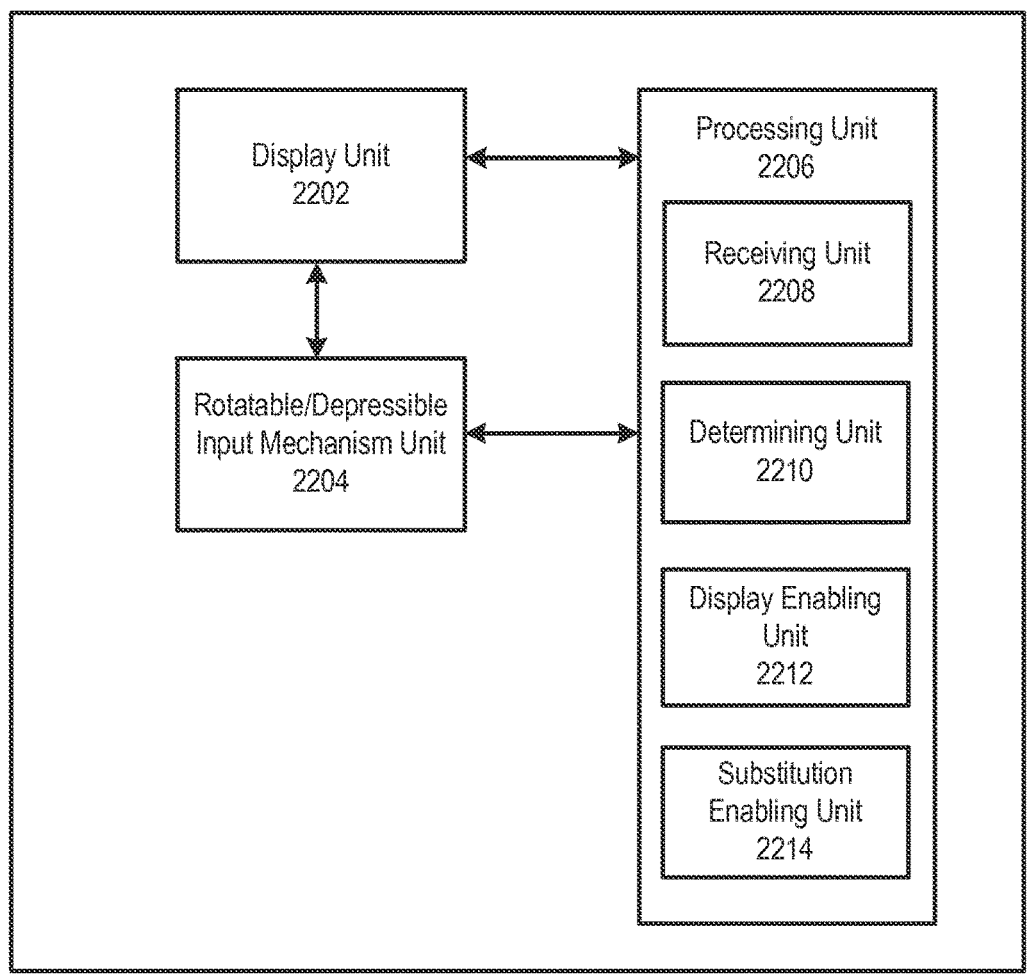
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display a graphic user interface, a rotatable and depressible input mechanism unit 2204, and a processing unit 2206 coupled to the display unit 2202 and the rotatable and depressible input mechanism unit 2204. In some embodiments, the processing unit 2206 includes a receiving unit 2208, a determining unit 2210, a display enabling unit 2212, and a substitution enabling unit 2214.

The processing unit 2206 is configured to receive (e.g., with the receiving unit 2208) data representing an activation of the rotatable and depressible input mechanism unit 2204, the activation having an associated activation duration; determine (e.g., with the determining unit 2210) whether the activation duration exceeds a predetermined threshold; in accordance with a determination that the activation duration does not exceed the predetermined threshold, enable display (e.g., with the display enabling unit 2212) of a first user interface screen on the display unit 2202, the first user interface screen including a plurality of affordances and the plurality of affordances comprising an affordance representing an application; while the first user interface screen is displayed, receive (e.g., with the receiving unit 2208) second data representing a second activation of the rotatable and depressible input mechanism unit 2204, the second activation having an associated second activation duration; determine (e.g., with the determining unit 2210) whether the second activation duration exceeds a second predetermined threshold; and, in accordance with a determination that the second activation duration does not exceed the second predetermined threshold, enable substitution (e.g., with the substitution enabling unit 2214) of the display of the first user interface screen with a display of a second user interface screen, the second user interface screen including a clock face.

In some embodiments, the rotatable and depressible input mechanism unit 2204 is a mechanical button that is rotatable, and the first and second activations both represent a depression of the mechanical button.

In some embodiments, the rotatable and depressible input mechanism unit 2204 is a capacitive button that is rotatable, and the first and the second activations both represent a touch on the capacitive button.

In some embodiments, the first and the second activations are not rotations of the rotatable and depressible input mechanism unit 2204.

In some embodiments, the clock face includes a user interface object that indicates time, and the processing unit 2206 is further configured to enable display (e.g., with the display enabling unit 2212) of an affordance on the first user interface screen as part of the plurality of affordances, where the affordance indicates time, and the affordance is based on the user interface object.

In some embodiments, the time is current time.

In some embodiments, the user interface object is a representation of an analog clock comprising an hour hand and a minute hand.

In some embodiments, the affordance is a representation of an analog clock comprising an hour hand and a minute hand.

In some embodiments, the first and second predetermined thresholds are the same.

In some embodiments, the first activation and the second activation have an associated interval between the first and the second activations and the interval exceeds a third predetermined threshold.

The operations described above with reference to FIG. 14 are, optionally, implemented by components depicted in FIGS. 1A-1B or FIG. 22. For example, receiving operations 1402 and 1408, determining operations 1404 and 1410, displaying operation 1406, and substituting operation 1412 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
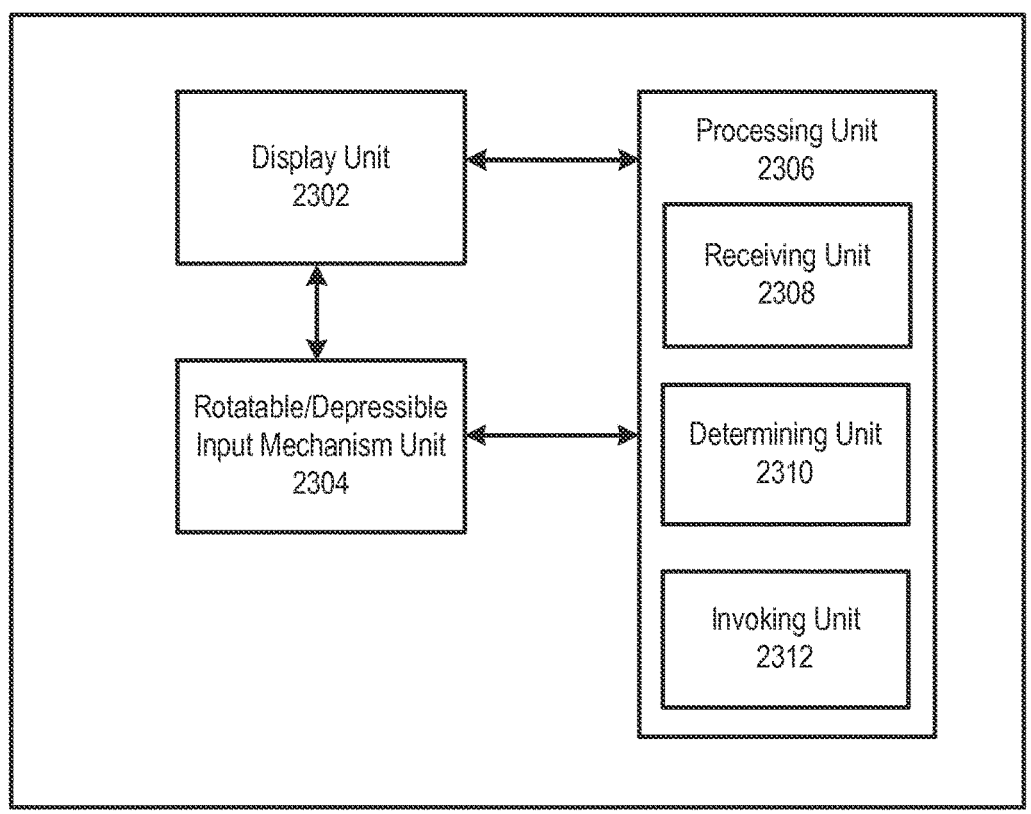
FIG. 23 is a functional block diagram of an electronic device in accordance with some embodiments.

In accordance with some embodiments, FIG. 23 shows a functional block diagram of an electronic device 2300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, an electronic device 2300 includes a display unit 2302 configured to display a graphic user interface, a rotatable and depressible input mechanism unit 2304, and a processing unit 2306 coupled to the display unit 2302 and the rotatable and depressible input mechanism unit 2304. In some embodiments, the processing unit 2306 includes a receiving unit 2308, a determining unit 2310, and an invoking unit 2312.

The processing unit 2306 is configured to receive (e.g., with the receiving unit 2308) first data representing a first activation of the rotatable and depressible input mechanism unit 2304 and a second activation of the rotatable and depressible input mechanism unit 2304, the first and the second activations having an associated interval between the first and the second activations; in response to receiving the first data, determine (e.g., with the determining unit 2310) whether the interval between the first and the second activations exceeds a predetermined threshold; and in accordance with a determination that the interval does not exceed the predetermined threshold, invoke (e.g., with the invoking unit 2312) a previously invoked application.

In some embodiments, the rotatable and depressible input mechanism unit 2304 is a mechanical button that is rotatable, and both of the first and the second activations represent depressions of the mechanical button.

In some embodiments, the rotatable and depressible input mechanism unit 2304 is a capacitive button that is rotatable, and both of the first and the second activations represent touches on the capacitive button.

In some embodiments, the first and the second activations do not comprise a rotation of the rotatable and depressible input mechanism unit 2304.

In some embodiments, the previously invoked application is invoked in an application start state.

In some embodiments, the previously invoked application is invoked in a previous state.

In some embodiments, the previous state corresponds to a state of the application after a user interaction.

In some embodiments, the previous state corresponds to a stored state of the application.

In some embodiments, the previously invoked application is a latest invoked application that is not currently displayed.

The operations described above with reference to FIG. 15 are, optionally, implemented by components depicted in FIGS. 1A-1B or FIG. 23. For example, receiving operation 1502, determining operation 1504, and invoking operation 1506 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
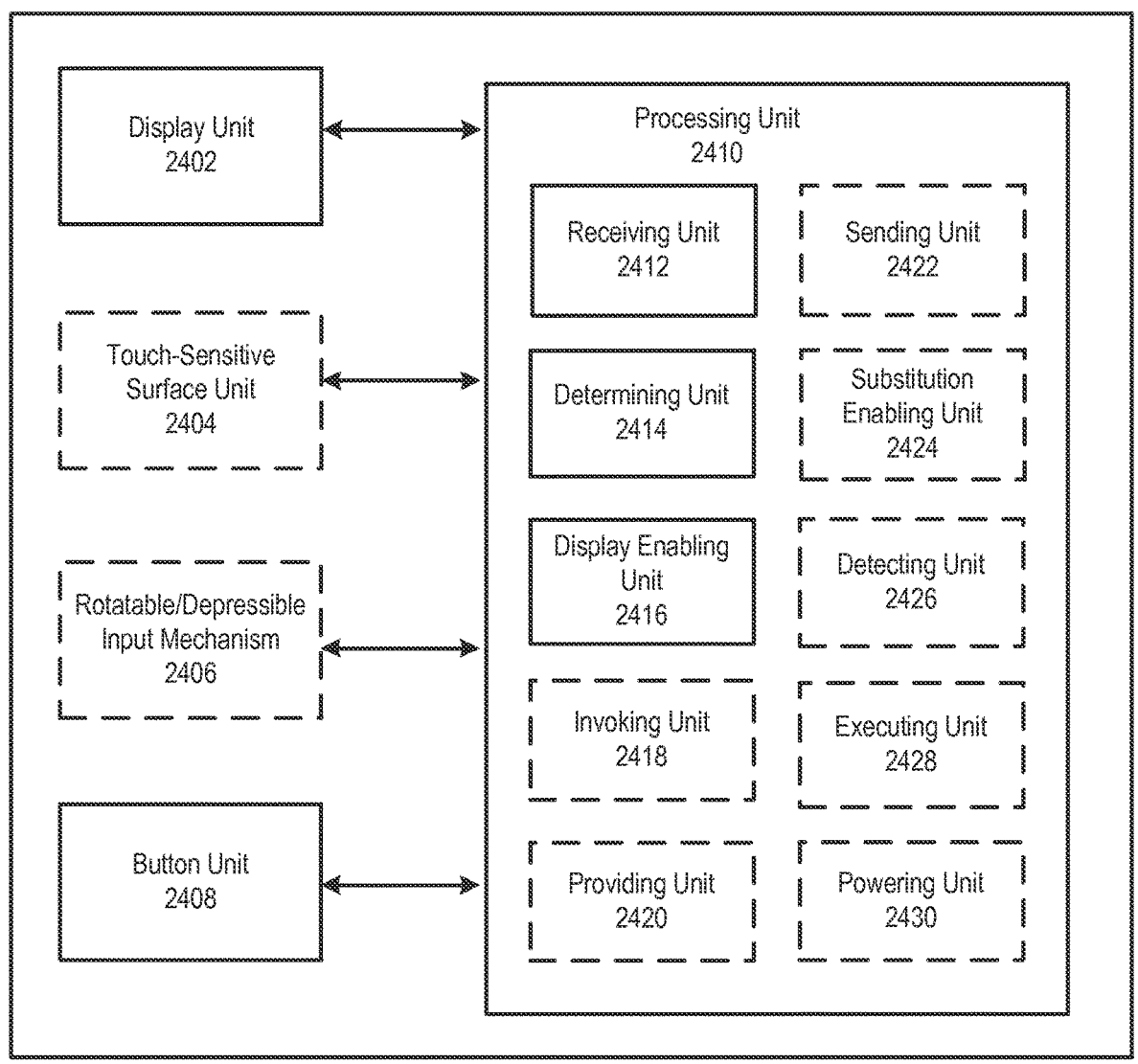
FIG. 24 is a functional block diagram of an electronic device in accordance with some embodiments.

In accordance with some embodiments, FIG. 24 shows a functional block diagram of an electronic device 2400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device 2400 includes a display unit 2402 configured to display a graphic user interface, a touch-sensitive surface unit 2404 configured to receive contacts, a rotatable and depressible input mechanism unit 2406, a button unit 2408 and a processing unit 2410 coupled to the display unit 2402, the touch-sensitive surface unit 2404, the rotatable and depressible input mechanism unit 2406, and the button unit 2408. In some embodiments, the processing unit 2410 includes a receiving unit 2412, a determining unit 2414, a display enabling unit 2416, and optionally, an invoking unit 2418, a providing unit 2420, a sending unit 2422, a substitution enabling unit 2424, a detecting unit 2426, an executing unit 2428, and a powering unit 2430.

The processing unit 2410 is configured to receive (e.g., with the receiving unit 2412) first data representing an activation of the button unit 2408 the activation having an associated activation duration; determine (e.g., with the determining unit 2414) whether the activation duration exceeds a predetermined threshold; and in accordance with a determination that the activation duration does not exceed the predetermined threshold, enable display (e.g., with the display enabling unit 2416) of a user interface screen, the user interface screen including at least a first affordance indicating a contact from a designated list of one or more contacts, where the designated list is a subset of a full list of contacts on the electronic device.

In some embodiments, the button unit 2408 is a mechanical button, and the activation represents a depression of the mechanical button.

In some embodiments, the button unit 2408 is a capacitive button, and the activation represents a touch on the capacitive button.

In some embodiments, the designated list of contacts is based on at least one of the following: time of day of interactions between the user and a contact, frequency of interactions between the user and a contact, and length of interactions between the user and a contact.

In some embodiments, the designated list of contacts is user-designated.

In some embodiments, the processing unit 2410 is further configured to, while the user interface screen is displayed, receive (e.g., with the receiving unit 2412) second data representing a touch on the touch-sensitive surface unit 2404 at the location of an affordance corresponding to a contact; and in response to receiving the second data, invoke (e.g., with the invoking unit 2418) a user prompt for selecting an application configured to provide a mode of interaction with the contact.

In some embodiments, the application is a text messaging application.

In some embodiments, the application is a low-latency asynchronous voice communication application.

In some embodiments, the application is an application for sending a drawing to the contact.

In some embodiments, the processing unit 2410 is further configured to, while the user interface screen is displayed, receive (e.g., with the receiving unit 2412) third data representing a second touch on the touch-sensitive surface unit 2404 and a third touch on the touch-sensitive surface unit 2404 separated by an associated duration interval, where both the second and third touches are at the location of a portion representing a contact; determine (e.g., with the determining unit 2414) whether the duration interval is less than a predetermined duration; and in accordance with a determination that the duration interval is less than the predetermined duration, provide (e.g., with the providing unit 2420) an interface, the interface configured to receive (e.g., with the receiving unit 2412) fourth data representing a user input; and send (e.g., with the sending unit 2422) a signal to a second electronic device, the signal representing an instruction instructing the second electronic device to generate a haptic alert based on the fourth data.

In some embodiments, the user input represented by the fourth data comprises a touch on the touch-sensitive surface unit 2404.

In some embodiments, the processing unit 2410 is further configured to, in accordance with a determination that the activation duration exceeds the predetermined threshold, enable substitution (e.g., with the substitution enabling unit 2424) of the first user interface screen with a second user interface screen, the second user interface screen comprising a second affordance representing a user prompt to power off the electronic device.

In some embodiments, the second user interface screen further comprises a third affordance representing a user prompt to enter a power-saving mode of the electronic device.

In some embodiments, the second user interface screen further comprises a fourth affordance representing a user prompt to turn off the touch-sensitive surface unit 2404.

In some embodiments, the touch-sensitive surface unit 2404 is configured to detect the intensity of touches, and the processing unit 2410 is further configured to, while the second user interface screen is displayed, detect (e.g., with the detecting unit 2426) a first touch on the touch-sensitive surface unit 2404, the first touch having a first characteristic intensity; determine (e.g., with the determining unit 2414) whether the first characteristic intensity is above an intensity threshold; and in response to a determination that the first characteristic intensity is above the intensity threshold, execute (e.g., with the executing unit 2428) a separate function of the electronic device.

In some embodiments, the electronic device is powered off when the first data are received, and in accordance with a determination that the activation duration exceeds the predetermined threshold, the processing unit 2410 further configured to power (e.g., with the powering unit 2430) on the electronic device.

The operations described above with reference to FIG. 16 are, optionally, implemented by components depicted in FIGS. 1A-1B or FIG. 24. For example, receiving operation 1602, determining operation 1604, displaying operation 1606, and substituting operation 1608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
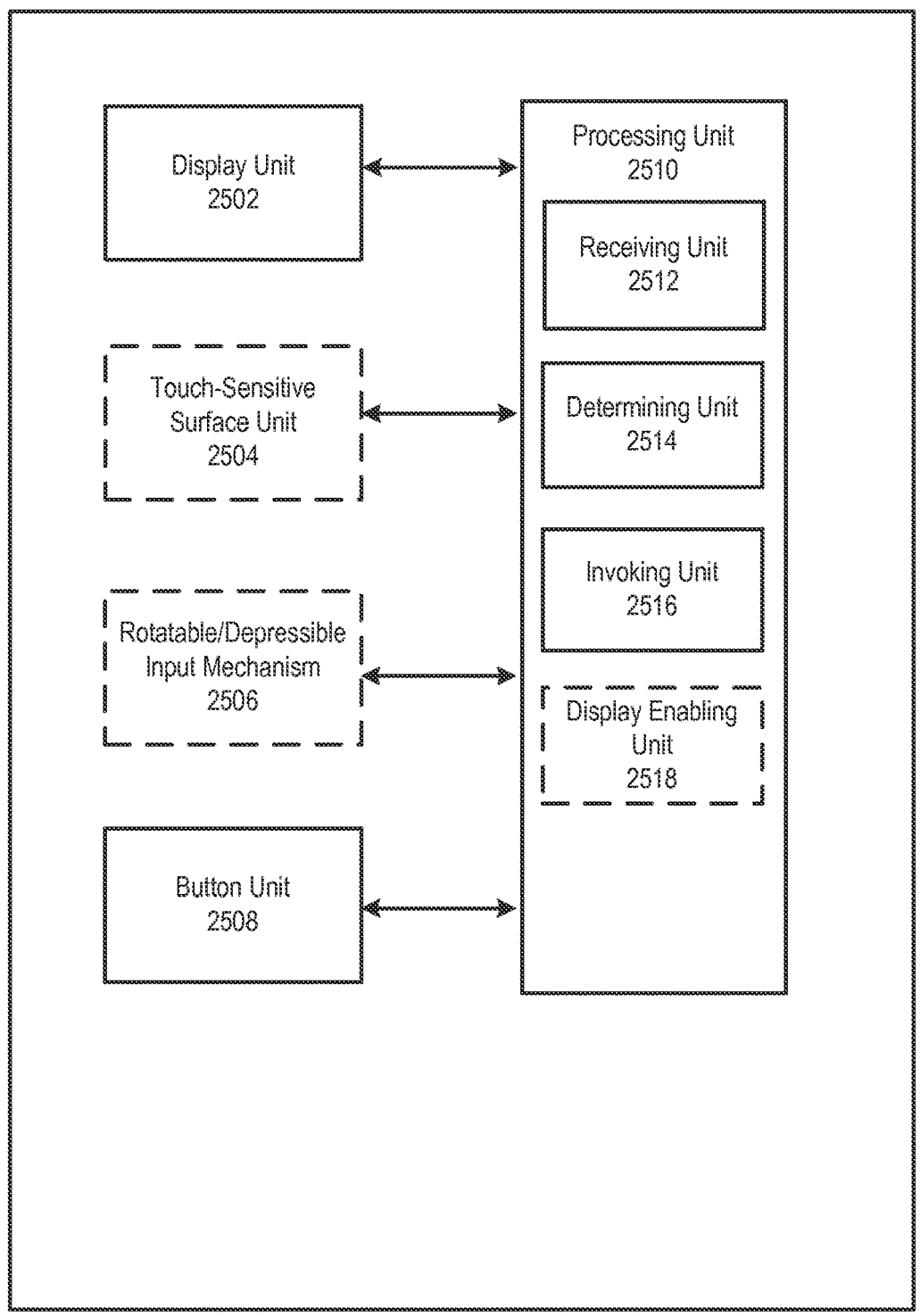
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display a graphic user interface, a touch-sensitive surface unit 2504 configured to receive contacts, a rotatable and depressible input mechanism unit 2506, a button unit 2508 and a processing unit 2510 coupled to the display unit 2502, the touch-sensitive surface unit 2504, the rotatable and depressible input mechanism unit 2506, and the button unit 2508. In some embodiments, the processing unit 2506 includes a receiving unit 2512, a determining unit 2514, an invoking unit 2516, and optionally, a display enabling unit 2518.

The processing unit 2510 is configured to receive (e.g., with the receiving unit 2512) first data representing a first activation of the button unit 2508 and a second activation of the button unit 2508, the first and the second activations having an associated interval between the first and the second activations; determine (e.g., with the determining unit 2514) whether the interval between the first and the second activations exceeds a predetermined threshold; and in accordance with a determination that the interval does not exceed the predetermined threshold, invoke (e.g., with the invoking unit 2516) a payments application.

In some embodiments, the button unit 2508 is a mechanical button, and both of the first and the second activations represent depressions of the mechanical button.

In some embodiments, the button unit 2508 is a capacitive button, and both of the first and the second activations represent touches on the capacitive button.

In some embodiments, the processing unit 2510 is further configured to enable display (e.g., with the display enabling unit 2518) of a user interface screen on the display unit 2502, the user interface screen including an affordance, the affordance representing a mode of payment.

In some embodiments, the mode of payment is a credit card.

In some embodiments, the affordance comprises a visual representation of the face of the credit card, the visual representation indicating a credit card number and a credit card company.

In some embodiments, the mode of payment is a debit card.

In some embodiments, the affordance comprises a visual representation of the face of the debit card, the visual representation indicating a debit card number and a debit card bank.

In some embodiments, the mode of payment is a bank account.

In some embodiments, the affordance indicates at least one of a bank associated with the bank account, a type of the bank account, and a bank account number associated with the bank account.

The operations described above with reference to FIG. 17 are, optionally, implemented by components depicted in FIGS. 1A-1B or FIG. 25. For example, receiving operation 1702, determining operation 1704, and invoking operation 1706 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
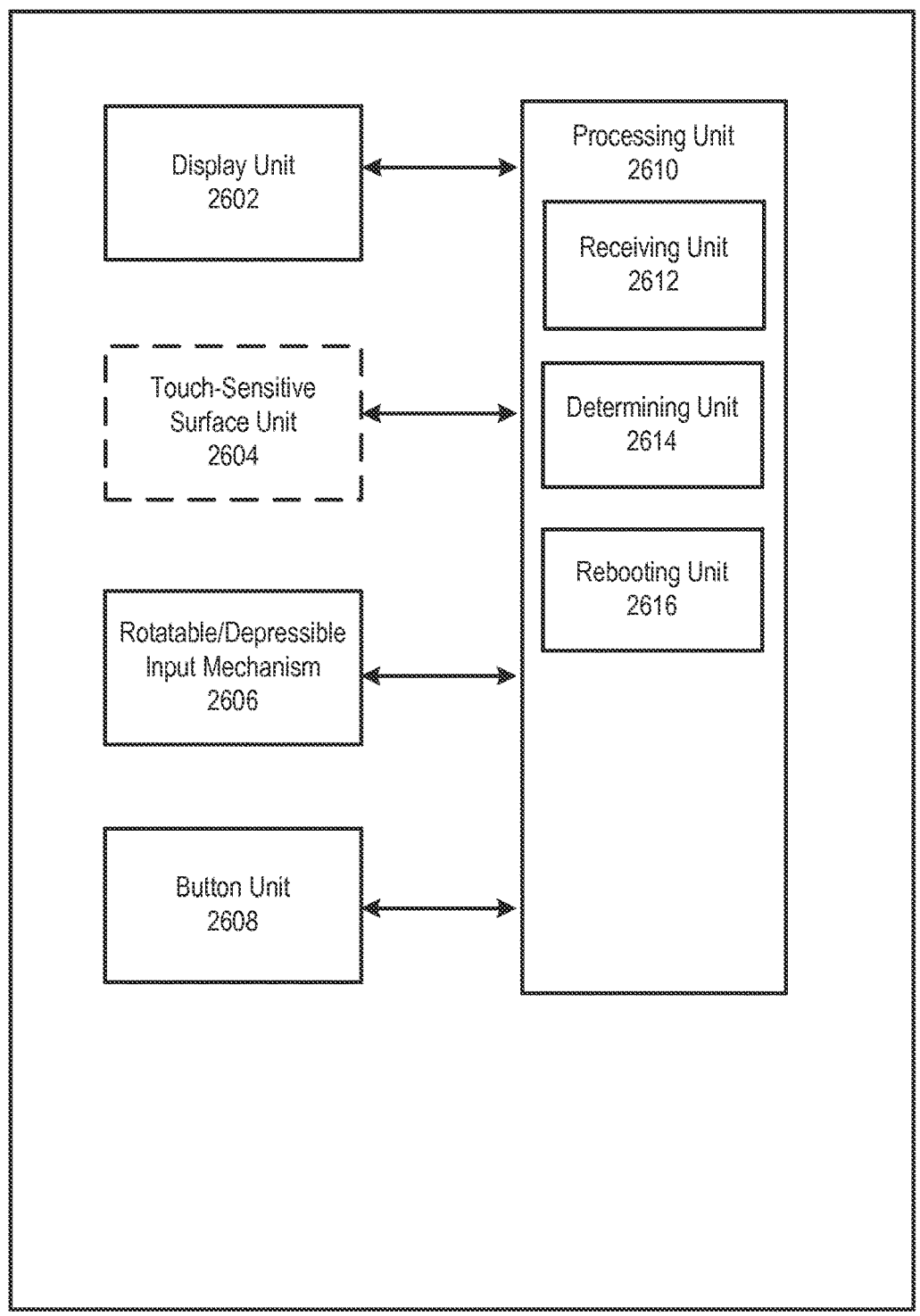
FIG. 26 is a functional block diagram of an electronic device in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a display unit 2602 configured to display a graphic user interface, a touch-sensitive surface unit 2604 configured to receive contacts, a rotatable and depressible input mechanism unit 2606, a button unit 2608 and a processing unit 2610 coupled to the display unit 2602, the touch-sensitive surface unit 2604, the rotatable and depressible input mechanism unit 2606, and the button unit 2608. In some embodiments, the processing unit 2106 includes a receiving unit 2612, a determining unit 2614, and a rebooting unit 2616.

The processing unit 2610 is configured to receive (e.g., with the receiving unit 2612) data representing an activation of the button unit 2608 and an activation of the rotatable and depressible input mechanism unit 2606, where the activation of the button unit 2608 has a first associated activation duration, the activation of the rotatable and depressible input mechanism unit 2606 has a second associated activation duration and overlaps with the activation of the button unit 2608 for an overlap interval, and the activation of the button unit 2608 and the activation of the rotatable and depressible input mechanism unit 2606 are received substantially simultaneously; determine (e.g., with the determining unit 2614) whether the data meet predetermined criteria; and in accordance with a determination that the data meet the predetermined criteria, reboot (e.g., with the rebooting unit 2616) the electronic device.

In some embodiments, the rotatable and depressible input mechanism unit 2606 is a mechanical button that is rotatable, and the activation of the rotatable and depressible input mechanism unit 2606 comprises a depression of the mechanical button.

In some embodiments, the rotatable and depressible input mechanism unit 2606 is a capacitive button that is rotatable, and the activation of the rotatable and depressible input mechanism unit 2606 comprises a touch on the capacitive button.

In some embodiments, the activation of the rotatable and depressible input mechanism unit 2606 does not comprise a rotation of the rotatable and depressible input mechanism unit 2606.

In some embodiments, the button unit 2608 is a mechanical button, and the activation of the button unit 2608 comprises a depression of the mechanical button.

In some embodiments, the button unit 2608 is a capacitive button, and the activation of the button unit 2608 comprises a touch on the capacitive button.

In some embodiments, the predetermined criteria relate to the first and second activation durations, and the processing unit 2610 is further configured to determine (e.g., with the determining unit 2614) whether both the first and the second activation durations exceed a predetermined threshold; and, in accordance with a determination that both the first and the second activation durations exceed the predetermined threshold, reboot (e.g., with the rebooting unit 2616) the electronic device.

In some embodiments, the predetermined criteria relate to the overlap interval, and the processing unit 2610 is further configured to determine (e.g., with the determining unit 2614) whether overlap interval exceeds a second predetermined threshold, and, in accordance with a determination that the overlap interval exceeds the second predetermined threshold, reboot (e.g., with the rebooting unit 2616) the electronic device.

The operations described above with reference to FIG. 18 are, optionally, implemented by components depicted in FIGS. 1A-1B or FIG. 26. For example, receiving operation 1802, determining operation 1804, and rebooting operation 1806 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
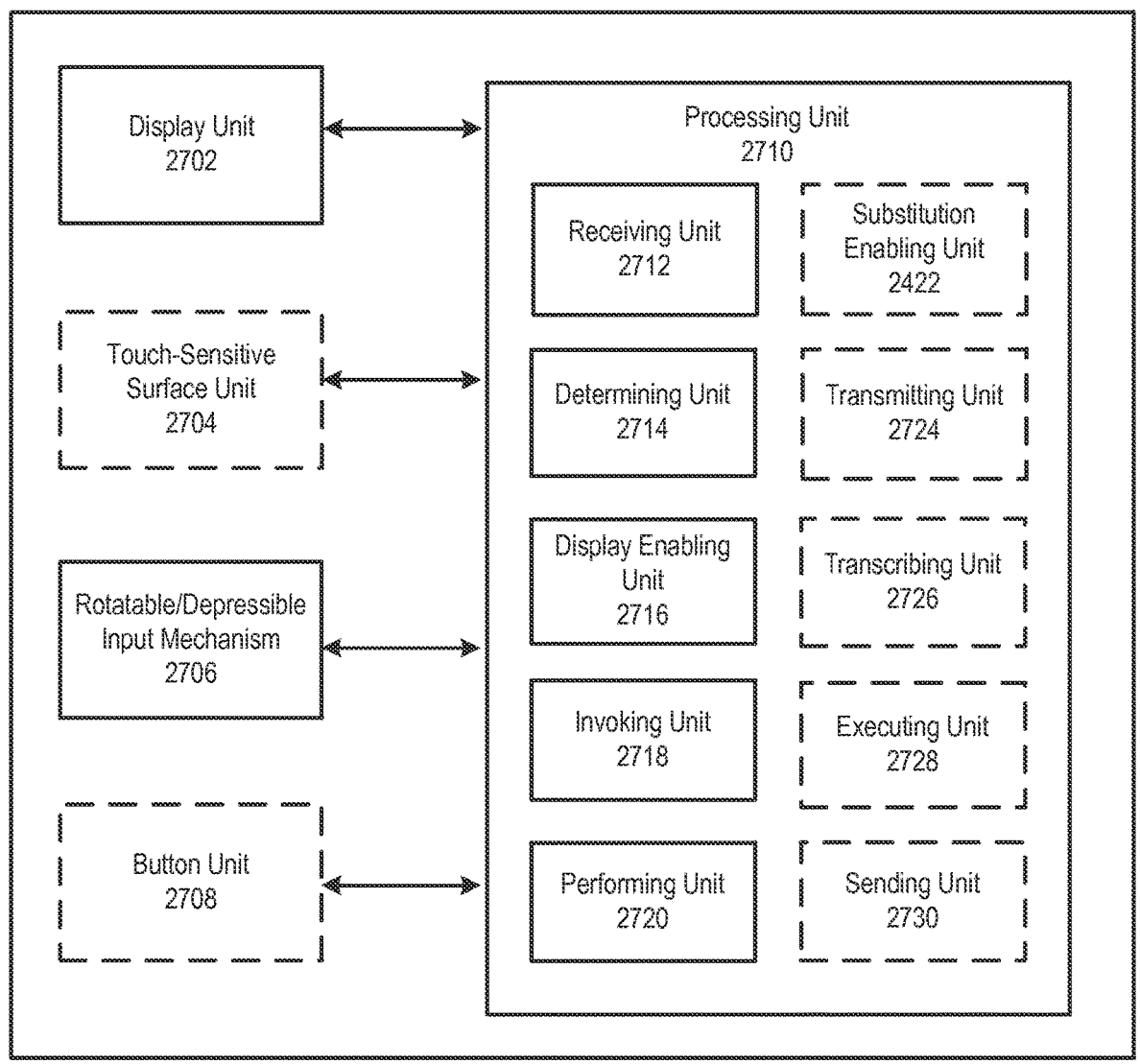
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27 an electronic device 2700 includes a display unit 2702 configured to display a graphic user interface, a touch-sensitive surface unit 2704 configured to receive contacts, a rotatable and depressible input mechanism unit 2706, a button unit 2708 and a processing unit 2710 coupled to the display unit 2702, the touch-sensitive surface unit 2704, the rotatable and depressible input mechanism unit 2706, and the button unit 2708. In some embodiments, the processing unit 2706 includes a receiving unit 2712, a determining unit 2714, a display enabling unit 2716, an invoking unit 2718, a performing unit 2720, and optionally, a substitution enabling unit 2722, a transmitting unit 2724, a transcribing unit 2726, an executing unit 2728, and a sending unit 2730.

The processing unit 2710 is configured to receive (e.g., with the receiving unit 2712) first data representing an activation of the rotatable and depressible input mechanism unit 2706; determine (e.g., with the determining unit 2714) whether the activation represents a single press of the rotatable and depressible input mechanism unit 2706, the single press having an associated press duration, a double press of the rotatable and depressible input mechanism unit 2706, the double press having an associated interval between a first press of the rotatable and depressible input mechanism unit 22706 and a second press of the rotatable and depressible input mechanism unit 2706, the first and the second presses of the rotatable and depressible input mechanism unit 2706 each having an associated press duration, or an extended press of the rotatable and depressible input mechanism unit 2706, the extended press having an associated press duration; and, in accordance with a determination that the activation represents a single press of the rotatable and depressible input mechanism unit 2706, enable display (e.g., with the display enabling unit 2716) of a first user interface screen on the display unit 2702, the first user interface screen including a plurality of affordances, the plurality of affordances comprising an affordance representing an application; in accordance with a determination that the activation represents a double press of the rotatable and depressible input mechanism unit 2706, invoke (e.g., with the invoking unit 2718) a previously invoked application; and in accordance with a determination that the activation represents an extended press of the rotatable and depressible input mechanism unit 2706, determine (e.g., with the determining unit 2714) a state of an active application and in accordance with a determination of the state of the active application, perform (e.g., with the performing unit 2720) an action.

In some embodiments, the processing unit 2710 is further configured to receive (e.g., with the receiving unit 2712) second data representing an activation of the button unit 2708; determine (e.g., with the determining unit 2714) whether the activation represents a single press of the button unit 2708, the single press having an associated press duration, a double press of the button unit 2708, the double press having an associated interval between a first press of the button unit 2708 and a second press of the button unit 2708, the first and the second presses of the button unit 2708 each having an associated press duration; or an extended press of the button unit 2708, the extended press having an associated press duration; and in accordance with a determination that the activation represents a single press of the button unit 2708, enable display (e.g., with the display enabling unit 2716) of a third user interface screen, the third user interface screen including at least a first affordance indicating a contact from a designated list of one or more contacts, where the designated list is a subset of a full list of contacts on the electronic device; in accordance with a determination that the activation represents a double press of the button unit 2708, invoke (e.g., with the invoking unit 2718) a payments application; and in accordance with a determination that the activation represents an extended press of the button unit 2708, enable display (e.g., with the display enabling unit 2716) of a fourth user interface screen including a second affordance representing a user prompt to power off the electronic device.

In some embodiments, the rotatable and depressible input mechanism unit 2706 is a mechanical button that is rotatable, and the single press or the extended press of the rotatable and depressible input mechanism unit 2706 comprises a depression of the mechanical button.

In some embodiments, the rotatable and depressible input mechanism unit 2706 is a mechanical button that is rotatable, and the double press of the rotatable and depressible input mechanism unit 2706 comprises a first and a second depression of the mechanical button.

In some embodiments, the rotatable and depressible input mechanism unit 2706 is a capacitive button that is rotatable, and the single press or the extended press of the rotatable and depressible input mechanism unit 2706 comprises a touch on the capacitive button.

In some embodiments, the rotatable and depressible input mechanism unit 2706 is a capacitive button that is rotatable, and the double press of the rotatable and depressible input mechanism unit 2706 comprises a first and a second touch on the capacitive button.

In some embodiments, the activation does not comprise a rotation of the rotatable and depressible input mechanism unit 2706.

In some embodiments, the button unit 2708 is a mechanical button, and the single press or the extended press of the button unit 2708 comprises a depression of the mechanical button.

In some embodiments, the button unit 2708 is a mechanical button, and the double press of the button unit 2708 comprises a first and a second depression of the mechanical button.

In some embodiments, the button unit 2708 is a capacitive button, and the single press or the extended press of the button unit 2708 comprises a touch on the capacitive button.

In some embodiments, the button unit 2708 is a capacitive button, and the double press of the button unit 2708 comprises a first and a second touch on the capacitive button.

In some embodiments, determining whether the activation represents a single press of the rotatable and depressible input mechanism unit 2706 comprises determining whether the press duration of the single press exceeds a first predetermined threshold; and, in accordance with a determination that the press duration of the single press does not exceed the first predetermined threshold, determining whether third data is received within a second interval after receiving the first data, the third data representing an activation of the rotatable and depressible input mechanism unit 2706; and in accordance with a determination that the third data is not received within the second interval, determining that the activation represents a single press of the rotatable and depressible input mechanism unit 2706.

In some embodiments, the processing unit 2710 is further configured to, in accordance with the determination that the activation represents a single press of the rotatable and depressible input mechanism unit 2706, and while the first user interface screen is displayed, receive (e.g., with the receiving unit 2712) fourth data representing a second single press of the rotatable and depressible input mechanism unit 2706; and in response to receiving the fourth data, enable substitution (e.g., with the substitution enabling unit 2722) of the display of the first user interface screen with a display of a fifth user interface screen, the fifth user interface screen including a clock face.

In some embodiments, the clock face includes a first user interface object that indicates time, and the processing unit 2710 is further configured to enable display (e.g., with the display enabling unit 2716) of a third affordance on the fifth user interface screen as part of the plurality of affordances, where the third affordance indicates the time, and the third affordance is based on the first user interface object.

In some embodiments, the time is current time.

In some embodiments, the first user interface object is a representation of an analog clock comprising an hour hand and a minute hand.

In some embodiments, the third affordance is a representation of an analog clock including an hour hand and a minute hand.

In some embodiments, determining whether the activation represents a double press of the rotatable and depressible input mechanism unit 2706 comprises determining whether the press duration of the first press of the double press exceeds a second predetermined threshold; in accordance with a determination that the press duration of the first press of the double press does not exceed the second predetermined threshold, determining whether the interval between the first press of the double press and the second press of the double press exceeds a third predetermined threshold; in accordance with a determination that the interval between the first press of the double press and the second press of the double press does not exceed the third predetermined threshold, determining whether the press duration of the second press of the double press exceeds a fourth predetermined threshold; and in accordance with a determination that the press duration of the second press of the double press does not exceed the second predetermined threshold, determining that the activation represents a double press of the rotatable and depressible input mechanism unit 2706.

In some embodiments, the second and the fourth predetermined thresholds are the same.

In some embodiments, in accordance with the determination that the activation represents a double press of the rotatable and depressible input mechanism unit 2706, the previously invoked application is invoked in an application start state.

In some embodiments, in accordance with the determination that the activation represents a double press of the rotatable and depressible input mechanism unit 2706, the previously invoked application is invoked in a previous state.

In some embodiments, in accordance with the determination that the activation represents a double press of the rotatable and depressible input mechanism unit 2706, the previous state corresponds to a state of the application after a user interaction.

In some embodiments, in accordance with the determination that the activation represents a double press of the rotatable and depressible input mechanism unit 2706, the previous state corresponds to a stored state of the application.

In some embodiments, the previously invoked application is a latest invoked application that is not currently displayed.

In some embodiments, determining whether the activation represents an extended press of the rotatable and depressible input mechanism unit 2706 comprises determining whether the press duration of the extended press exceeds a fifth predetermined threshold; and, in accordance with a determination that the press duration of the extended press exceeds the fifth predetermined threshold, determining that the activation represents an extended press of the rotatable and depressible input mechanism unit 2706.

In some embodiments, in accordance with the determination that the activation represents an extended press of the rotatable and depressible input mechanism unit 2706, and in accordance with a determination that the state of the active application relates to user-to-user voice communication, performing the action comprises invoking an application for low-latency asynchronous voice communication.

In some embodiments, the processing unit 2710 is further configured to, after invoking the application for low-latency asynchronous voice communication, receive (e.g., with the receiving unit 2712) a second voice input and transmit (e.g., with the transmitting unit 2724) the second voice input to a second electronic device capable of receiving the second voice input.

In some embodiments, in accordance with the determination that the activation represents an extended press of the rotatable and depressible input mechanism unit 2706, and in accordance with a determination that the state of the active application relates to transcribing a voice input, performing the action comprises invoking a dictation application; receiving a voice input; and transcribing the voice input into a displayed text.

In some embodiments, in accordance with the determination that the activation represents an extended press of the rotatable and depressible input mechanism unit 2706; and, in accordance with a determination that the state of the active application relates to receiving a voice request to execute a task, or in accordance with a determination that the state of the current application does not relate to user-to-user voice communication or transcribing a voice input, performing the action comprises invoking a virtual assistant.

In some embodiments, the processing unit 2710 is further configured to, after invoking the virtual assistant, enable display (e.g., with the display enabling unit 2716) of a sixth user interface screen on the display unit 2702, the sixth user interface screen including a user prompt for voice input.

In some embodiments, the processing unit 2710 is further configured to receive (e.g., with the receiving unit 2712) a voice input.

In some embodiments, the processing unit 2710 is further configured to transcribe (e.g., with the transcribing unit 2726) the voice input into text and enable display (e.g., with the display enabling unit 2716) of the text on the display unit 2702.

In some embodiments, the processing unit 2710 is further configured to enable display (e.g., with the display enabling unit 2716) of a waveform based on the voice input on the display unit 2702 at a first position.

In some embodiments, the first position is adjacent to the rotatable and depressible input mechanism unit 2706.

In some embodiments, the processing unit 2710 is further configured to determine (e.g., with the determining unit 2714) whether the voice input comprises a request to execute a task executable by the virtual assistant and, in accordance with a determination that the voice input comprises a request to execute a task executable by the virtual assistant, execute (e.g., with the executing unit 2728), by the virtual assistant, the task.

In some embodiments, the virtual assistant is run on the electronic device.

In some embodiments, the virtual assistant is run on an external device in wireless communication with the electronic device.

In some embodiments, the processing unit 2710 is further configured to send (e.g., with the sending unit 2730) fifth data representing the voice input to the external device; receive (e.g., with the receiving unit 2712), via wireless communication, sixth data from the external device, the sixth data representing a request to execute a task executable by the virtual assistant; transcribe (e.g., with the transcribing unit 2726) the request into text; and enable display (e.g., with the display enabling unit 2716) of the text on the display unit 2702.

In some embodiments, the processing unit 2710 is further configured to enable display (e.g., with the display enabling unit 2716) of a fourth affordance representing a user prompt to display additional data related to the request on the external device.

The operations described above with reference to FIG. 19 are, optionally, implemented by components depicted in FIGS. 1A-1B or FIG. 27. For example, receiving operation 1902, determining operations 1904 and 1910, displaying operation 1906, invoking operation 1908, and performing operation 1912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
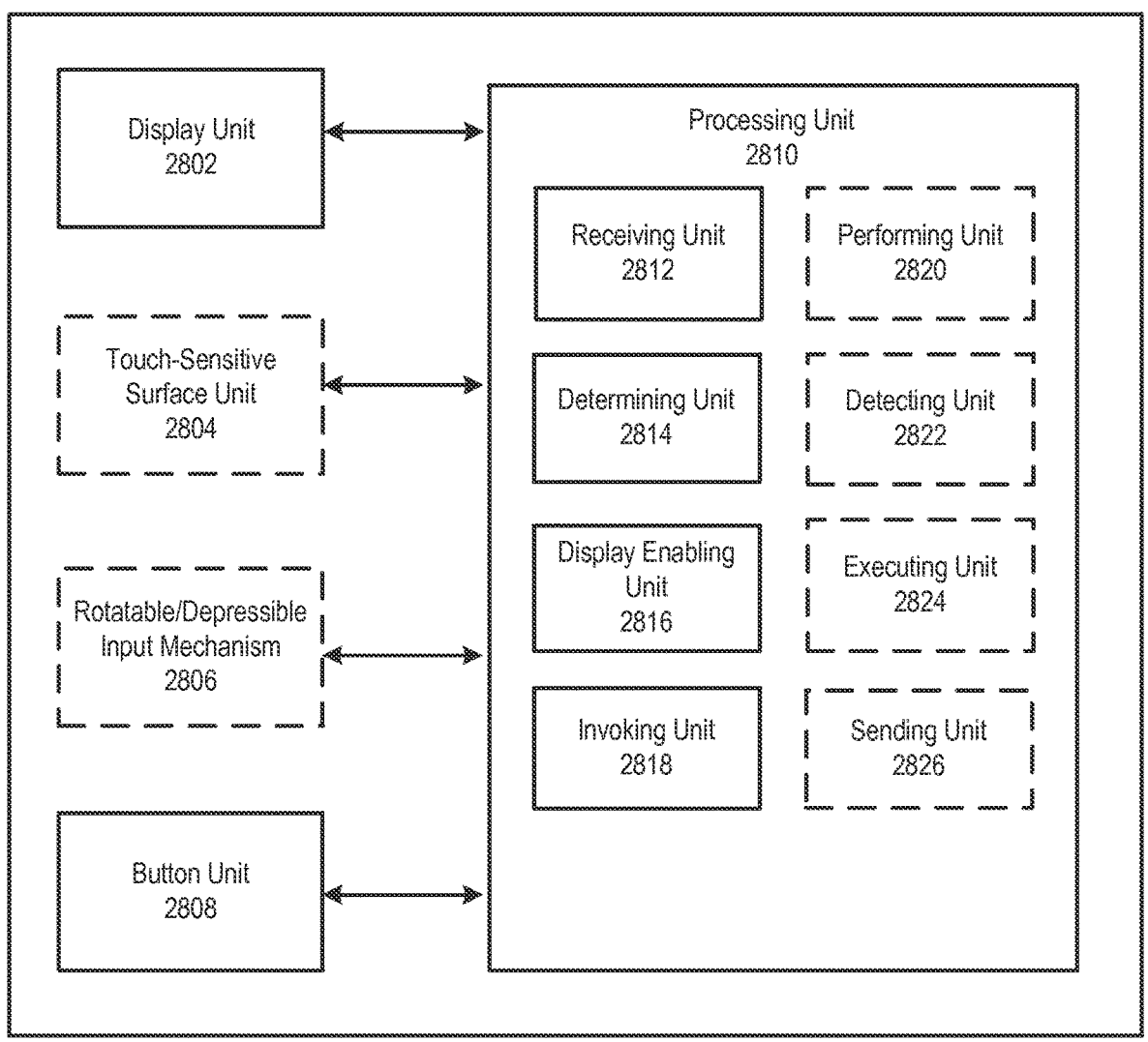
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display a graphic user interface, a touch-sensitive surface unit 2804 configured to receive contacts, a rotatable and depressible input mechanism unit 2806, a button unit 2808 and a processing unit 2810 coupled to the display unit 2802, the touch-sensitive surface unit 2804, the rotatable and depressible input mechanism unit 2806, and the button unit 2808. In some embodiments, the processing unit 2806 includes a receiving unit 2812, a determining unit 2814, a display enabling unit 2816, an invoking unit 2818, and optionally, a performing unit 2820, a detecting unit 2822, an executing unit 2824, and a sending unit 2826.

The processing unit 2810 is configured to receive (e.g., with the receiving unit 2812) first data representing an activation of the button unit 2808; determine (e.g., with the determining unit 2814) whether the activation represents a single press of the button unit 2808, the single press having an associated press duration, a double press of the button unit 2808, the double press having an associated interval between a first consecutive press and a second consecutive press, the first and second consecutive presses each having an associated press duration, or an extended press of the button unit 2808, the extended press having an associated press duration; and in accordance with a determination that the activation represents a single press of the button unit 2808, enable display (e.g., with the display enabling unit 2816) of a first user interface screen, the first user interface screen including at least a first affordance indicating a contact from a designated list of one or more contacts, where the designated list is a subset of a full list of contacts on the electronic device; in accordance with a determination that the activation represents a double press of the button unit 2808, invoke (e.g., with the invoking unit 2818) a payments application; and in accordance with a determination that the activation represents an extended press of the button unit 2808, enable display (e.g., with the display enabling unit 2816) of a second user interface screen, the second user interface screen comprising a second affordance representing a user prompt to power off the electronic device.

In some embodiments, the processing unit 2810 is further configured to receive (e.g., with the receiving unit 2812) second data representing an activation of the rotatable and depressible input mechanism unit 2806; determine (e.g., with the determining unit 2814) whether the activation represents a single press of the rotatable and depressible input mechanism unit 2806, the single press having an associated press duration, a double press of the rotatable and depressible input mechanism unit 2806, the double press having an associated interval between a first consecutive press and a second consecutive press, the first and second consecutive presses each having an associated press duration, or an extended press of the rotatable and depressible input mechanism unit 2806, the extended press having an associated press duration; and in accordance with a determination that the activation represents a single press of the rotatable and depressible input mechanism unit 2806, enable display (e.g., with the display enabling unit 2816) of a third user interface screen on the display unit 2802, the third user interface screen including a plurality of affordances, the plurality of affordances comprising an affordance representing an application; in accordance with a determination that the activation represents a double press of the rotatable and depressible input mechanism unit 2806, invoke (e.g., with the invoking unit 2818) a previously invoked application; and in accordance with a determination that the activation represents an extended press of the rotatable and depressible input mechanism unit 2806, determine (e.g., with the determining unit 2814) a state of an active application; and in accordance with a determination of the state of the active application, perform (e.g., with the performing unit 2820) an action.

In some embodiments, the button unit 2808 is a mechanical button, and the single press or the extended press of the button unit 2808 comprises a depression of the mechanical button.

In some embodiments, the button unit 2808 is a mechanical button, and the double press of the button unit 2808 comprises a first and a second depression of the mechanical button.

In some embodiments, the button unit 2808 is a capacitive button, and the single press or the extended press of the button unit 2808 comprises a touch on the capacitive button.

In some embodiments, the button unit 2808 is a capacitive button, and the double press of the button unit 2808 comprises a first and a second touch on the capacitive button.

In some embodiments, the rotatable and depressible input mechanism unit 2806 is a mechanical button that is rotatable, and the single press or the extended press of the rotatable and depressible input mechanism unit 2806 comprises a depression of the mechanical button.

In some embodiments, the rotatable and depressible input mechanism unit 2806 is a mechanical button that is rotatable, and the double press of the rotatable and depressible input mechanism unit 2806 comprises a first and a second depression of the mechanical button.

In some embodiments, the rotatable and depressible input mechanism unit 2806 is a capacitive button that is rotatable, and the single press or the extended press of the rotatable and depressible input mechanism unit 2806 comprises a touch on the capacitive button.

In some embodiments, the rotatable and depressible input mechanism unit 2806 is a capacitive button that is rotatable, and the double press of the rotatable and depressible input mechanism unit 2806 comprises a first and a second touches on the capacitive button.

In some embodiments, the activation does not comprise a rotation of the rotatable and depressible input mechanism unit 2806.

In some embodiments, determining whether the activation represents a double press of the button unit 2808 comprises determining whether the press duration of the first press of the double press exceeds a first predetermined threshold; in accordance with a determination that the press duration of the first press of the double press does not exceed the first predetermined threshold, determining whether the interval between the first press of the double press and the second press of the double press exceeds a second predetermined threshold; in accordance with a determination that the interval between the first press of the double press and the second press of the double press does not exceed the second predetermined threshold, determining whether the press duration of the second press of the double press exceeds a third predetermined threshold; and in accordance with a determination that the press duration of the second press of the double press does not exceed the third predetermined threshold, determining that the activation represents a double press of the button unit 2808.

In some embodiments, the first and the third predetermined thresholds are the same.

In some embodiments, the processing unit 2810 is further configured to, in accordance with the determination that the activation represents a double press of the button unit 2808, and after invoking the payments application, enable display (e.g., with the display enabling unit 2816) of a fifth user interface screen on the display unit 2802, the fifth user interface screen including a fifth affordance, the fifth affordance representing a mode of payment.

In some embodiments, the mode of payment is a credit card.

In some embodiments, the fifth affordance comprises a visual representation of the face of the credit card, the visual representation indicating a credit card number and a credit card company.

In some embodiments, the mode of payment is a debit card.

In some embodiments, the fifth affordance comprises a visual representation of the face of the debit card, the visual representation indicating a debit card number and a debit card bank.

In some embodiments, the mode of payment is a bank account.

In some embodiments, the fifth affordance indicates at least one of a bank associated with the bank account, a type of the bank account, and a bank account number associated with the bank account.

In some embodiments, determining whether the activation represents an extended press of the button unit 2808 comprises determining whether the press duration of the extended press exceeds a fourth predetermined threshold; and, in accordance with a determination that the press duration of the extended press exceeds the fourth predetermined threshold, determining that the activation represents an extended press of the button unit 2808.

In some embodiments, the processing unit 2810 is further configured to enable display (e.g., with the display enabling unit 2816) of a sixth user interface screen comprising a sixth affordance representing a user prompt to power off the electronic device.

In some embodiments, the sixth user interface screen further comprises a seventh affordance representing a user prompt to enter a power-saving mode of the electronic device.

In some embodiments, the sixth user interface screen further comprises an eighth affordance representing a user prompt to turn off the touch-sensitive surface unit.

In some embodiments, the touch-sensitive surface unit is configured to detect the intensity of touches, and the processing unit 2810 is further configured to, while the sixth user interface screen is displayed, detect (e.g., with the detecting unit 2822) a first touch on the touch-sensitive surface unit, the first contact having a first characteristic intensity; determine (e.g., with the determining unit 2814) whether the first characteristic intensity is above an intensity threshold; and in response to a determination that the first characteristic intensity is above the intensity threshold, execute (e.g., with the executing unit 2824) a separate function of the electronic device.

In some embodiments, in accordance with a determination that the activation represents an extended press of the button unit 2808, where the electronic device is powered off when the first data are received, and the processing unit 2810 is further configured to power on the electronic device.

In some embodiments, determining whether the activation represents a single press of the button unit 2808 comprises determining whether the press duration of the single press exceeds a fifth predetermined threshold; and in accordance with a determination that the press duration of the single press does not exceed the fifth predetermined threshold, determining whether second data is received within a second interval after receiving the first data, the second data representing an activation of the button unit 2808; and in accordance with a determination that the second data is not received within the second interval, determining that the activation represents a single press of the button unit 2808.

In some embodiments, the processing unit 2810 is further configured to, in accordance with the determination that the activation represents a single press of the button unit 2808, and while the first user interface screen is displayed, automatically compile the designated list of contacts based on at least one of the following: time of day of interactions between a user and a contact, frequency of interactions between a user and a contact, and length of interactions between a user and a contact.

In some embodiments, the designated list of contacts is user-designated.

In some embodiments, the processing unit 2810 is further configured to, while the first user interface screen is displayed, receive third data representing a touch on the touch-sensitive surface unit at the location of a first affordance indicating a contact; and in response to receiving the third data, invoke (e.g., with the invoking unit 2818) a user prompt for selecting an application configured to provide a mode of interaction with the indicated contact.

In some embodiments, the application is a text messaging application.

In some embodiments, the application is a low-latency asynchronous voice communication application.

In some embodiments, the application is an application for sending a drawing to the indicated contact.

In some embodiments, the processing unit 2810 is further configured to, in accordance with the determination that the activation represents a single press of the button unit 2808, and while the first user interface screen is displayed receive (e.g., with the receiving unit 2812) fourth data representing a second touch on the touch-sensitive surface unit and a third touch on the touch-sensitive surface unit separated by an associated duration interval, where both the second and third touches are at the location of a portion representing a contact; determine (e.g., with the determining unit 2814) whether the duration interval is less than a sixth predetermined duration; and in accordance with a determination that the duration interval is less than the sixth predetermined duration, provide an interface, the interface configured to receive (e.g., with the receiving unit 2812) fifth data representing a user input and send (e.g., with the sending unit 2826) a signal to a second electronic device, the signal representing an instruction instructing the second electronic device to generate a haptic alert based on the fifth data.

In some embodiments, the user input represented by the fifth data comprises a touch on the touch-sensitive surface unit.

The operations described above with reference to FIG. 20 are, optionally, implemented by components depicted in FIGS. 1A-1B or FIG. 2. For example, receiving operation 2002, determining operation 2004, displaying operations 2004 and 2010, and invoking operation 2008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
 a display device;
 a rotatable and depressible input mechanism;
 one or more processors;
 memory; and
 one or more programs, wherein the one or more programs are stored in the memory and configured to be executed by the one or more processors, the one or more programs including instructions, which when executed by the one or more processors, cause the electronic device to:
  display, via the display device, a user interface;
  while displaying the user interface, detect user input; and
  in response to detecting the user input:
   in accordance with a determination that the user input represents rotation of the rotatable and depressible input mechanism, scroll content of the user interface; and
   in accordance with a determination that the user input represents one or more presses of the rotatable and depressible input mechanism, invoke a previously invoked application.

2. The electronic device of claim 1, wherein invoking the previously invoked application is performed further in accordance with a determination that the user input represents a first press of the rotatable and depressible input mechanism and a second press of the rotatable and depressible input mechanism, the first press and the second press having an associated interval between the first press and the second press.

3. The electronic device of claim 2, wherein invoking the previously invoked application is performed further in accordance with a determination that the interval does not exceed a predetermined threshold.

4. The electronic device of claim 2, wherein the rotatable and depressible input mechanism is a mechanical button that is rotatable, and wherein both of the first press and the second press represent depressions of the mechanical button.

5. The electronic device of claim 2, wherein the rotatable and depressible input mechanism is a capacitive button that is rotatable, and wherein both of the first press and the second press represent touches on the capacitive button.

6. The electronic device of claim 2, wherein the first press and the second press do not comprise a rotation of the rotatable and depressible input mechanism.

7. The electronic device of claim 1, wherein the previously invoked application is invoked in an application start state.

8. The electronic device of claim 1, wherein the previously invoked application is invoked in a previous state.

9. The electronic device of claim 8, wherein the previous state corresponds to a state of the application after a user interaction.

10. The electronic device of claim 8, wherein the previous state corresponds to a stored state of the application.

11. The electronic device of claim 1, wherein the previously invoked application is a latest invoked application that is not currently displayed.

12. The electronic device of claim 1, wherein scrolling the content includes cycling through options in the user interface.

13. A method, comprising:
at an electronic device with a display device and a rotatable and depressible input mechanism:
displaying, via the display device, a user interface;
while displaying the user interface, detecting user input; and
in response to detecting the user input:
in accordance with a determination that the user input represents rotation of the rotatable and depressible input mechanism, scrolling content of the user interface; and
in accordance with a determination that the user input represents one or more presses of the rotatable and depressible input mechanism, invoking a previously invoked application.

14. A non-transitory computer-readable storage medium storing one or more programs, the one or more programs comprising instructions, which when executed by one or more processors of an electronic device with a display device and a rotatable and depressible input mechanism, cause the electronic device to:
display, via the display device, a user interface;
while displaying the user interface, detect user input; and
in response to detecting the user input:
in accordance with a determination that the user input represents rotation of the rotatable and depressible input mechanism, scroll content of the user interface; and
in accordance with a determination that the user input represents one or more presses of the rotatable and depressible input mechanism, invoke a previously invoked application.

15. The method of claim 13, wherein invoking the previously invoked application is performed further in accordance with a determination that the user input represents a first press of the rotatable and depressible input mechanism and a second press of the rotatable and depressible input mechanism, the first press and the second press having an associated interval between the first press and the second press.

16. The method of claim 15, wherein invoking the previously invoked application is performed further in accordance with a determination that the interval does not exceed a predetermined threshold.

17. The method of claim 15, wherein the rotatable and depressible input mechanism is a mechanical button that is rotatable, and wherein both of the first press and the second press represent depressions of the mechanical button.

18. The method of claim 15, wherein the rotatable and depressible input mechanism is a capacitive button that is rotatable, and wherein both of the first press and the second press represent touches on the capacitive button.

19. The method of claim 15, wherein the first press and the second press do not comprise a rotation of the rotatable and depressible input mechanism.

20. The method of claim 13, wherein the previously invoked application is invoked in an application start state.

21. The method of claim 13, wherein the previously invoked application is invoked in a previous state.

22. The method of claim 21, wherein the previous state corresponds to a state of the application after a user interaction.

23. The method of claim 21, wherein the previous state corresponds to a stored state of the application.

24. The method of claim 13, wherein the previously invoked application is a latest invoked application that is not currently displayed.

25. The method of claim 13, wherein scrolling the content includes cycling through options in the user interface.

26. The non-transitory computer-readable storage medium of claim 14, wherein invoking the previously invoked application is performed further in accordance with a determination that the user input represents a first press of the rotatable and depressible input mechanism and a second press of the rotatable and depressible input mechanism, the first press and the second press having an associated interval between the first press and the second press.

27. The non-transitory computer-readable storage medium of claim 26, wherein invoking the previously invoked application is performed further in accordance with a determination that the interval does not exceed a predetermined threshold.

28. The non-transitory computer-readable storage medium of claim 26, wherein the rotatable and depressible input mechanism is a mechanical button that is rotatable, and wherein both of the first press and the second press represent depressions of the mechanical button.

29. The non-transitory computer-readable storage medium of claim 26, wherein the rotatable and depressible input mechanism is a capacitive button that is rotatable, and wherein both of the first press and the second press represent touches on the capacitive button.

30. The non-transitory computer-readable storage medium of claim 26, wherein the first press and the second press do not comprise a rotation of the rotatable and depressible input mechanism.

31. The non-transitory computer-readable storage medium of claim 14, wherein the previously invoked application is invoked in an application start state.

32. The non-transitory computer-readable storage medium of claim 14, wherein the previously invoked application is invoked in a previous state.

33. The non-transitory computer-readable storage medium of claim 32, wherein the previous state corresponds to a state of the application after a user interaction.

34. The non-transitory computer-readable storage medium of claim 32, wherein the previous state corresponds to a stored state of the application.

35. The non-transitory computer-readable storage medium of claim 14, wherein the previously invoked application is a latest invoked application that is not currently displayed.

36. The non-transitory computer-readable storage medium of claim 14, wherein scrolling the content includes cycling through options in the user interface.

* * * * *